US012001496B1

(12) United States Patent
Petersen et al.

(10) Patent No.: US 12,001,496 B1
(45) Date of Patent: *Jun. 4, 2024

(54) SELECTING, RANKING, AND/OR PRESENTING MICROSITE CONTENT

(71) Applicant: GOOGLE LLC, Mountain View, CA (US)

(72) Inventors: Morten Just Petersen, Zurich (CH); Francisco Campoy Flores, Mountain View, CA (US); Emmet J. Connolly, Zurich (CH); Joao Paulo Gil De Paiva, Zurich (CH); Bartlomiej Borawski, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,541

(22) Filed: Jul. 5, 2023

Related U.S. Application Data

(63) Continuation of application No. 17/589,132, filed on Jan. 31, 2022, now Pat. No. 11,727,071, which is a
(Continued)

(51) Int. Cl.
*G06F 16/9535* (2019.01)
*G06F 16/2457* (2019.01)
(Continued)

(52) U.S. Cl.
CPC .... *G06F 16/9535* (2019.01); *G06F 16/24578* (2019.01); *G06F 16/951* (2019.01);
(Continued)

(58) Field of Classification Search
CPC ............... G06F 16/9535; G06F 16/955; G06F 16/24578; G06F 16/951; H04L 67/10; H04L 67/306
(Continued)

(56) References Cited

U.S. PATENT DOCUMENTS

| 5,893,091 A | 4/1999 | Hunt et al. |
| 7,522,035 B2 * | 4/2009 | Albert ................ G08B 21/0461 340/517 |

(Continued)

OTHER PUBLICATIONS

Ziegler, WIMM One Review, Nov. 9, 2011, The Verge, 8 pages. dated Nov. 9, 2011.
(Continued)

*Primary Examiner* — Wing F Chan
*Assistant Examiner* — Leon Y Tseng
(74) *Attorney, Agent, or Firm* — Gray Ice Higdon

(57) ABSTRACT

A server device is configured to receive criteria that indicate when a microsite is to be provided to a user device. The user device is configured to obtain sensor data and user profile data and send the sensor data and the user profile data to the server device. The server device is configured to receive the sensor data and the user profile data, identify a relevant microsite, and provide information regarding the relevant microsite to the user device. In some cases, the service device is configured to identify that a particular microsite has been purchased by a user of the user device and provide information, to the user device, identifying that the particular microsite has been purchased.

16 Claims, 63 Drawing Sheets

Related U.S. Application Data continuation of application No. 17/179,817, filed on Feb. 19, 2021, now Pat. No. 11,238,120, which is a continuation of application No. 16/702,972, filed on Dec. 4, 2019, now Pat. No. 10,936,689, which is a continuation of application No. 15/695,768, filed on Sep. 5, 2017, now Pat. No. 10,552,504, which is a continuation of application No. 15/351,031, filed on Nov. 14, 2016, now Pat. No. 9,792,376, which is a continuation of application No. 13/793,269, filed on Mar. 11, 2013, now Pat. No. 9,495,456.

(60) Provisional application No. 61/663,822, filed on Jun. 25, 2012, provisional application No. 61/664,104, filed on Jun. 25, 2012, provisional application No. 61/663,842, filed on Jun. 25, 2012, provisional application No. 61/663,805, filed on Jun. 25, 2012, provisional application No. 61/663,814, filed on Jun. 25, 2012.

(51) Int. Cl.
*G06F 16/951* (2019.01)
*G06F 16/955* (2019.01)
*H04L 67/10* (2022.01)
*H04L 67/306* (2022.01)

(52) U.S. Cl.
CPC ............ *G06F 16/955* (2019.01); *H04L 67/10* (2013.01); *H04L 67/306* (2013.01)

(58) Field of Classification Search
USPC .......................................... 709/203; 707/769
See application file for complete search history.

(56) References Cited

U.S. PATENT DOCUMENTS

| | | |
|---|---|---|
| 8,095,950 B1 | 1/2012 | Lapcevic |
| 9,495,456 B2 | 11/2016 | Petersen et al. |
| 9,792,376 B1 | 10/2017 | Petersen et al. |
| 10,552,504 B1 | 2/2020 | Petersen et al. |
| 10,936,689 B1 | 3/2021 | Petersen et al. |
| 11,238,120 B1 | 2/2022 | Petersen et al. |
| 2002/0059370 A1 | 5/2002 | Shuster |
| 2006/0265397 A1 | 11/2006 | Bryan et al. |
| 2007/0055766 A1 | 3/2007 | Petropoulakis et al. |
| 2012/0323898 A1 | 12/2012 | Kumar et al. |
| 2012/0330980 A1 | 12/2012 | Rubin et al. |
| 2013/0030814 A1* | 1/2013 | Rajput ................... G10L 15/22 704/E21.001 |
| 2013/0124848 A1 | 5/2013 | Fried |
| 2013/0144974 A1 | 6/2013 | Haakenson et al. |
| 2013/0324159 A1 | 12/2013 | Smalling et al. |

OTHER PUBLICATIONS

Facebook, "How to Create and Manage Events", May 15, 2012 (print date), 5 pages. dated May 15, 2012.
MG Siegler, "FourSquare Push Notifications, for the Ultimate in Friend Stalking", Jun. 25, 2009, 9 pages. dated Jun. 25, 2009.

* cited by examiner

230
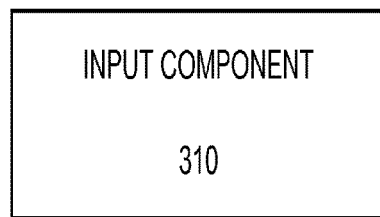
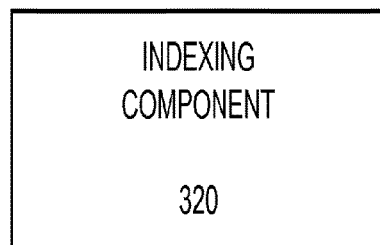
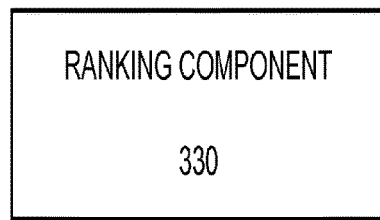
FIG. 3

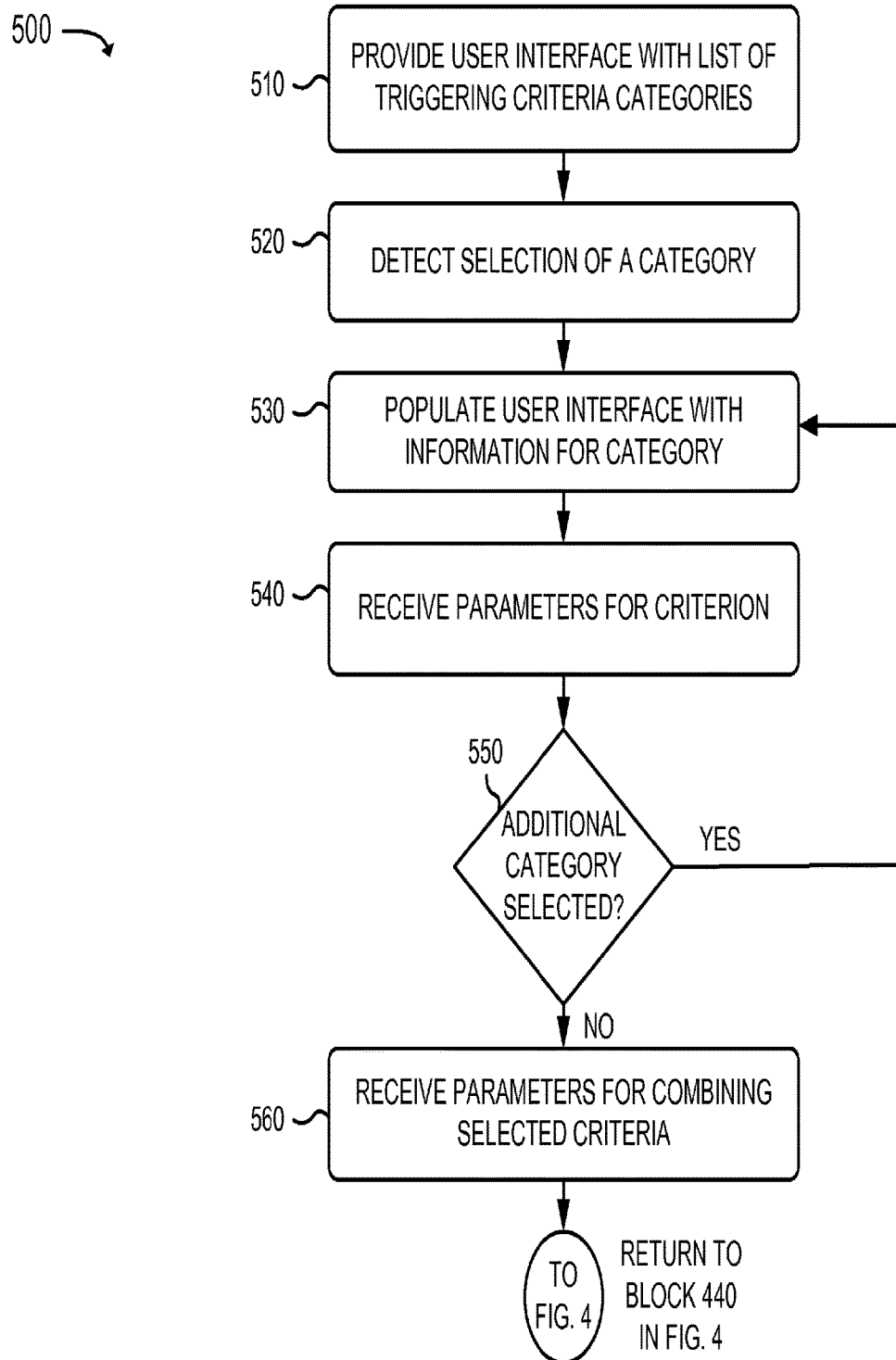

| Name | Definition | Visualization |
|---|---|---|
| Linear ascendant from a to b | $\begin{cases} 0 & x < a \\ \frac{x-a}{b-a} & a \leq x \leq b \\ 1 & x > b \end{cases}$ | |
| Quadratic ascendant from a to b | $\begin{cases} 0 & x < a \\ \left(\frac{x-a}{b-a}\right)^2 & a \leq x \leq b \\ 1 & x > b \end{cases}$ | |
| Quadratic parabola from a to b | $\begin{cases} 0 & x < a \\ 1 - \frac{\left(x - \frac{a+b}{2}\right)^2}{b-a} & a \leq x \leq b \\ 0 & x > b \end{cases}$ | |

FIG. 29
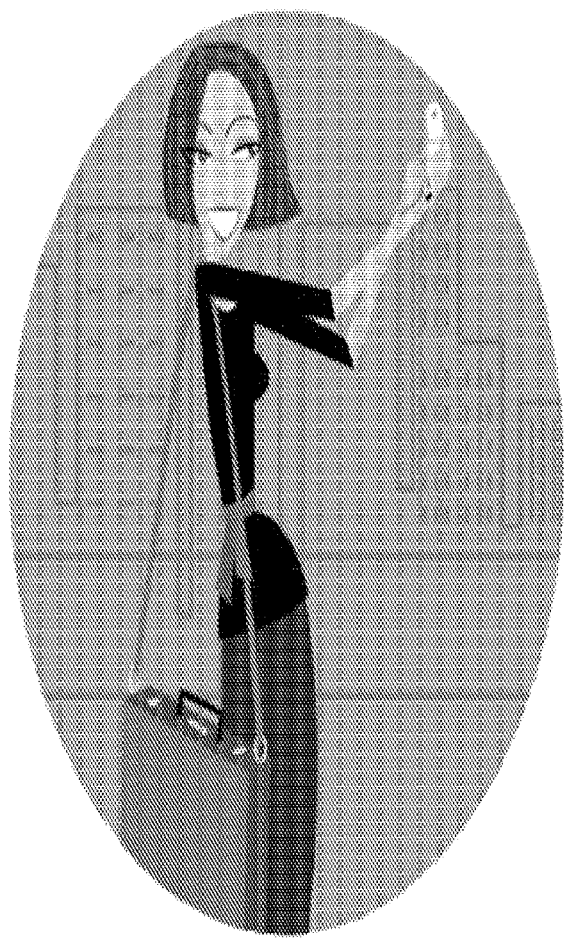
USER PROFILE ID: ABC123
DATE: MARCH 2, 2012
TIME: 11:32 AM
WEATHER: SUNNY
SPEED: 0.8 KPH
LOCATION: LAT 40.52202,
LONG -79.84180
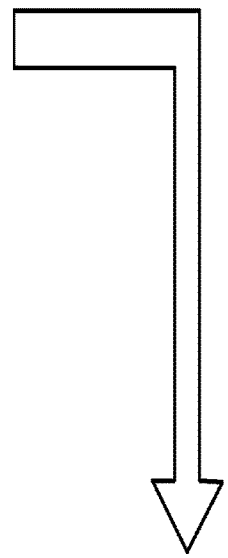
RANKING SYSTEM

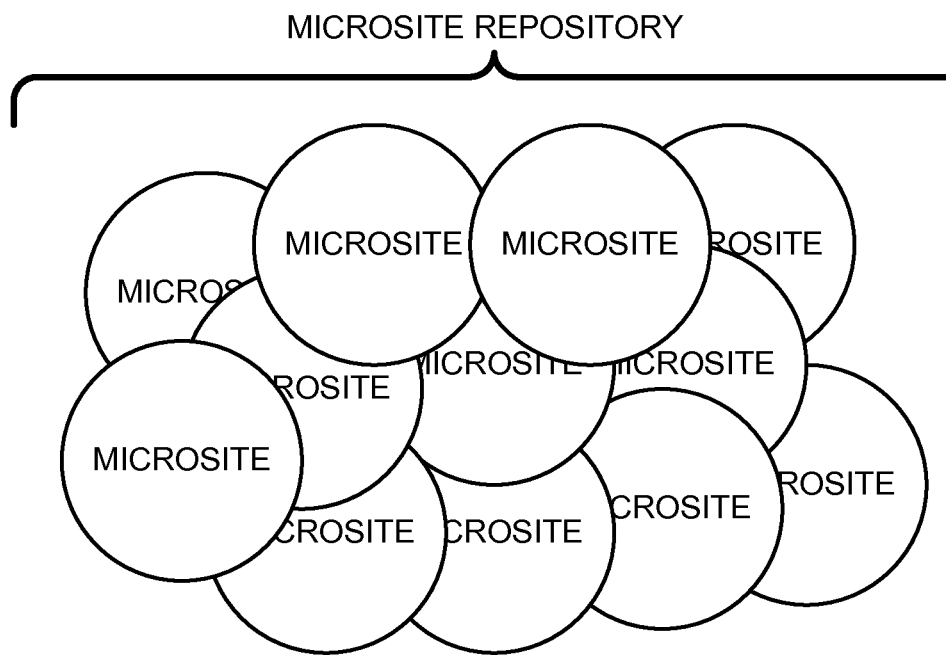
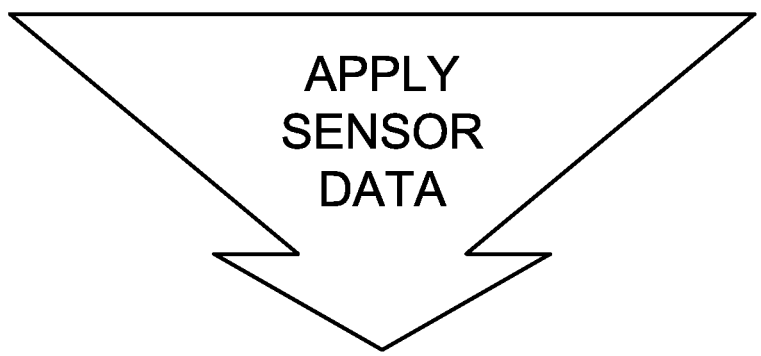
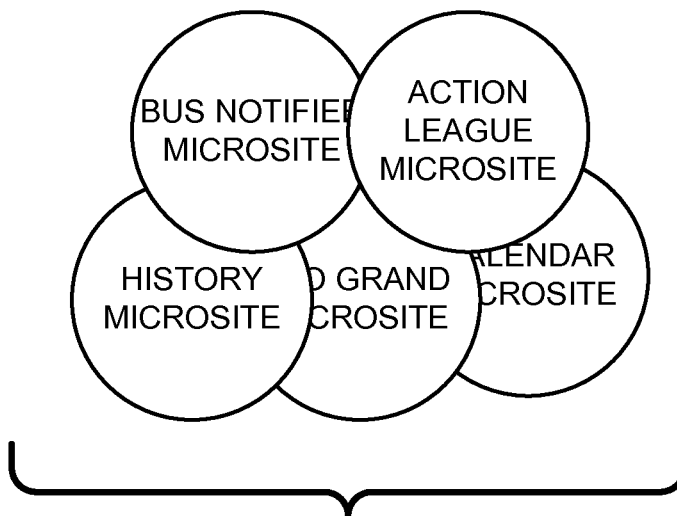
FIG. 30

3820 ↘
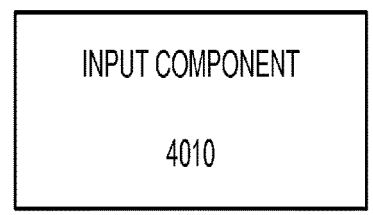
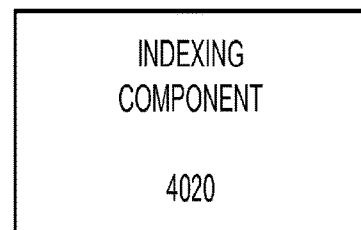
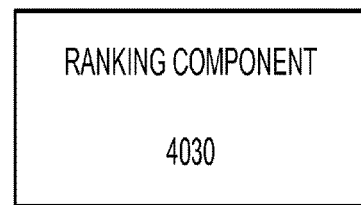
FIG. 40

SELECTING, RANKING, AND/OR PRESENTING MICROSITE CONTENT

BACKGROUND

Many techniques are available to users today to find information on the World Wide Web ("web"). For example, users often use web browsers and/or search engines to find information of interest.

Another way that users can obtain information is via push services. Push services are often based on information preferences expressed in advance. For example, a user might subscribe to various information channels. Whenever new content is available on one of those information channels, a server pushes that information to the user.

SUMMARY

According to some possible implementations, a method may include receiving, by at least one of one or more server devices, a network address for a microsite; providing, by at least one of the one or more server devices and after receiving the network address for the microsite, an interface that allows a user to specify criteria that indicate when microsites are to be provided to user devices; receiving, by at least one of the one or more server devices and via the interface, criteria for the microsite, where the received criteria may specify when the microsite is to be provided to the user devices for rendering; associating, by at least one of the one or more server devices, the network address with the received criteria; receiving, by at least one of the one or more server devices, sensor data from a user device; determining, by at least one of the one or more server devices, that the sensor data satisfies the received criteria; and providing, by at least one of the one or more server devices and to the user device, the network address based on determining that the sensor data satisfies the received criteria. Providing the network address may permit the user device to obtain the microsite using the network address.

In some possible implementations, the interface may include a list of categories of criteria. Receiving the criteria for the microsite may include receiving selection of the criteria from the list of categories of criteria.

In some possible implementations, the list of categories of criteria may include one or more of a category relating to a speed at which a user device is moving, a category relating to a geographical location of a user device, a category relating to a manner in which a user device is being moved, a category relating to time or a time range, a category relating to a date or a date range, a category relating to a mode of transportation associated with a movement of a user device, a category relating to a sound detected by a user device, a category relating to an event relating to a user device, a category relating to detection of a device within a distance of a user device, or a category relating to a person within a distance of a user device.

In some possible implementations, the interface may include a first area and a second area, where the first area includes the list of categories of criteria, and the second area includes an area that is populated with a criterion based on a selection of a category, in the list of categories of criteria.

In some possible implementations, receiving the first criteria may include receiving, via the interface, information for combining a first criterion and a second criterion, using a Boolean operator, to form the criteria for the microsite.

In some possible implementations, associating the network address with the received criteria may include associating the network address with the received criteria in an index. Determining that the sensor data satisfies the received criteria may include determining that the sensor data satisfies the received criteria using the index.

In some possible implementations, the user device includes a watch.

In some possible implementations, a system may include one or more server devices to receive information identifying a microsite; provide, after receiving the information identifying the microsite, an interface that is configured to receive criteria that dictate when microsites are to be provided to user devices; receive, via the interface, particular criteria for the microsite, where the particular criteria may specify when the microsite is to be provided to the user devices; associate, in a memory, the information identifying the microsite with the particular criteria; receive sensor data from a user device; determine that the sensor data satisfies the particular criteria; and provide, to the user device and based on determining that the sensor data satisfies the particular criteria, information that facilitate rendering of the microsite by the user device.

In some possible implementations, the interface may include a list of categories of criteria to be used in connection with the microsites.

In some possible implementations, the list of categories of criteria may include one or more of a category relating to a speed at which a user device is moving, a category relating to a geographical location of a user device, a category relating to a manner in which a user device is being moved, a category relating to time or a time range, a category relating to a date or a date range, a category relating to a mode of transportation associated with a movement of a user device, a category relating to a sound detected by a user device, a category relating to an event relating to a user device, a category relating to detection of a device within a distance of a user device, or a category relating to a person within a distance of a user device.

In some possible implementations, the interface may include a first area and a second area, where the first area may include the list of categories of criteria, and the second area may include an area that is populated based on a selection of a category, in the list of categories of criteria.

In some possible implementations, when receiving the particular criteria, at least one of the one or more server devices may receive, via the interface, information for combining a first criterion and a second criterion, using a Boolean operator, to form the particular criteria.

In some possible implementations, when associating the information identifying the microsite, with the particular criteria, at least one of the one or more server devices may associate the information identifying the microsite with the particular criteria in an index. When determining that the sensor data satisfies the particular criteria, at least one of the one or more server devices may determine that the sensor data satisfies the particular criteria using the index.

In some possible implementations, the user device includes a watch.

In some possible implementations, a non-transitory computer-readable medium for storing instructions. The instructions may include a group of instructions, which, when executed by one or more processors, cause the one or more processors to receive information identifying a microsite; provide, after receiving the information identifying the microsite, an interface that is configured to receive criteria that dictate when microsites are to be provided to user devices; receive, via the interface, particular criteria for the microsite, where the particular criteria may specify when the microsite is to be provided to the user devices; associate, in an index, the information identifying the microsite with the particular criteria; receive sensor data from a user device; and compare the sensor data and the particular criteria to determine whether to provide the information identifying the microsite to the user device.

In some possible implementations, the interface may include a list of categories of criteria to be used in connection with the microsites.

In some possible implementations, the list of categories of criteria may include one or more of a category relating to a speed at which a user device is moving, a category relating to a geographical location of a user device, a category relating to a manner in which a user device is being moved, a category relating to time or a time range, a category relating to a date or a date range, a category relating to a mode of transportation associated with a movement of a user device, a category relating to a sound detected by a user device, a category relating to an event relating to a user device, a category relating to detection of a device within a distance of a user device, or a category relating to a person within a distance of a user device.

In some possible implementations, the interface may include a first area and a second area, where the first area may include the list of categories of criteria, and the second area may include an area that is populated based on a selection of a category, in the list of categories of criteria.

In some possible implementations, one or more instructions, of the group of instructions, to receive the particular criteria may include one or more instructions to receive, via the interface, information for combining a first criterion and a second criterion, using a Boolean operator, to form the particular criteria.

In some possible implementations, the user device includes a watch.

According to some possible implementations, a method may include receiving first sensor data associated with a user device; receiving user profile data associated with a user of the user device; sending, independent of input of the user of the user device, the first sensor data and the user profile data to a ranking system; receiving, from the ranking system, information regarding a list of microsites identified based on the first sensor data or the user profile data; sending, to a server, a request for a microsite in the list of microsites, the request including second sensor data; receiving, from the server, content associated with the microsite, the content being based on the second sensor data; and presenting the content for display on the user device.

According to some possible implementations, sending the first sensor data and the user profile data, receiving the information regarding the list of microsites, sending the request for the microsite, receiving the content associated with the microsite, and presenting the content for display may all be performed independent of input of the user of the user device.

According to some possible implementations, sending the first sensor data and the user profile data, receiving the information regarding the list of microsites, sending the request for the microsite, receiving the content associated with the microsite, and presenting the content for display may all be performed without receiving a request for the microsite from the user of the user device.

According to some possible implementations, the user device is a watch, and where presenting the content for display may include providing the content on a display associated with the watch.

According to some possible implementations, the information regarding the list of microsites may include, for the microsite in the list of microsites, a network address of the microsite and a list of sensors relevant to the microsite, and where the method may further include determining the second sensor data based on the list of sensors.

According to some possible implementations, sending the request for the microsite may include using the network address to obtain the content, associated with the microsite, from the server.

According to some possible implementations, presenting the content for display may include pushing the content to a display associated with the user device so as to override any content already on the display.

According to some possible implementations, presenting the content for display may include determining an appropriate time to provide the content for display, and presenting the content for display at the appropriate time.

According to some possible implementations, a system may include one or more user devices to obtain first sensor data associated with the one or more user devices; receive user profile data associated with a user of the one or more user devices; send, independent of input of the user of the one or more user devices, the first sensor data and the user profile data to a ranking system; receive, from the ranking system, information regarding a list of microsites identified based on at least one of the first sensor data or the user profile data; send, to a server, a request for a microsite in the list of microsites, the request including second sensor data; receive, from the server, content associated with the microsite, the content being based on the second sensor data; and present the content for display on one of the one or more user devices.

According to some possible implementations, the one or more user devices may send the first sensor data and the user profile data, receive the information regarding the list of microsites, send the request for the microsite, receive the content associated with the microsite, and present the content for display independent of input of the user of the one or more user devices.

According to some possible implementations, the one or more user devices may send the first sensor data and the user profile data, receive the information regarding the list of microsites, send the request for the microsite, receive the content associated with the microsite, and present the content for display without receiving a request for the microsite from the user of the one or more user devices.

According to some possible implementations, one of the one or more user devices is a watch, and where the watch may provide the content on a display associated with the watch.

According to some possible implementations, the information regarding the list of microsites may include, for the microsite in the list of microsites, a network address of the microsite and a list of sensors relevant to the microsite, where at least one of the one or more user devices may determine the second sensor data based on the list of sensors, and where at least one of the one or more user devices, when sending the request for the microsite, may use the network address to obtain the content, associated with microsite, from the server.

According to some possible implementations, at least one of the one or more user devices, when presenting the content for display, may push the content to a display associated with the one of the one or more user devices so as to override any content already on the display.

According to some possible implementations, the one or more user devices may include a watch and a smart phone.

According to some possible implementations, a computer-readable medium may include a group of instructions which, when executed by one or more processors of a user device, may cause the one or more processors to obtain first sensor data associated with the user device; store user profile data associated with a user of the user device; send the first sensor data and the user profile data to a ranking system; receive, from the ranking system, information regarding a list of microsites identified based on the first sensor data and the user profile data, where the information regarding the list of microsites may include, for each microsite in the list of microsites, a network address for the microsite and a list of sensors relevant to the microsite; determine, based on the list of sensors, second sensor data; send, to a server, a request for a particular microsite in the list of microsites, where the request may include the network address for the particular microsite and the second sensor data; receive, from the server, content associated with the particular microsite, where the content may be based on the second sensor data; and present the content for display on the user device.

According to some possible implementations, instructions, of the group of instructions which cause the one or more processors to send the first sensor data and the user profile data, receive the information regarding the list of microsites, determine the second sensor data, send the request for the particular microsite, receive the content associated with the particular microsite, and present the content for display, may all be executed independent of input of the user of the user device.

According to some possible implementations, instructions, of the group of instructions which cause the one or more processors to send the first sensor data and the user profile data, receive the information regarding the list of microsites, determine the second sensor data, send the request for the particular microsite, receive the content associated with the particular microsite, and present the content for display, may all be executed without receiving a request for the microsite from the user of the user device.

According to some possible implementations, one or more instructions, of the group of instructions, to cause the one or more processors to present the content for display may include one or more instructions to push the content to a display associated with the user device so as to override any content already on the display.

According to some possible implementations, the user device is a watch, and where one or more instructions, of the group of instructions, to cause the one or more processors to present the content for display may include one or more instructions to push the content to a display associated with the watch.

According to some possible implementations, a method may include storing information regarding a group of microsites, where the information may include triggering criteria, for each microsite of the group of microsites, that indicate when the microsite is relevant; receiving, from a user device, sensor data and user profile data, where the sensor data may be associated with the user device, and the user profile data may be associated with the user device or a user of the user device; identifying a relevant microsite, from the group of microsites, based on the triggering criteria and at least one of the sensor data or the user profile data; generating a score for the relevant microsite based on a matching of the at least one of the sensor data or the user profile data to the triggering criteria; and calculating a total score based on the score and user activity data or friend activity data, where the user activity data may relate to user activity of the user relative to the relevant microsite, and the friend activity data may relate to user activity of one or more social contacts, associated with the user, relative to the relevant microsite. The method may also include determining, based on the total score, that microsite information, associated with the relevant microsite, is to be provided to the user device; and providing, based on the determination, the microsite information to the user device.

According to some possible implementations, the information regarding the group of microsites may include, for the relevant microsite, a network address associated with the relevant microsite, the triggering criteria for the relevant microsite, and a list of sensors applicable to the relevant microsite, and where providing the microsite information to the user device may include outputting, to the user device, the network address associated with the relevant microsite and the list of sensors applicable to the relevant microsite, where the user device may use the network address and the list of sensors to obtain content for the relevant microsite.

According to some possible implementations, identifying the relevant microsite may include matching the sensor data or the user profile data to the triggering criteria for the group of microsites to identify a group of relevant microsites from the group of microsites, the group of relevant microsites including the relevant microsite.

According to some possible implementations, the method may further include determining popularity data relating to a measure of popularity, of the relevant microsite, for a group of users, and where calculating the total score may include generating the total score based on the score, the popularity data, and at least one of the user activity data or the friend activity data.

According to some possible implementations, the friend activity data may include a first type of friend activity data and a second type of friend activity data, and where the method may further include calculating a first score for the first type of friend activity data; calculating a second score for the second type of friend activity data; and calculating a third score based on the first score and the second score, and where calculating the total score may include generating the total score based on the score and the third score.

According to some possible implementations, receiving the sensor data and the user profile data, identifying the relevant microsite, generating the score for the relevant microsite, calculating the total score, determining that the microsite information is to be provided to the user device, and providing the microsite information may all be performed independent of input of the user.

According to some possible implementations, determining that the microsite information is to be provided to the user device includes determining that the total score, for the relevant microsite, satisfies a threshold, and determining, based on determining that the total score satisfies the threshold, that the microsite information is to be provided to the user device.

According to some possible implementations, a computer-readable medium may include a group of instructions which, when executed by one or more processors, cause the one or more processors to store information regarding a group of microsites, where the information may include triggering criteria, for each microsite of the group of microsites, that indicate when the microsite is relevant; receive, from a user device, sensor data and user profile data, where the sensor data may be associated with the user device, and the user profile data may be associated with the user device or a user of the user device; identify a relevant microsite, from the group of microsites, based on the triggering criteria and at least one of the sensor data or the user profile data; generate a score for the relevant microsite based on a matching of the at least one of the sensor data or the user profile data to the triggering criteria; calculate a total score based on the score and popularity data, user activity data, or friend activity data, where the popularity data may relate to a measure of popularity of the relevant microsite, the user activity data may relate to user activity of the user relative to the relevant microsite, and the friend activity data may relate to user activity of one or more social contacts, associated with the user, relative to the relevant microsite; determine, based on the total score, that microsite information, associated with the relevant microsite, is to be provided to the user device; and provide, based on the determination, the microsite information to the user device.

According to some possible implementations, the information regarding the group of microsites may include, for the relevant microsite, a network address associated with the relevant microsite, the triggering criteria for the relevant microsite, and a list of sensors applicable to the relevant microsite, and where one or more instructions, of the group of instructions, to provide the microsite information to the user device may include one or more instructions to output, to the user device, the network address associated with the relevant microsite and the list of sensors applicable to the relevant microsite, where the user device may use the network address and the list of sensors to obtain content for the relevant microsite.

According to some possible implementations, the triggering criteria, for the relevant microsite, may be represented as a Boolean expression including a first criterion and a second criterion, and where one or more instructions, of the group of instructions, to identify the relevant microsite may include one or more instructions to match the sensor data or the user profile data to the Boolean expression, including the first criterion and the second criterion, to determine that the triggering criteria is satisfied.

According to some possible implementations, one or more instructions, of the group of instructions, to calculate the total score may include one or more instructions to generate the total score based on the score, the user activity data, and the friend activity data.

According to some possible implementations, the user activity data may include a first type of user activity data and a second type of user activity data, where the group of instructions may further include one or more instructions to calculate a first score for the first type of user activity data; one or more instructions to calculate a second score for the second type of user activity data; and one or more instructions to calculate a third score based on the first score and the second score, and where one or more instructions, of the group of instructions, to calculate the total score may include one or more instructions to generate the total score based on the score and the third score.

According to some possible implementations, the group of instructions are executed by the one or more processors without receiving a request for the relevant microsite from the user.

According to some possible implementations, the triggering criteria, for the relevant microsite, may include a first criterion and a second criterion, and where one or more instructions, of the group of instructions, to generate the score for the relevant microsite may include one or more instructions to calculate a first score for the first criterion, one or more instructions to calculate a second score for the second criterion, and one or more instructions to calculate the score based on the first score and the second score.

According to some possible implementations, a system may include one or more server devices to store information regarding a group of microsites, where the information may include triggering criteria, for each microsite of the group of microsites, that indicate when the microsite is relevant; receive, from a user device, sensor data and user profile data, where the sensor data may be associated with the user device, and the user profile data may be associated with the user device or a user of the user device; identify a relevant microsite, from the group of microsites, based on the triggering criteria and at least one of the sensor data or the user profile data; generate a score for the relevant microsite based on a matching of the at least one of the sensor data or the user profile data to the triggering criteria; calculate a total score based on the score, user activity data, and friend activity data, where the user activity data may relate to user activity of the user relative to the relevant microsite, and the friend activity data may relate to user activity of one or more social contacts, associated with the user, relative to the relevant microsite; determine, based on the total score, that microsite information, associated with the relevant microsite, is to be provided to the user device; and provide, based on the determination, the microsite information to the user device.

According to some possible implementations, the information regarding the group of microsites may include, for the relevant microsite, a network address associated with the relevant microsite, the triggering criteria for the relevant microsite, and a list of sensors applicable to the relevant microsite, and where, when providing the microsite information to the user device, at least one of the one or more server devices may output, to the user device, the network address associated with the relevant microsite and the list of sensors applicable to the relevant microsite, where the user device may use the network address and the list of sensors to obtain content for the relevant microsite.

According to some possible implementations, the triggering criteria, for the relevant microsite, may be represented as a Boolean expression including a first criterion and a second criterion, and where, when identifying the relevant microsite, at least one of the one or more server devices may match the sensor data or the user profile data to the Boolean expression, including the first criterion and the second criterion, to determine that the triggering criteria is satisfied.

According to some possible implementations, the one or more server devices may determine popularity data relating to a measure of popularity, of the relevant microsite, for a group of users, and where, when calculating the total score, at least one of the one or more server devices may generate the total score based on the score, the popularity data, the user activity data, and the friend activity data.

According to some possible implementations, when determining that the microsite information is to be provided to the user device, at least one of the one or more server devices may determine that the total score, for the relevant microsite, satisfies a threshold, and determine, based on determining that the total score satisfies the threshold, that the microsite information is to be provided to the user device.

According to some possible implementations, the triggering criteria, for the relevant microsite, may include a first criterion and a second criterion, and where, when generating the score for the relevant microsite, at least one of the one or more server devices may calculate a first score for the first criterion, calculate a second score for the second criterion, and calculate the score based on the first score and the second score.

According to some possible implementations, a method may include receiving, by at least one of one or more server devices, sensor data from a user device; identifying, by at least one of the one or more server devices and based on the received sensor data, a group of microsites; determining, by at least one of the one or more server devices, that a particular microsite, in the group of microsites, has been purchased by a user associated with the user device; and creating, by at least one of the one or more server devices, a list that includes information identifying the microsites in the group of microsites. The information identifying the particular microsite may be located, within the list, at a location other than a top of the list. The method may further include modifying, by at least one of the one or more server devices and based on the determining, the list, to create a modified list, by moving the information identifying the particular microsite to the top of the list; and providing, by at least one of the one or more server devices, to the user device, and from the modified list, the information identifying the particular microsite that has been purchased. The information identifying the particular microsite may permit the user device to obtain a content of the particular microsite that has been purchased.

According to some possible implementations, creating the list may include generating a score for each microsite in the group of microsites, and creating the list that includes information identifying the microsites in the group of microsites. The list may be sorted based on the generated scores.

According to some possible implementations, providing the information identifying the particular microsite may include providing information identifying only the particular microsite, of the group of microsites, to the user device.

According to some possible implementations, determining that the particular microsite has been purchased may include receiving, from the user device, information identifying microsites that have been purchased, where the information identifying microsites that have been purchased including information identifies the particular microsite that has been purchased; and using the received information to identify, in the group of microsites, the particular microsite that has been purchased.

According to some possible implementations, determining that the particular microsite has been purchased may include determining that two or more microsites, in the group of microsites, have been purchased, where the two or more microsites include the particular microsite. Creating the list may include generating a score for each microsite in the group of microsites, and creating the list that includes the information identifying the microsites in the group of microsites, where the list is sorted in an order based on the generated scores. Modifying the list may include moving the information identifying the two or more microsites to the top of the list, and sorting the information identifying the two more microsites in an order, at the top of the list, based on information from the user.

According to some possible implementations, determining that the particular microsite has been purchased may include determining that two or more microsites, in the group of microsites, have been purchased, where the two or more microsites include the particular microsite. Creating the list may include generating a score for each microsite in the group of microsites, and creating the list that includes the information identifying the microsites in the group of microsites, where the list is sorted in an order based on the generated scores. Modifying the list may include moving the information identifying the two or more microsites to the top of the list, and sorting the information identifying the two more microsites in an order, at the top of the list, based on the generated scores.

According to some possible implementations, determining that the particular microsite has been purchased may include determining that two or more microsites, in the group of microsites, have been purchased, where the two or more microsites include the particular microsite. Creating the list may include generating a score for each microsite in the group of microsites, and creating the list that includes the information identifying the microsites in the group of microsites, where the list is sorted in an order based on the generated scores. Modifying the list may include moving the information identifying the two or more microsites to the top of the list, and sorting the information identifying the two more microsites in an order, at the top of the list, based on one or more of dates on which the two or more microsites were purchased or times at which the two or more microsites were purchased.

According to some possible implementations, the method may further include receiving, from the user device, criteria for the particular microsite, where the criteria, for the particular microsite, dictate when the particular microsite is to be provided to the user device. Identifying the group of microsites may include comparing the sensor data to the received criteria.

According to some possible implementations, a system may include one or more server devices to receive sensor data from a user device; identify, based on the received sensor data, a group of microsites; determine that a particular microsite, in the group of microsites, has been purchased by a user associated with the user device; create a list that includes information identifying the microsites in the group of microsites, where the information identifying the particular microsite is located, within the list, at a location other than a top of the list; modify, based on determining that the particular microsite has been purchased, the list, to form a modified list, by placing the information identifying the particular microsite that has been purchased at the top of the list; and provide, to the user device and from the modified list, at least the information identifying the particular microsite that has been purchased.

According to some possible implementations, when creating the list, at least one of the one or more server devices may generate a score for each microsite in the group of microsites, and create the list that includes information identifying the microsites in the group of microsites, where the list is sorted based on the generated scores.

According to some possible implementations, when providing the at least the information identifying the particular microsite, at least one of the one or more server devices may provide information identifying only the particular microsite, of the group of microsites, to the user device.

According to some possible implementations, when determining that the particular microsite has been purchased, at least one of the one or more server devices may receive, from the user device, information identifying microsites that have been purchased, where the information identifying microsites that have been purchased include the information identifying the particular microsite that has been purchased; and use the received information to identify, in the group of microsites, the particular microsite that has been purchased.

According to some possible implementations, when determining that the particular microsite has been purchased, at least one of the one or more server devices may determine that two or more microsites, in the group of microsites, have been purchased, where the two or more microsites include the particular microsite. When creating the list, at least one of the one or more server devices may generate a score for each microsite in the group of microsites, and create the list that includes information identifying the microsites in the group of microsites, where the list is sorted in an order based on the generated scores. When modifying the list, at least one of the one or more server devices may move the information identifying the two or more microsites to the top of the list, and sort the information identifying the two more microsites in an order, at the top of the list, based on information from the user.

According to some possible implementations, when determining that the particular microsite has been purchased, at least one of the one or more server devices may determine that two or more microsites, in the group of microsites, have been purchased, where the two or more microsites include the particular microsite. When creating the list, at least one of the one or more server devices may generate a score for each microsite in the group of microsites, and create the list that includes the information identifying the microsites in the group of microsites, where the list is sorted in an order based on the generated scores. When modifying the list, at least one of the one or more server devices may move the information identifying the two or more microsites to the top of the list, and sort the information identifying the two more microsites in an order, at the top of the list, based on the generated scores.

According to some possible implementations, when determining that the particular microsite has been purchased, at least one of the one or more server devices may determine that two or more microsites, in the group of microsites, have been purchased, where the two or more microsites include the particular microsite. When the creating the list, at least one of the one or more server devices may generate a score for each microsite in the group of microsites, and create the list that includes the information identifying the microsites in the group of microsites, where the list is sorted in an order based on the generated scores. When modifying the list, at least one of the one or more server devices may move the information identifying the two or more microsites to the top of the list, and sort the information identifying the two more microsites in an order, at the top of the list, based on one or more of dates on which the two or more microsites were purchased or times at which the two or more microsites were purchased.

According to some possible implementations, at least one of the one or more server devices may receive, from the user device, criteria for the particular microsite, where the received criteria dictate when the particular microsite is to be provided to the user device. When identifying the group of microsites, at least one of the one or more server devices may compare the sensor data to the received criteria.

According to some possible implementations, the user device includes a watch.

According to some possible implementations, a non-transitory computer-readable medium for storing instructions. The instructions may include a group of instructions, which, when executed by one or more processors, cause the one or more processors to receive sensor data from a user device; identify, based on the received sensor data, a group of microsites; generate a score for each microsite in the group of microsites; create a list that includes information identifying the microsites in the group of microsites, where the list is sorted based on the generated scores; determine that a particular microsite, in the group of microsites, has been purchased by a user associated with the user device, where the information identifying the particular microsite is not at a top of the list; move, based on determining that the particular microsite has been purchased, the information identifying the particular microsite to the top of the list to create a modified list; and provide, to the user device and from the modified list, the information identifying the particular microsite that has been purchased.

According to some possible implementations, where one or more instructions, of the group of instructions, to determine that the particular microsite has been purchased may include one or more instructions to determine that two or more microsites, in the group of microsites, have been purchased, where the two or more microsites include the particular microsite. One or more instructions, of the group of instructions, to move the information identifying the particular microsite to the top of the list may include one or more instructions to move the information identifying the two or more microsites to the top of the list, and sort the information identifying the two more microsites in an order, at the top of the list, based on one of information received from the user, the generated scores, dates on which the two or more microsites were purchased, or the times at which the two or more microsites were purchased.

According to some possible implementations, the instructions may further include one or more instructions to receive, from the user device, criteria for the particular microsite, where the received criteria dictate when the particular microsite is to be provided to the user device. One or more instructions, of the group of instructions, to identify the group of microsites may include one or more instructions to compare the sensor data to the received criteria.

According to some possible implementations, a method, performed by data processing apparatus, may include receiving a request from a user device; selecting, based on the request, a content segment from a collection of content segments based on one or more parameters associated with each content segment, where the one or more parameters may include a popularity metric indicating a frequency of the content segment, where a respective popularity metric may be assigned to each content segment of the collection of content segments by a classifier, where the collection of content segments may be obtained from a group of sources; obtaining local search results using the selected content segment as a query; selecting a search result from the obtained search results; and providing information about the search result to the user device.

According to some possible implementations, the one or more parameters may include a timestamp of the request, identify a category associated with the request, or identify a geographic location of the user device that sent the request.

According to some possible implementations, the category may include a places category, a movies category, a shopping category, a health category, or a weather category.

According to some possible implementations, obtaining local search results may include performing a search using the respective category as a search filter.

According to some possible implementations, the method may further include determining, based on selecting a content segment from a collection of content segments, that the content segment satisfies a frequency threshold, where the frequency threshold may represent how often the content segment is queried.

According to some possible implementations, selecting the search result may include selecting a search result relevant to the selected content segment, where the search result may have a highest rank of the obtained search results.

According to some possible implementations, the popularity metric may be based on one or more parameters that indicate a number of similar content segments from the group of sources.

According to some possible implementations, a system may include a processor and a computer-readable medium coupled to the processor. The computer-readable medium may have instructions stored thereon, which, when executed by the processor, cause the processor to: receive a request from a user device; select, based on the request, a content segment from a collection of content segments based on one or more parameters associated with each content segment, where the one or more parameters may include a popularity metric indicating a frequency of the content segment, where a respective popularity metric may be assigned to each content segment of the collection of content segments by a classifier, where the collection of content segments may be obtained from a group of sources; obtain local search results using the selected content segment as a query; select a search result from the obtained search results; and provide information about the search result to the user device.

According to some possible implementations, the group of sources may include search queries or public data feeds.

According to some possible implementations, the processor, when obtaining the collection of content segments from the group of sources, may cluster content segments from the group of sources using a clustering mechanism, where the clustering mechanism may aggregate the content segments to remove content segments that are duplicates or have less than a threshold quantity of typographical differences.

According to some possible implementations, the processor, when obtaining the collection of content segments from the group of sources, may remove spam content from the content segments.

According to some possible implementations, the processor may be further configured to determine, based on selecting a content segment from a collection of content segments, that the content segment satisfies a local relevance score, where the local relevance score may represent how relevant the content segment is to local information.

According to some possible implementations, the selected search result may correspond to a business, and the information may identify operating hours of the business, a geographic location of the business, reviews of the business, or a name of the business.

According to some possible implementations, a computer-readable medium may have instructions stored thereon. The instructions may include a set of instructions which, when executed by one or more processors, cause the one or more processors to: receive a request from a user device; select, based on the request, a content segment from a collection of content segments based on one or more parameters associated with each content segment, where the one or more parameters may include a popularity metric indicating a frequency of the content segment, where a respective popularity metric may be assigned to each content segment of the collection of content segments by a classifier, where the collection of content segments may be obtained from a group of sources; obtain local search results using the selected content segment as a query; select a search result from the obtained search results; and provide information about the search result to the user device.

According to some possible implementations, the one or more parameters may include a timestamp of the request, identify a category, or identify a location of the user device that sent the request, and where one or more instructions, of the set of instructions to obtain local search results, may include one or more instructions to perform a search using a respective category as a search filter.

According to some possible implementations, one or more instructions, of the set of instructions, to obtain the collection of content segments from the group of sources, may include one or more instructions to cluster content segments from the group of sources using a clustering mechanism, where the clustering mechanism may aggregate the content segments to remove content segments that are duplicates or have less than a threshold quantity of typographical differences.

According to some possible implementations, the instructions may further include one or more instructions to determine, based on selecting a content segment from a collection of content segments, that the content segment satisfies a frequency threshold, where the frequency threshold may represent how often the content segment is queried.

According to some possible implementations, the instructions may further include one or more instructions to determine, based on selecting a content segment from a collection of content segments, that the content segment satisfies a local relevance score, where the local relevance score may represent how relevant the content segment is to local information.

According to some possible implementations, one or more instructions, of the set of instructions, to select the search result may include one or more instructions to select a search result relevant to the selected content segment, where the search result may have a highest rank of the obtained search results.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram of example functional components of the ranking system of FIG. 2;

FIG. 4 and FIG. 5 are flowcharts of example processes for setting criteria for triggering when microsite content is to be presented to a user device;

FIG. 24A, FIG. 24B, and FIG. 24C are examples of functions that may be used to generate real values based on matching sensor data and/or user profile data to triggering criteria;

FIG. 29, FIG. 30, FIG. 31, FIG. 32, FIG. 33, FIG. 34, FIG. 35, and FIG. 36 illustrate an example of identifying and presenting microsite content;

FIG. 40 is a diagram of example functional components of the ranking system of FIG. 38;

DETAILED DESCRIPTION

Figure 1A:
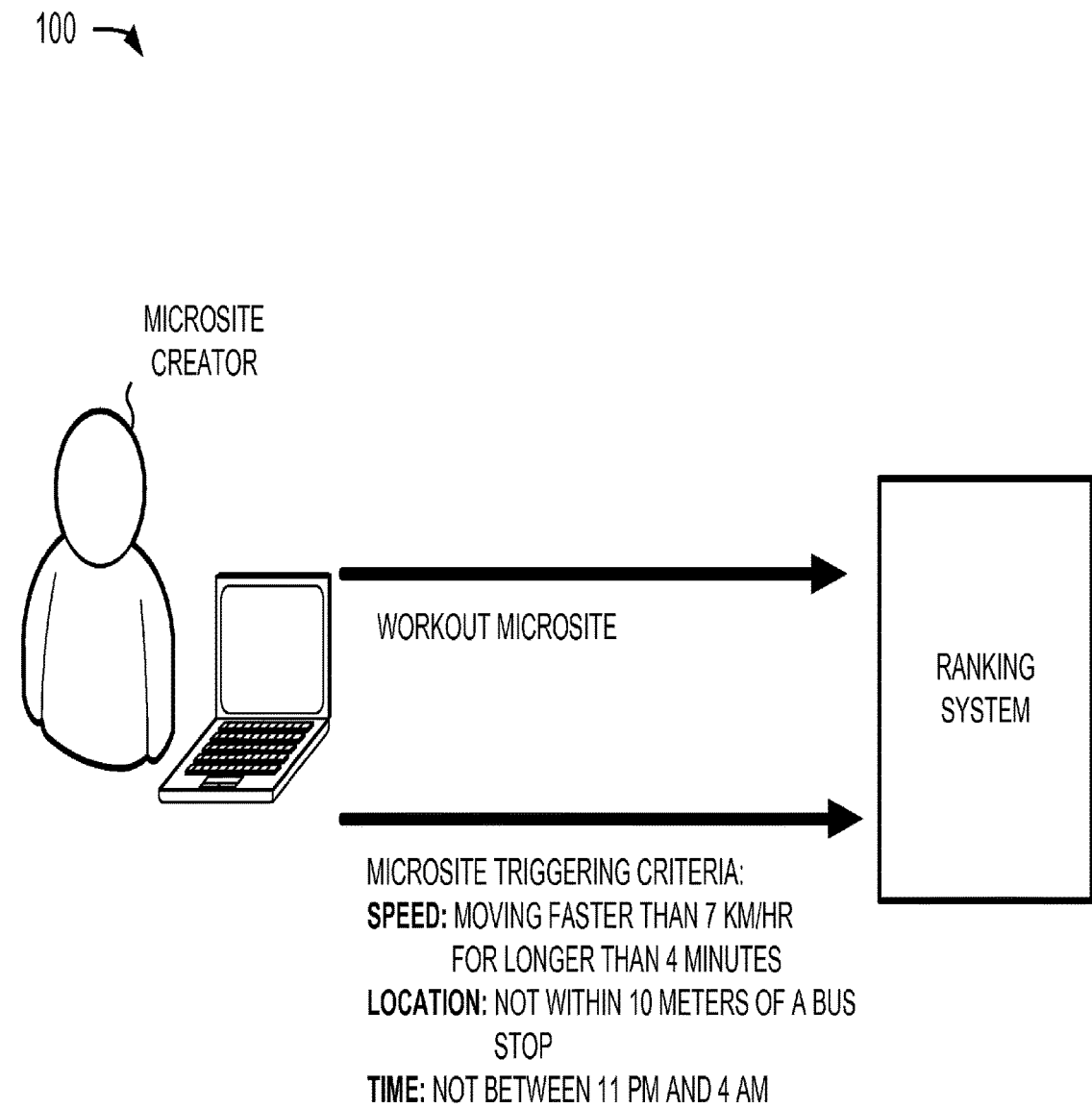
FIG. 1A, FIG. 1B, and FIG. 1C are diagrams illustrating an overview of an example implementation described herein.

The following detailed description refers to the accompanying drawings. The same reference numbers in different drawings may identify the same or similar elements.

In the description to follow, various examples of systems and methods relating to the presentation of microsites will be described. A microsite may be broadly defined as a mini-web page that may be presented based on a network address, such as a uniform resource locator (URL) or a uniform resource identifier (URI), associated with the microsite. As used herein, a microsite includes an amount of content that can be presented in a user-discernible format on a display of a watch or in a display area the size of the display of a watch. In some implementations, a microsite is configured to display less than 100, 50, or 20 words to a user at a time, and/or less than 1000, 500, or 300 characters. In some implementations, a microsite includes content, such as embedded instructions (e.g., Javascript), data, image information, or metadata.

While the descriptions, herein, are described in terms of presenting information regarding microsites, the description may also apply to presenting documents. A document, as the term is used herein, is to be broadly interpreted to include any machine-readable and machine-storable work product. A document may include, for example, an e-mail, a web site, a microsite, a file, a combination of files, one or more files with embedded links to other files, a news article, a blog, a discussion group forum, etc. In the context of the Internet, a common document is a web page. Web pages often include textual information and may include embedded information, such as meta information, images, hyperlinks, etc., and/or embedded instructions, such as Javascript.

For the described systems and methods, the users can control whether the programs or features collect user personal information (e.g., information about a user's social network, actions, activities, a user's preferences, or a user's current location), or the extent such information is collected or used. In addition, certain data may be treated in one or more ways before the data is stored or used, so that personally identifiable information is removed, encrypted, and/or otherwise protected for the user. Thus, the user may have control over how information about the user is collected and used by a server.

While the descriptions of the examples are presented separately from each other, the descriptions are interchangeable and combinable in various ways. Thus, some or all of one example may be combined with some or all of one or more other examples.

Example 1

A system and/or method, as described herein, may allow a creator of a microsite to specify criteria that dictates when the microsite is to be presented—e.g., pushed—to a user device. A ranking system may associate the specified criteria with information identifying the microsite in, for example, an index. The ranking system may subsequently receive sensor data from a user device. If the sensor data matches the specified criteria, the ranking system may identify the microsite as a candidate in determining which microsite content is to be presented to the user device. The microsite content may include information that may be useful to the user.

Figure 1B:
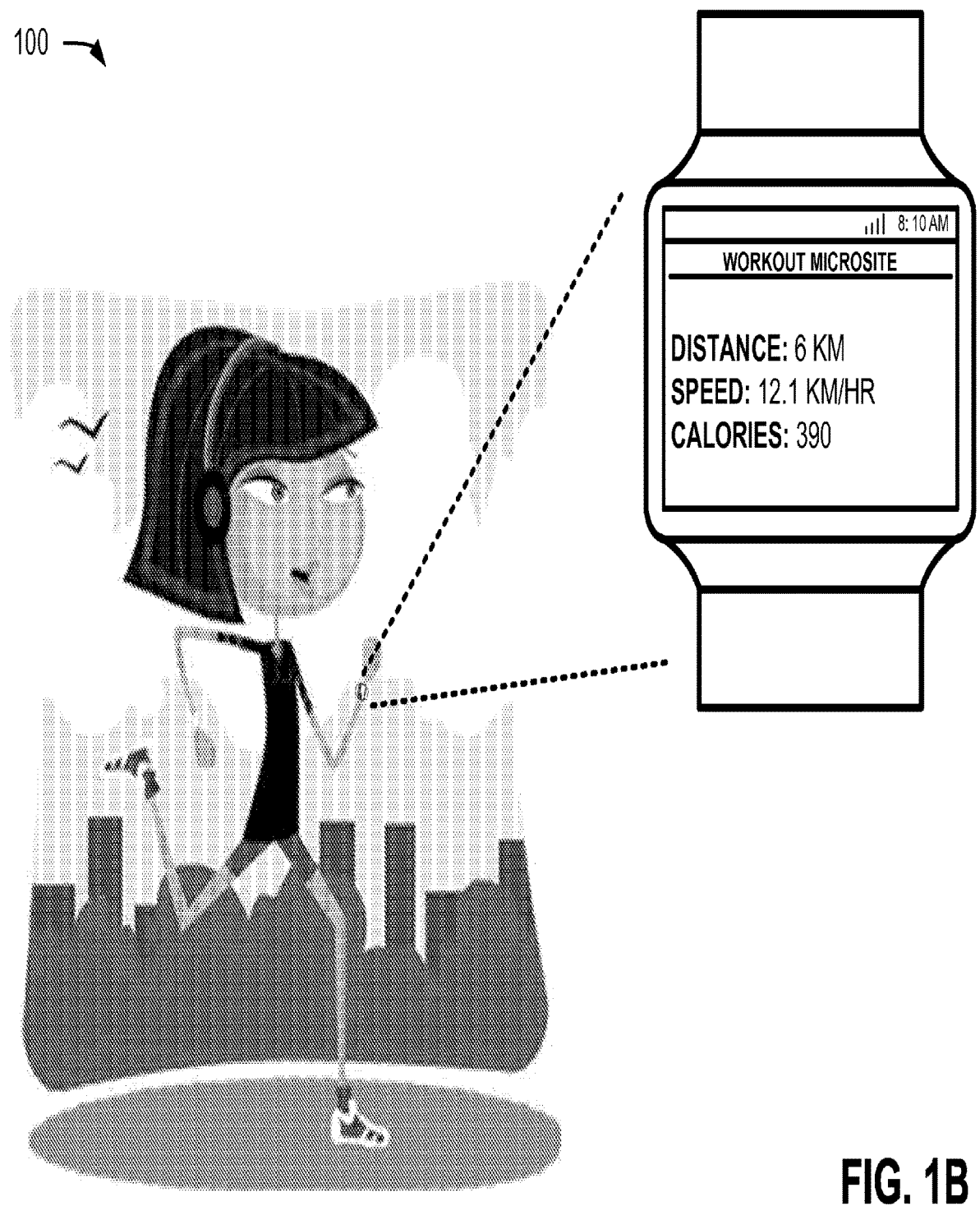
Figure 1C:
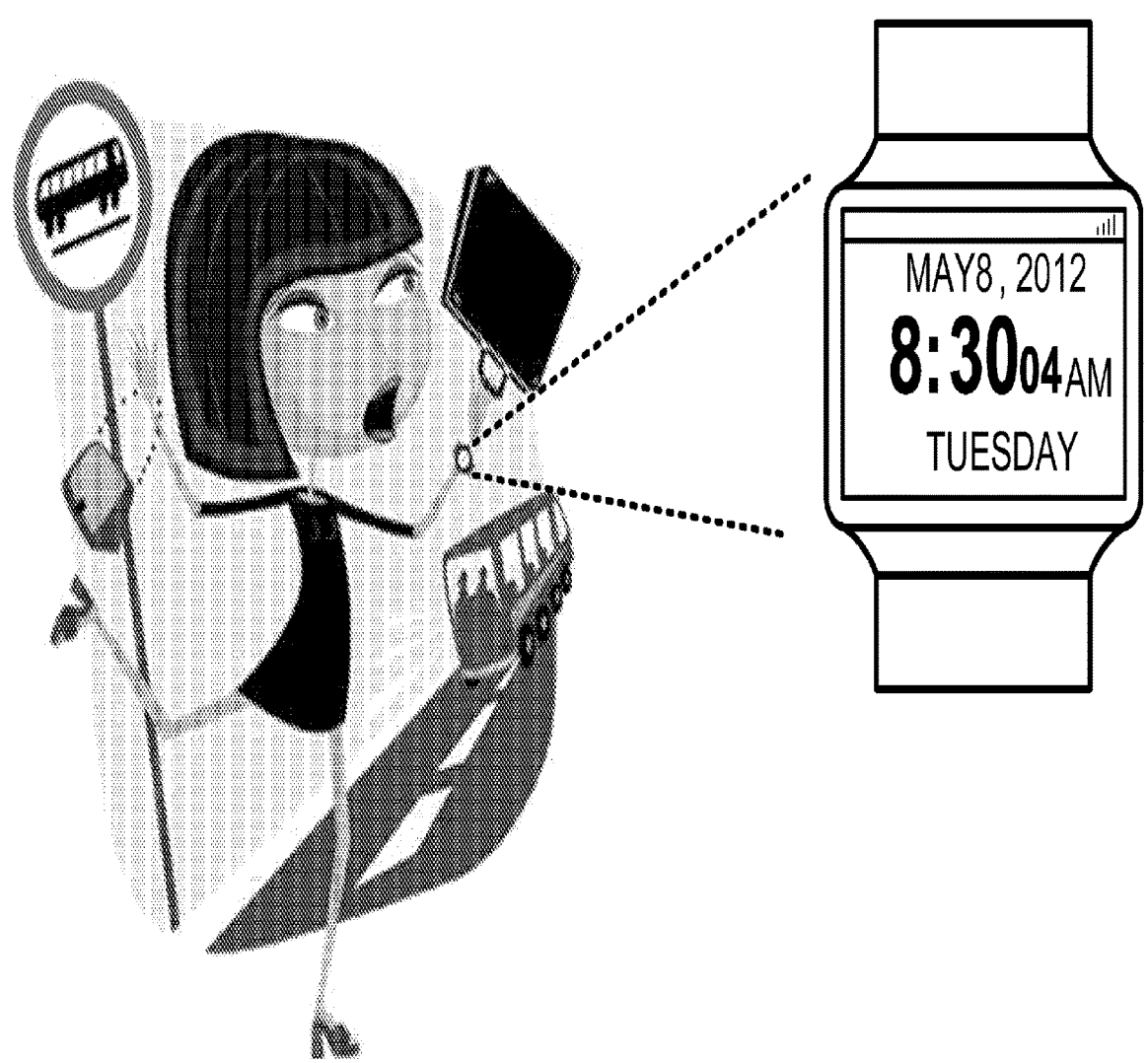

FIGS. 1A-1C are diagrams illustrating an overview 100 of an example implementation described herein. Assume that a microsite creator—e.g., a software engineer, a web developer, a designer, a group of software engineers, web developers, and/or designers, etc.—has designed a microsite relating to working out. For example, the workout microsite may provide a user, who has gone out for a run, with information regarding the distance that the user has run, the speed at which the user is running, and the number of calories that the user has burned. As shown in FIG. 1A, the creator may provide information identifying the workout microsite, such as a URL or a URI, to a ranking system. The creator may also specify, to the ranking system, triggering criteria, which dictate when the creator's workout microsite is to be presented to a user device. In the example of FIG. 1A, assume that the creator has specified three triggering criteria for presenting the workout microsite: (1) that the user must be moving faster than 7 kilometers per hour (km/hr) for more than 4 minutes; (2) that the user must not be within 10 meters of a bus stop; and (3) that the time must not be between 11 PM and 4 AM.

With reference to FIG. 1B, assume that a user, named Mary, is associated with a user device (shown as a watch in FIG. 1B) that is capable of receiving microsite content. Assume that Mary's watch periodically sends sensor data to the ranking system and that the sensor data includes information identifying a current time, information identifying a current geographic location of the watch, information identifying a speed at which the watch is currently moving (e.g., based on global positioning satellite (GPS) data), and/or other information. In the example of FIG. 1B, assume that Mary's watch sends, over a first period of time, first sensor data. Based on the first sensor data, assume that the ranking system determines that the current time at the geographic location of Mary's watch is 8:10 AM, that Mary's watch has been moving at a speed of greater than 7 km/hr for more than 4 minutes, and that the geographic location of Mary's watch is not within 10 meters of a bus stop. The ranking system may determine that the sensor data, from Mary's watch, satisfies the triggering criteria of the workout microsite. As a result, the ranking system may cause the workout microsite to be presented to Mary's watch, as illustrated in FIG. 1B.

With reference to FIG. 1C, assume that Mary's watch sends, over a second period of time, second sensor data. Based on the second sensor data, assume that the ranking system determines that the current time at the geographic location of Mary's watch is 8:30 AM, and that Mary's watch has been moving at a speed of greater than 7 km/hr for more than 4 minutes. In the example of FIG. 1C, however, assume that the ranking system determines that the geographic location of Mary's watch is within 10 meters of a bus stop. The ranking system may determine, as a result of the geographic location of Mary's watch being within 10 meters of a bus stop, that the sensor data, from Mary's watch, does not satisfy the criteria of the workout microsite. As a result, the ranking system may not cause the workout microsite to be presented to Mary's watch, as illustrated in FIG. 1C. In those situations where the ranking system does not identify any other microsites as relevant to the second sensor data, Mary's watch may, for example, simply display a clock.

Figure 2:
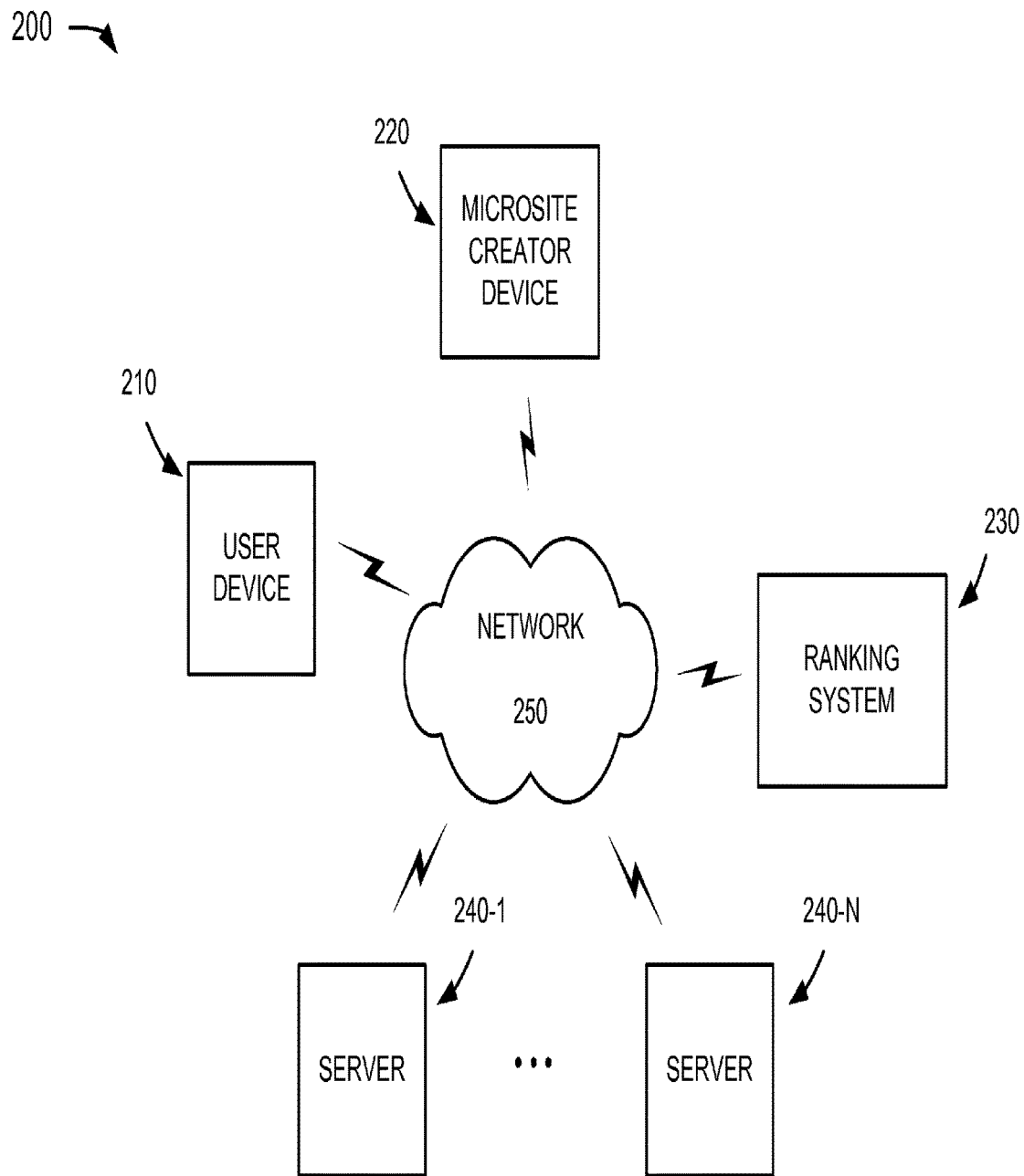
FIG. 2 is a diagram of an example environment in which systems and/or methods described herein may be implemented.

FIG. 2 is a diagram of an example environment 200 in which systems and/or methods described herein may be implemented. Environment 200 may include a user device 210 and a microsite creator device 220 connected to a ranking system 230, and multiple servers 240-1 through 240-N(where N>1) (referred to collectively as "servers 240" and, at times, individually, as "server 240") via a network 250.

User device 210 may include a client device, or a collection of client devices, that is capable of presenting a document on a display. Examples of user device 210 may include a smart phone, a personal digital assistant, a laptop, a tablet computer, a camera, a watch, a personal computer, and/or another type of device with the ability to display a microsite. In some implementations, user device 210 may include a browser via which a microsite may be presented on a display associated with user device 210.

Microsite creator device 220 may include a device via which a microsite creator may specify triggering criteria, for a microsite, that dictate when the microsite is to be presented, for display, on a user device 210. Examples of a microsite creator device 220 may include a personal computer, a laptop, a tablet computer, a smart phone, a personal digital assistant, and/or another type of device. In some implementations, microsite creator device 220 may include a browser that allows microsite creator device 220 to access ranking system 230 to specify the triggering criteria for a microsite.

Ranking system 230 may include a server device or a collection of server devices which may be co-located or remotely located. Ranking system 230 may identify microsites and index information associated with the microsites. Ranking system 230 may identify relevant microsites to present to a user device 210, based on, for example, context information received from user device 210 and triggering criteria for triggering the presentation of the microsites, and provide information regarding the relevant microsites to user device 210. In addition, ranking system 230 may provide one or more user interfaces, to microsite creator device 220, to allow for specification of triggering criteria for a microsite.

Server 240 may include a server device or a collection of server devices that may be co-located or remotely located. Any two or more of servers 240 may be implemented within a single, common server device or a single, common collection of server devices. Servers 240 may host documents, such as microsites. In some implementations, one or more of servers 240 may be affiliated with a same entity (e.g., party, organization, business, company, etc.) as ranking system 230. In some implementations, none of servers 240 may be affiliated with the same entity as ranking system 230.

While ranking system 230 is shown as separate from servers 240, it may be possible for ranking system 230 to perform one or more of the functions described as being performed by a server 240 and/or a server 240 to perform one or more of the functions described as being performed by ranking system 230. For example, ranking system 230 may host some or all of the microsites. Additionally, or alternatively, a user device 210 may host some of the microsites and/or perform one or more of the functions of ranking system 230.

Network 250 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. User device 210, microsite creator device 220, ranking system 230, and servers 240 may connect to network 250 via wired and/or wireless connections. In other words, any one of user device 210, microsite creator device 220, ranking system 230, and/or servers 240 may connect to network 250 via a wired connection, a wireless connection, or a combination of a wired connection and a wireless connection.

Although FIG. 2 shows example components of environment 200, in some implementations, environment 200 may include additional components, fewer components, different components, or differently arranged components than those depicted in FIG. 2. Additionally, or alternatively, one or more components of environment 200 may perform one or more tasks described as being performed by one or more other components of environment 200.

FIG. 3 is a diagram of example functional components of ranking system 230. In some implementations, the functional components, shown in FIG. 3, may be implemented by ranking system 230. In some implementations, one or more of the functional components, shown in FIG. 3, may be implemented by a system or device separate from ranking system 230, such as a user device 210 operating alone or in combination with ranking system 230. As shown in FIG. 3, ranking system 230 may include an input component 310, an indexing component 320, and a ranking component 330.

Input component 310 may identify microsites for use by ranking system 230. In some implementations, input component 310 may identify microsites through crawling. For example, input component 310 may include or interact with a crawler to locate microsites on a network, such as network 250. The crawler may follow links to locate documents on the network. Input component 310 may determine which documents are microsites by locating particular information on documents that are microsites. This particular information may include a piece of code that identifies the document as a microsite.

In some implementations, input component 310 may identify microsites via manual input. For example, input component 310 may provide a user interface via which microsite creators may provide information regarding microsites that the microsite creators have created. In some implementations, a microsite creator, via the user interface, may identify a network address, such as a URL or a URI, associated with a microsite. Additionally, or alternatively, the microsite creator, via the user interface, may upload the content of the microsite. The content of the microsite may be hosted by ranking system 230 or a device separate from ranking system 230, such as a server 240.

Input component 310 may also provide a user interface that allows microsite creators to specify other information in relation to a microsite. For example, the user interface may allow a microsite creator to specify triggering criteria that dictate when the creator's microsite is to be presented—e.g., pushed—to a user device 210. In some implementations, the user interface may include a list of triggering criteria categories, such as a location category, a time category, a motion category, a transport mode category, a sound category, a date category, a device event category, an other devices category, a people category, a speed category, and/or other types of categories. The microsite creator may select from among the list of triggering criteria categories and provide parameters for specifying the triggering criteria for the microsite. Additionally, or alternatively, the user interface may allow the microsite creator to specify the triggering criteria for the microsite in other ways.

The location category may allow the microsite creator to specify criteria relating to a geographic location of a user device 210. As one example, a criterion under the location category may specify that the criterion is satisfied when a user device 210 is or is not at a particular geographic location. Additionally, or alternatively, a criterion under the location category may specify that the criterion is satisfied when a user device 210 is or is not within a certain distance of a geographic location. The geographic location may be specified, for example, as a particular geographic address, a particular set of geographic coordinates, a particular type of location, and/or in another manner. A type of location may be expressed generally, such as, for example, a bus stop, an airport, a gas station, a restaurant, etc., or more specifically, such as, for example, a particular type of restaurant or a particular restaurant, a particular country, state, city, or town, etc. As an example, a criterion, in the location category, may specify that the criterion is satisfied if sensor data, from a user device 210, indicates that user device 210 is within a park. As another example, a location criterion may specify that the criterion is satisfied if sensor data from a user device 210 indicates that user device 210 is not within 10 meters of a bus stop.

The time category may allow the microsite creator to specify criteria relating to a time or time range. As one example, a criterion under the time category may specify that the criterion is satisfied when the current time, at the geographic location of a user device 210, is or is not at a particular time, or is or is not within a particular time range. A time range may be expressed specifically, for example, using a start time and an end time, or more generally as, for example, day time, nighttime, morning, afternoon, evening, dinner time, lunch time, etc. As an example, a criterion, in the time category, may specify that the criterion is satisfied if sensor data from a user device 210 indicates that the current time, at the geographic location of user device 210, is not within a time range of 11 PM and 4 AM.

The motion category may allow the microsite creator to specify criteria relating to a motion of a user device 210. As one example, a criterion under the motion category may specify that the criterion is satisfied when user device 210 is or is not being moved in a particular motion. Examples of motions may include walking, running, driving in a car, riding on a train, etc. As an example, a criterion, in the motion category, may specify that the criterion is satisfied if sensor data from a user device 210 indicates that a user, of user device 210, is running.

The transport mode category may allow the microsite creator to specify criteria relating to a transport mode being used by a user of a user device 210. As one example, a criterion under the transport mode category may specify that the criterion is satisfied when user device 210 is or is not currently being moved by a particular transport mode. Examples of transport modes may include a bus, a car, a ferry, a train, foot, bicycle, etc. To distinguish between these different modes of transportation, ranking system 230 may collect sensor data relating to users who are using these different transportation modes and determine, for example, a pattern of movement of user devices 210 that is indicative of each different type of travel. In this way, ranking system 230 may distinguish when a user is moving via bus, car, ferry, train, foot, bicycle, etc. As an example, a criterion, in the transport mode category, may specify that the criterion is satisfied if sensor data from a user device 210 indicates that a user, of user device 210, is currently walking.

The sound category may allow the microsite creator to specify criteria relating to a sound that is currently being detected by a user device 210. As one example, a criterion under the sound category may specify that the criterion is satisfied when user device 210 is or is not currently detecting a particular sound. Examples of factors on which a criterion in this category may be based may include detection of a voice or a particular type of voice (e.g., such as a male voice, a female voice, a child's voice, etc.), detection of a collection of voices (e.g., a crowd), detection of a particular word or words, detection of music or a particular type of music, detection of a song (e.g., any song), a particular song (e.g., a song with a specific name), or a particular type of song (e.g., a rock and roll song), etc. Additionally, or alternatively, a criterion under the sound category may specify that the criterion is satisfied when user device 210 is or is not currently detecting sound above or below a particular threshold. As an example, a criterion, in the sound category, may specify that the criterion is satisfied if sensor data from a user device 210 indicates that user device 210 is currently detecting music being played.

The date category may allow the microsite creator to specify criteria relating to a date or date range. As one example, a criterion under the date category may specify that the criterion is satisfied when the current date, at the geographic location of a user device 210, is or is not a particular date, or is or is not within a particular date range. A date range may be expressed specifically, for example, using a start date and an end date, or more generally as, for example, a particular day or days, a particular week or weeks, a particular month or months, summer, fall, winter, spring, a particular holiday, etc. As an example, a criterion, in the date category, may specify that the criterion is satisfied if sensor data from a user device 210 indicates that the current date, at the geographic location of user device 210, is within a date range of Jun. 1, 2012 and Jun. 30, 2012.

The device event category may allow the microsite creator to specify criteria relating to a particular event that is currently being detected by a user device 210. As one example, a criterion under the device event category may specify that the criterion is satisfied when user device 210 is or is not currently connected to a Wi-Fi network. Examples of factors on which a criterion in this category may be based may include whether a user device 210 is or is not currently connected to network, whether user device 210 is currently connected to a particular type of network, whether a network is available to which user device 210 can connect, whether user device 210 is currently receiving a telephone call, whether user device 210 is currently conducting a telephone call, whether a telephone call has ended in connection with user device 210, whether a new message has arrived in a voicemail account associated with user device 210, whether a battery level of user device is at, above, or below a threshold, whether user device 210 is currently charging, etc. As an example, a criterion, in the device event category, may specify that the criterion is satisfied if sensor data from a user device 210 indicates that battery of user device 210 is below a particular threshold.

The other devices category may allow the microsite creator to specify criteria relating to one or more devices that are currently being detected by a user device 210. As one example, a criterion under the other devices category may specify that the criterion is satisfied when user device 210 is in proximity to another user device. Examples of factors on which a criterion in this category may be based may include whether a user device 210 is or is not within a particular distance of another device (e.g., a cell phone, a Wi-Fi access point, etc.), another particular device (e.g., a particular's friend's cell phone), etc. As an example, a criterion, in the other devices category, may specify that the criterion is satisfied if sensor data from a user device 210 indicates that user device 210 is within a particular distance of a Wi-Fi access point, having a particular service set identifier (S SID).

The people category may allow the microsite creator to specify criteria relating to a person who may be in proximity to a user device 210. As one example, a criterion under the people category may specify that the criterion is satisfied when user device 210 is in proximity to a particular person, which can be determined, for example, based on detecting a user device with which the particular person is associated. Examples of factors on which criterion in this category may be based include whether a user device 210 is within a particular distance of a particular person, people with one or more characteristics in common with the user of user device 210, etc. To determine whether another person has a characteristic in common with the user, a social networking website, an address book, or other information may be considered. As an example, a criterion, in the people category, may specify that the criterion is satisfied if sensor data from a user device 210 indicates that a person who is associated with a user, of user device 210, on a social networking website is within proximity of user device 210.

The speed category may allow the microsite creator to specify criteria relating to a speed at which user device 210 is currently moving. As one example, a criterion under the speed category may specify that the criterion is satisfied when user device 210 is or is not moving at a particular speed for a particular period of time. Examples of factors on which a criterion in this category may be based include whether user device 210 is or is not moving at, above, or below a particular speed, whether user device 210 is or is not moving at, above, or below a particular speed for longer than a particular period of time, whether user device 210 is or is not moving at, above, or below a particular speed for less than a particular period of time, etc. As an example, a criterion, in the speed category, may specify that the criterion is satisfied if sensor data from a user device 210 indicates that user device 210 is moving faster than 7 kilometers per hour for longer than 4 minutes.

While specific triggering criteria categories are discussed above, the user interface may include additional categories, fewer categories, or different categories. For example, the list of triggering criteria categories may also include an orientation category that may allow the microsite creator to specify criteria relating to an orientation of user device 210. As an example, a criterion, in the orientation category, may specify that the criterion is satisfied if sensor data from a user device 210 indicates that a display of user device 210 is facing away from a user of user device 210.

Each triggering criteria category may be associated with one or more sensors. Thus, input component 310 may identify, based on selection of particular triggering criteria categories for a particular microsite, a list of sensors that are relevant to the particular microsite. Input component 310 may provide the triggering criteria and/or the list of sensors to indexing component 320.

Indexing component 320 may include one or more indexes that may be stored in one or more memory devices, which may be co-located or remotely located. In some implementations, indexing component 320 may store information regarding various microsites in an index. For a particular microsite, for example, the index may store a descriptive name of the particular microsite, a network address for the particular microsite, triggering criteria for the particular microsite, and/or a list of sensors that are relevant for the particular microsite. Ranking component 330 may use the information in the index to identify microsites that are relevant for a particular user and/or in a particular situation.

Ranking component 330 may receive sensor data from user device 210. Ranking component 330 may use the sensor data to identify relevant microsites. In some implementations, ranking component 330 may identify microsites that are relevant based on the sensor data and the triggering criteria, compare the sensor data to the triggering criteria for the microsites, and generate scores for the microsites based on a result of the comparisons. For example, ranking component 330 may perform a first analysis to identify relevant microsites based on the sensor data and the triggering criteria; and perform a second analysis on the relevant microsites, based on a comparison of the sensor data and the triggering criteria, to generate a score for each of the relevant microsites.

In some example implementations, ranking component 330 may modify the score, of a microsite, based on one or more factors. For example, ranking component 330 may modify the score, of a microsite, based on a popularity score of the microsite. In some implementations, the popularity score of a microsite may be generated based on user behavior data associated with the microsite, such as how many users expressed disinterest in the microsite by, for example, swiping away from the microsite or providing a negative rating when the microsite was presented to a user device 210, and/or how many users expressed interest in the microsite by, for example, providing a positive rating when the microsite was presented to a user device 210, requesting additional information regarding the microsite, or purchasing a service associated with the microsite. In some implementations, the popularity score of a microsite may be generated using one or more factors instead of, or in addition to, the user behavior data, such as a quantity of times that the microsite has been presented to user devices 210, an age of the microsite, a prior ranking or score of the microsite, or the like.

Additionally, or alternatively, ranking component 330 may modify the score, of a microsite, based on a personalization score of the microsite. In some implementations, the personalization score of a microsite may be generated based on user activity data, associated with a user of a particular user device 210, with regard to the microsite, such as whether the user has expressed disinterest in the microsite by, for example, swiping away from the microsite or providing a negative rating when the microsite was presented to the particular user device 210, and/or whether the user expressed interest in the microsite by, for example, providing a positive rating when the microsite was presented to the particular user device 210, requesting additional information regarding the microsite, purchasing a service associated with the microsite, bookmarking the microsite, and/or following a recommendation provided by the microsite—e.g., a recommendation to visit a particular restaurant, see a particular movie, ride a particular bus, or the like. In some implementations, the personalization score of a microsite may be generated using one or more factors instead of, or in addition to, the user activity data, such as whether the user has recommended the microsite to one of the user's social contacts.

Additionally, or alternatively, ranking component 330 may modify the score, of a microsite, based on a social score of the microsite. In some implementations, the social score of a microsite may be generated based on friend activity data, associated with social contacts—e.g., social contacts— of the user of a particular user device 210, with regard to the microsite. The user's social contacts may be identified based on the user's communications, the user's address book, and/or the user's account on one or more social networks. Examples of friend activity data, associated with a microsite, include whether the user's social contacts have expressed disinterest in the microsite by, for example, swiping away from the microsite or providing a negative rating when the microsite was presented to the social contacts' user devices 210, and/or whether the user's social contacts expressed interest in the microsite by, for example, providing a positive rating when the microsite was presented to the social contacts' user devices 210, requesting additional information regarding the microsite, purchasing a service associated with the microsite, bookmarking the microsite, and/or following a recommendation provided by the microsite—e.g., a recommendation to visit a particular restaurant, see a particular movie, ride a particular bus, or the like. In some implementations, the social score of a microsite may be generated using one or more factors instead of, or in addition to, the friend activity data, such as whether the social contacts have recommended the microsite to others.

In some implementations, ranking component 330 may generate a total score for a microsite based on a combination of the score and the popularity score, the personalization score, and/or the social score. In some implementations, ranking component 330 may generate a total score for a microsite based on a combination of the score, the popularity score, the personalization score, and the social score. In some implementations, ranking component 330 may generate a total score for a microsite based on a weighted combination of the score, the popularity score, the personalization score, and the social score. For example, ranking component 330 may assign a weight value to the score, the popularity score, the personalization score, and/or the social score. The weight values may differ—in other words, the amount that each of the score, the popularity score, the personalization score, and the social score contributes to the total score may vary. Rank component 330 may combine the weighted score, the weighted popularity score, the weighted personalization score, and/or the weighted social score to generate the total score.

Ranking component 330 may select a set of microsites based on their scores. For example, ranking component 330 may select the top scoring X microsites (X≥1). In some implementations, ranking component 330 may select only the top scoring microsite (X=1). In some implementations, ranking component 330 may select the top scoring five (5) microsites (X=5).

Ranking component 330 may provide information, regarding the set of microsites, to user device 210. In some implementations, the information may include a network address and/or a list of sensors for each microsite in the set of microsites. In some implementations, the network addresses of the microsites may be provided in a ranked list based on the scores of the microsites. In some implementations, the network addresses of the microsites may be provided along with the scores of the microsites.

Although FIG. 3 shows example functional components of ranking system 230, in some implementations, ranking system 230 may include additional functional components, different functional components, or fewer functional components than those depicted in FIG. 3. Additionally, or alternatively, one or more functional components of ranking system 230 may perform one or more tasks described as being performed by one or more other functional components of ranking system 230.

Figure 4:
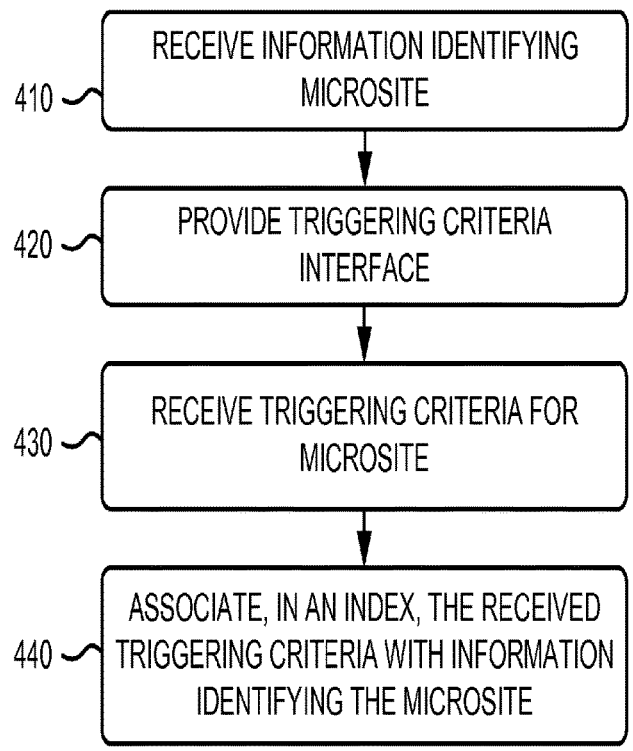

FIG. 4 is a flowchart of an example process 400 for setting criteria for triggering when microsite content is to be presented—e.g., pushed—to a user device. In some implementations, process 400 may be performed by ranking system 230. In some implementations, one or more blocks of process 400 may be performed by one or more devices instead of, or possibly in conjunction with, ranking system 230, such as by user device 210.

Process 400 may include receiving information identifying a microsite (block 410). For example, input component 310, of ranking system 230, may provide a user interface to a microsite creator device 220. In some implementations, the microsite creator may access the user interface, using microsite creator device 220, via a browser or in another manner. The microsite creator may provide information identifying the microsite, via the user interface. For example, the microsite creator may identify the microsite by providing a network address, such as a URL or a URI, using the user interface. Additionally, the microsite creator may specify other information identifying the microsite, such as a name of the microsite, via the user interface. Input component 310 may receive the network address and the other information.

Process 400 may include providing a triggering criteria interface (block 420). For example, input component 310, of ranking system 230, may provide a user interface via which a microsite creator may specify triggering criteria that dictate when a microsite is to be presented—e.g., pushed—to a user device 210. In some implementations, input component 310 may provide the user interface based on receiving the information identifying the microsite. As described above, the user interface may include a list of triggering criteria categories, such as a location category, a time category, a motion category, a transport mode category, a sound category, a date category, a device event category, an other devices category, a people category, a speed category, and/or other types of categories. The microsite creator may select from among the list of triggering criteria categories and provide parameters for specifying the triggering criteria for the microsite.

Process 400 may include receiving triggering criteria for the microsite (block 430). For example, input component 310 may receive, via the user interface, one or more triggering criteria for the microsite. In some implementations, the user interface may provide the microsite creator with the ability to specify how different triggering criteria and/or different triggering criteria categories are to be combined. In some implementations, the user interface may allow for different triggering criteria and/or different triggering criteria categories to be combined using one or more Boolean operators. For example, assume that the triggering criteria for the microsite include criteria relating to speed, motion, and time. The user interface may allow the three triggering criteria to be combined in many different ways, such as, for example:

speed AND motion AND time,
    speed OR motion OR time,
    (speed OR motion) AND time,
    speed AND (motion OR time),
    etc.

Thus, Boolean operators and/or parentheses may be used to specify how different triggering criteria are to be combined for the microsite. In some implementations, the microsite creator may also provide different weights for the different criteria that are part of the triggering criteria. In the example above, the microsite creator may specify a first weight for the speed criteria, a second, different weight for the motion criteria, and a third, different weight for the time criteria.

Additionally, or alternatively, input component 310 may provide a user interface that allows the microsite creator to specify triggering criteria in other ways. For example, the user interface may allow the microsite creator to specify triggering criteria in a freestyle manner, such as by typing in what the microsite creator desires the triggering criteria to be. As one example, the microsite creator may specify the triggering criteria shown in FIG. 1A as:

the criteria is met when the user device is moving faster than 7 km/hr for longer than 4 minutes, and the user device is not within 10 meters of a bus stop, and the time is not between 11 PM and 4 AM.

Input component 310 may receive the entered information and parse the information to identify the triggering criteria categories and the triggering criteria for the identified triggering criteria categories. Additionally, or alternatively, input component 310 may provide default triggering criteria, which can be edited by the microsite designer to specify the triggering criteria for the microsite. The default triggering criteria may be provided, for example, in an Extensible Markup Language (XML) format, a Comma (or Character)—Separated Values (CSV) format, a Microsoft Excel (XLS) format, a non-string type of format, and/or another type of format; as a flat text file (e.g., ASCII); as a file containing an array of key-value pairs; etc. In some implementations, the default triggering criteria may include an entire list of possible criteria or a subset of possible criteria, which may be determined based on a type of the microsite received in block 410 above. In some implementations, the microsite creator may simply remove the triggering criteria that are not desired and provide the appropriate parameters for the remaining triggering criteria to form the triggering criteria for the microsite.

Process 400 may include associating, in an index, the received triggering criteria with information identifying the microsite (block 440). For example, indexing component 320, of ranking system 230, may receive the triggering criteria from input component 310. In addition, indexing component 320 may receive information identifying the microsite, such as a network address, from input component 310. In some implementations, indexing component 310 may also receive a name of the microsite and a list of sensors that are relevant to the microsite from input component 310. Indexing component 320 may store, for a particular microsite and in the index, a descriptive name of the particular microsite, a network address for the particular microsite, triggering criteria for the particular microsite, and/or a list of sensors that are relevant for the particular microsite.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

FIG. 5 is a flowchart of example process 500 that may correspond to blocks 420 and 430 of FIG. 4. In some implementations, process 500 may be performed by ranking system 230. In some implementations, one or more blocks of process 500 may be performed by one or more devices instead of, or possibly in conjunction with, ranking system 230. Process 500 will be described in connection with FIGS. 6A-6C, which depict user interfaces that may be used for specifying triggering criteria for a microsite.

Process 500 may include providing a user interface with a list of triggering criteria categories (block 510). For example, input component 310, of ranking system 230, may provide a user interface to a microsite creator device 220 that allows the microsite creator to specify the triggering criteria for an identified microsite. In some implementations, the user interface may include a list of triggering criteria categories, such as, for example, a location category, a time category, a motion category, a transport category, a sound category, a date category, a device event category, an other devices category, a people category, a speed category, and/or other types of categories. These categories were discussed above with respect to FIG. 3.

Figure 6A:
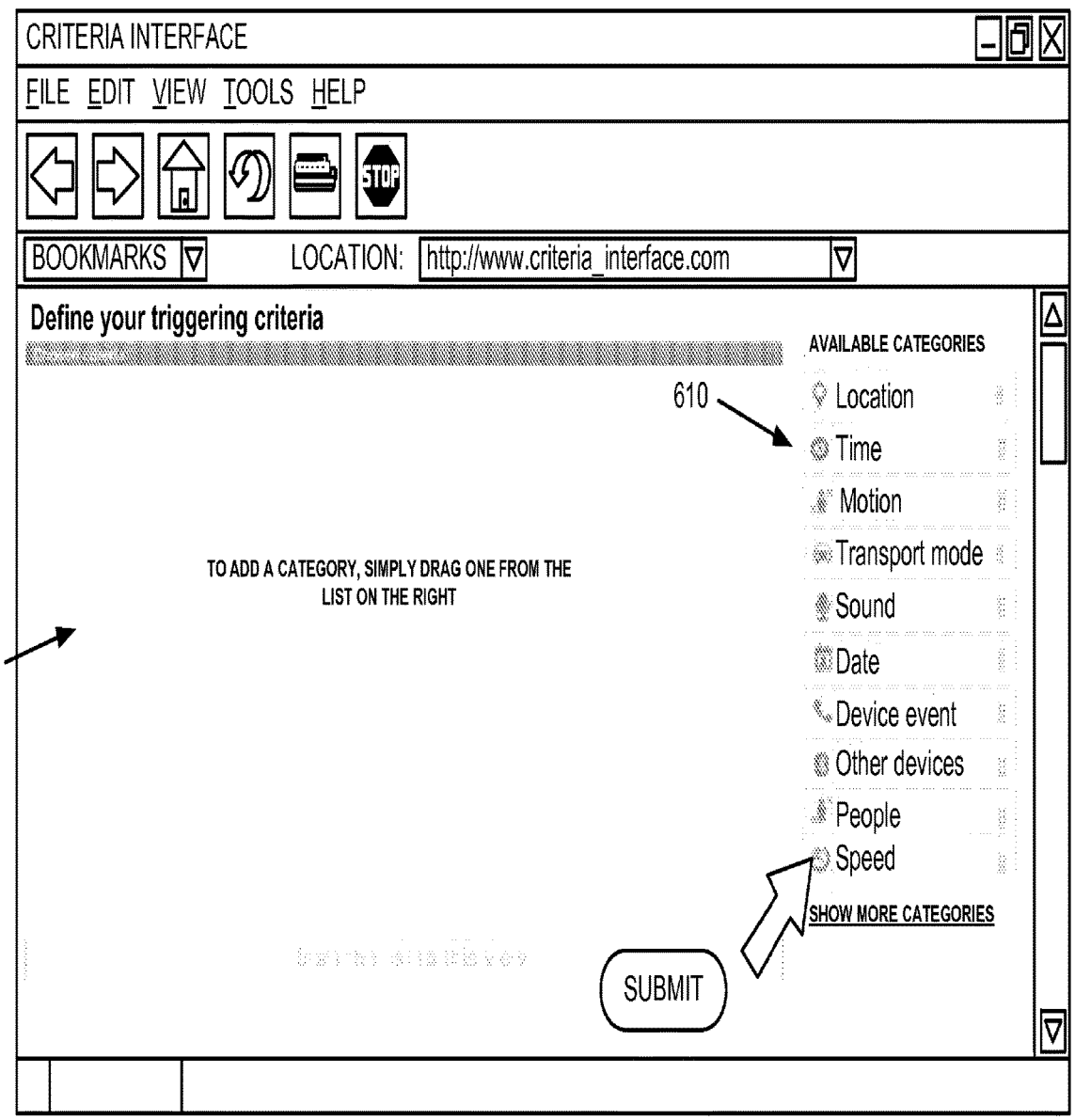
FIG. 6A, FIG. 6B, and FIG. 6C are diagrams of example user interfaces that allow microsite creators to specify triggering criteria for pushing microsite content.

FIG. 6A is a diagram of an example user interface 600 that may be provided to a microsite creator in connection with block 510. As shown, user interface 600 may include a first area 610 that includes a list of triggering criteria categories that may be used to specify triggering criteria for a microsite and a second area 620 that acts as a canvas for receiving selections of triggering criteria categories.

Returning to FIG. 5, process 500 may include detecting selection of a triggering criteria category (block 520). For example, input component 310 may detect that the microsite creator selected a triggering criteria category from the list of triggering criteria categories. With reference to FIG. 6A, the microsite creator may select the triggering criteria category by dragging a triggering criteria category from first area 610 to second area 620. Other manners of selecting a triggering criteria category may alternatively be used. For example, the microsite creator may select a triggering criteria category by clicking on the triggering criteria category, in first area 610, with a mouse or other type of input device, or touching the triggering criteria category, in first area 610, with a finger or input device.

Figure 6B:
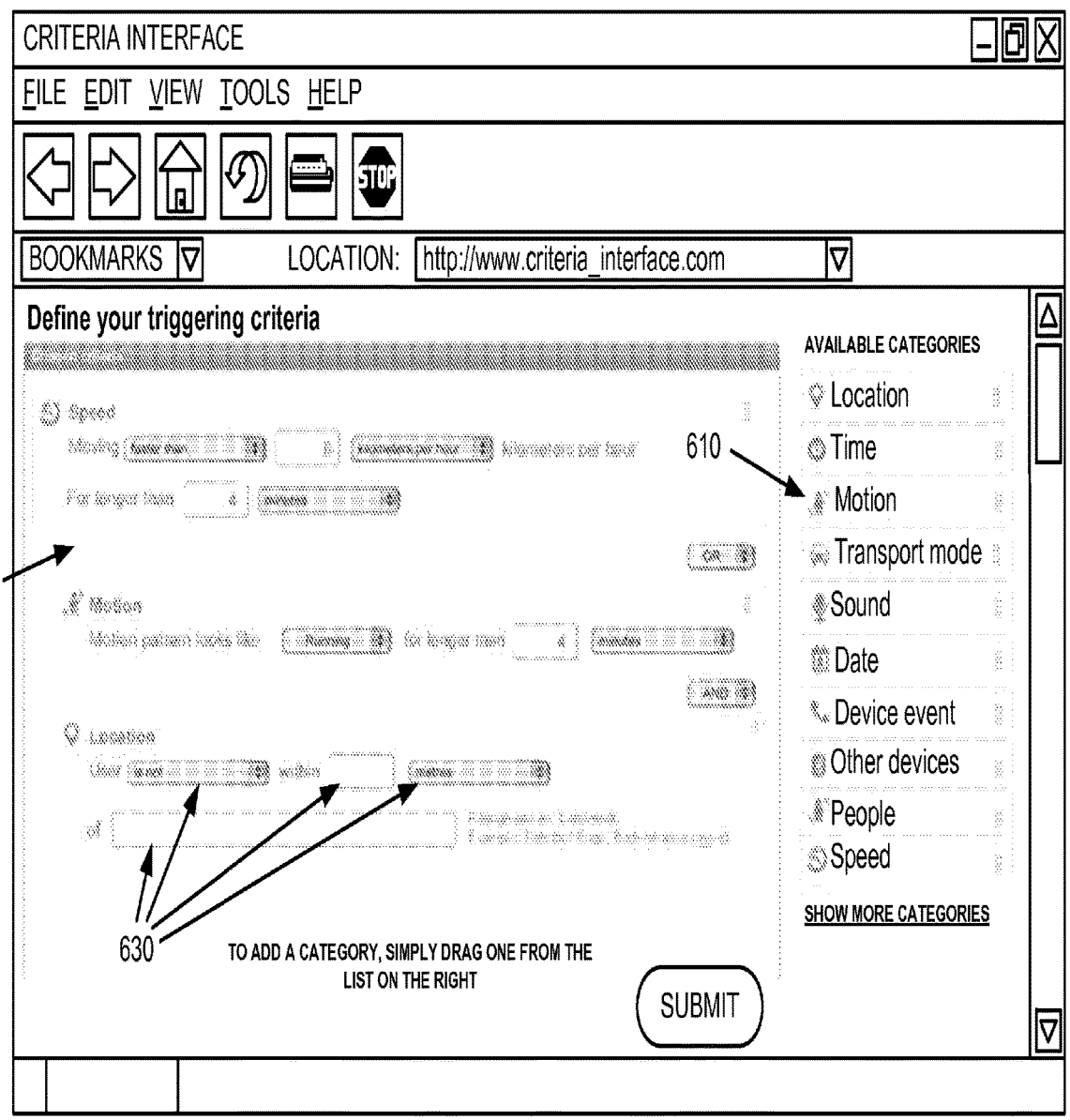

Process 500 may include populating the user interface with information for the selected triggering criteria category (block 530). For example, input component 310 may, as a result of detecting selection of a triggering criteria category, populate the user interface with information for the selected triggering criteria category. FIG. 6B is a diagram of an example user interface 600 that may be provided after a microsite creator has selected a triggering criteria category. Assume, for explanatory purposes, that the microsite creator has already added the speed and motion categories and has now selected the location category. In response, input component 310 may cause second area 620 to become populated with a criterion for the location category. Second area 620 may allow the microsite creator to specify, for the location category, a number of parameters 630 that, once provided, form the criterion for the location category. In the example of FIG. 6B, the location category allows the microsite creator to specify, as parameters 630, whether a user is or is not within some distance, in meters or another unit of distance, of a particular location or object.

While the location category is shown as associated with one criterion, in some implementations, a triggering criteria category may include more than one criterion. In such implementations, the microsite creator may select one or more of the available criteria for the triggering criteria category.

Process 500 may include receiving parameters for a criterion (block 540). For example, input component 310 may receive parameters, from microsite creator device 220, relating to a triggering criterion. As an example and with reference to FIG. 6B, the microsite creator may provide parameters 630 for the speed category, motion category, and location category. As shown, the microsite creator has specified "running" and "4" for the motion category to form the criterion "motion pattern looks like running for longer than 4 minutes."

Returning to FIG. 5, process 500 may include determining whether an additional triggering criteria category has been selected (block 550). For example, input component 310 may determine, for example, whether the microsite creator has selected an additional triggering criteria category, from the list of triggering criteria categories. Additionally, or alternatively, input component 310 may determine whether the microsite creator has selected a SUBMIT button or similar type of button, which may indicate that the microsite creator has completed selecting triggering criteria categories.

Figure 6C:
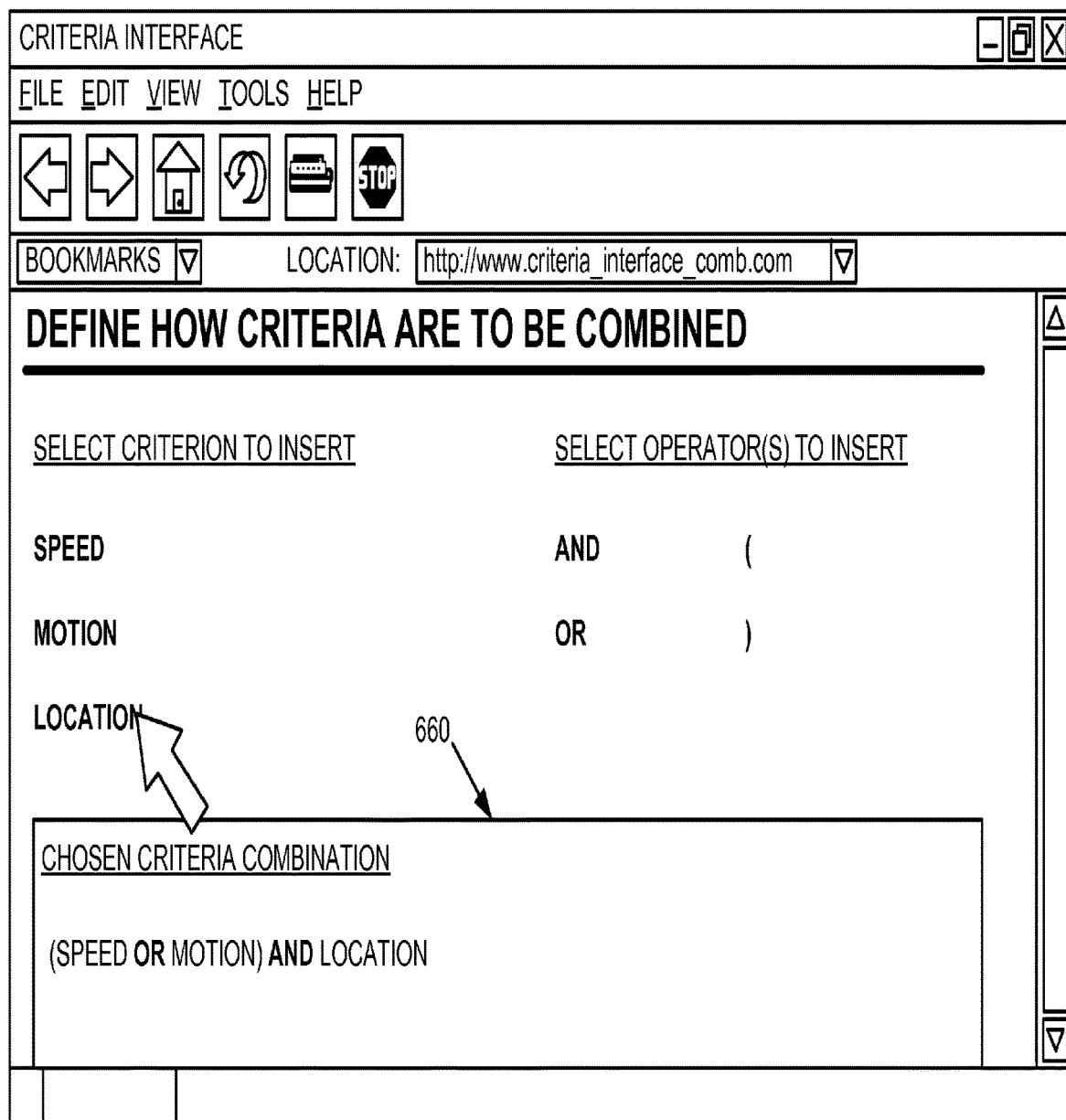

In those situations where an additional triggering criteria category has been selected (block 550—YES), process 500 may return to block 530 with input component 310 populating the user interface with information for the newly selected triggering criteria category. In those situations where an additional triggering criteria category has not been selected (block 550—NO), process 500 may include receiving parameters for combining the selected triggering criteria (block 560). For example, input component 310 may provide a user interface to microsite creator device 220 that includes information identifying the selected triggering criteria. The microsite creator may, via the user interface, specify how the selected triggering criteria are to be combined. In some implementations, the user interface may provide the microsite creator with the ability to combine the selected triggering criteria using one or more Boolean operators and/or parentheses. FIG. 6C is a diagram of an example user interface 650 that may be provided to a microsite creator to allow the microsite creator to combine selected triggering criteria. As shown, the microsite creator has combined, in area 660 of user interface 650, the triggering criteria, selected in FIG. 6B, as follows: (SPEED OR MOTION) AND LOCATION. Thus, satisfying this triggering criteria requires the location criterion to be satisfied, as well as either the speed criterion or the motion criterion. In some implementations, area 660 may be pre-populated with the triggering criteria and possibly the Boolean operators selected in user interface 600. The microsite creator may, however, modify the pre-populated information in any desired manner.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 7:
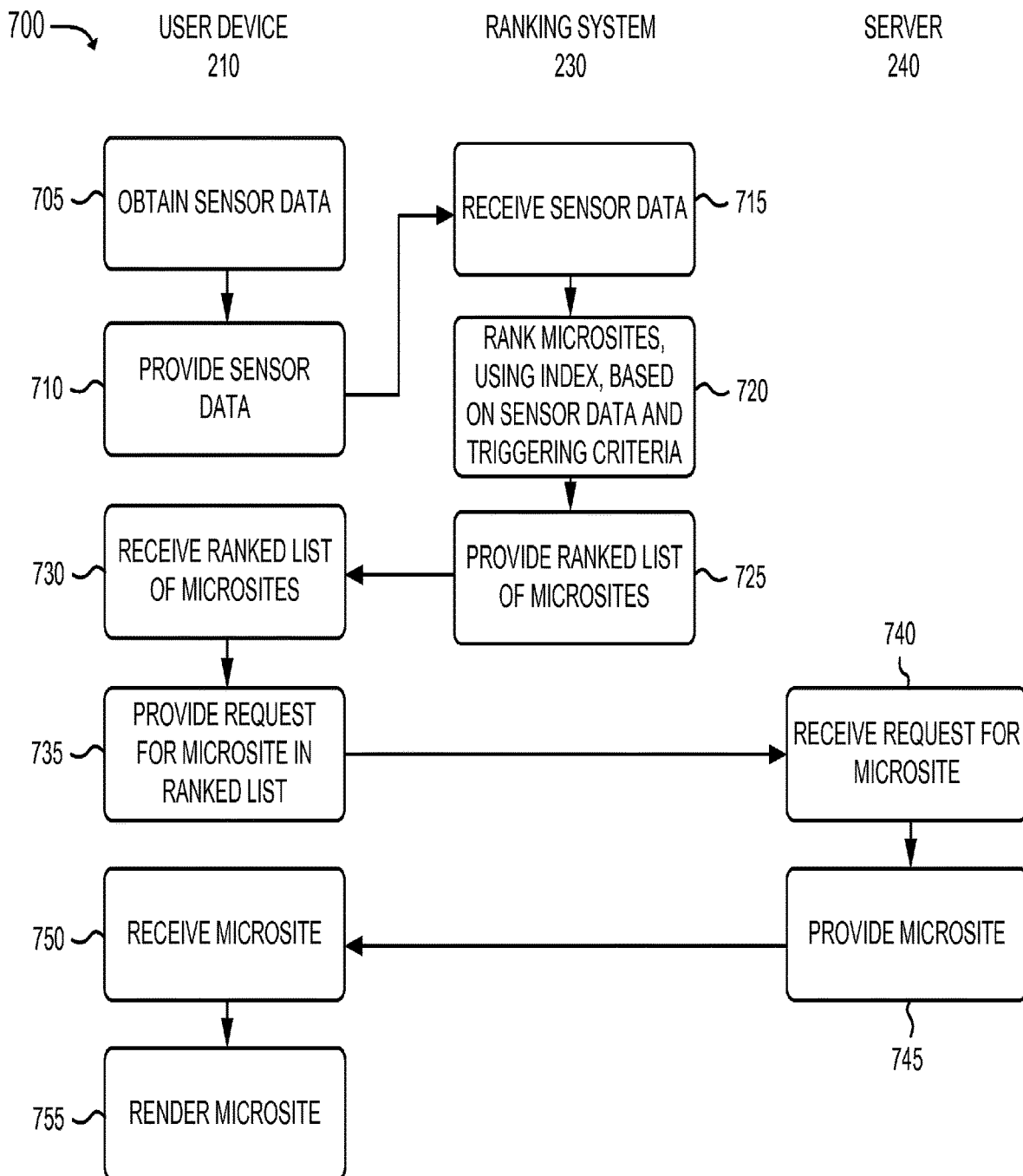
FIG. 7 is a flowchart of an example process for providing content of a microsite.

FIG. 7 is a flowchart of an example process 700 for providing content of a microsite. While FIG. 7 shows process 700 as including a particular sequence of interactions among user device 210, ranking system 230, and a server 240, in some implementations, some of these interactions may occur in another order or in parallel. Moreover, some of the blocks of process 700 may be performed by a different device or group of devices, including or excluding user device 210, ranking system 230, and server 240.

Process 700 may include obtaining sensor data (block 705). For example, user device 210 may obtain sensor data from sensors associated with user device 210. Examples of sensor data may include information regarding a current geographic location of user device 210; information regarding sounds occurring at or around user device 210; information regarding a current lighting condition at user device 210; information regarding a current date and/or time associated with user device 210; information regarding a current speed of user device 210; information regarding a current direction in which user device 210 is moving; information regarding a current orientation or change in orientation of user device 210; information regarding a current weather condition in the location in which user device 210 is located; information regarding a current temperature in the location in which user device 210 is located; and/or information regarding interaction of user device 210 with other devices with which user device 210 is in communication. While certain examples of sensor data have been identified above, other types of sensor data are possible.

Process 700 may include providing the sensor data (block 710). For example, user device 210 may provide the sensor data to ranking system 230. In some implementations, user device 210 may also provide user profile data to ranking system 230. Examples of user profile data may include information regarding geographic addresses associated with the user, such as the address of the user's home, the address of the user's place of business, the address of a location frequented by the user, etc.; information inputted into a calendar associated with the user; information regarding the user's interaction with microsites that have been presented to the user, such as ratings given to the microsites, whether the user has dismissed—e.g., swiped away—from microsites that have been presented to the user, or the like; information regarding the user's communications, such as e-mails, text messages, instant messages, voicemail messages, or the like; information regarding the user's activity on the web, such as information regarding the user's searches, the user's browsing activity, the user's posts on social networks, blogs, and/or other public web sites; information regarding activities on the web of the user's social contacts, such as the user's social contacts' posts on social networks, blogs, and/or other public web sites; and/or information regarding the user's habits, such as places that the user has visited, things that the user has done, at what time the user usually gets up in the morning, or the like. While certain examples of user profile data have been identified above, other types of user profile data are possible.

User device 210 may automatically—e.g., without requiring an instruction from a user of user device 210—provide the sensor data and possibly the user profile data to ranking system 230. The user, of user device 210, may stop, at any time, the sending of sensor data and/or user profile data to ranking system 230. In addition, in some implementations, the sensor data and/or user profile data may be anonymized with regard to the identity of the user.

Process 700 may further include receiving the sensor data (block 715). For example, ranking component 330, of ranking system 230, may receive the sensor data from user device 210. In those situations where user device 210 also provides user profile data, ranking component 330 may also receive the user profile data.

Process 700 may include ranking microsites, identified using an index, based on the sensor data and the triggering criteria associated with the microsites (block 720). For example, ranking component 330 may use the sensor data and, when provided, the user profile data, to identify relevant microsites. For example, ranking component 330 may compare the sensor data, and possibly the user profile data, to the triggering criteria for a microsite, identified by the index, and generate a score for the microsite based on a result of the comparison. As described above, in some implementations, ranking component 330 may modify the score, for a microsite, based on one or more factors to generate a total score for the microsite. Ranking component 330 may use the score, or total score, to form a ranked list of microsites.

Process 700 may include providing information regarding the ranked list of microsites (block 725). For example, ranking component 330 may provide information regarding the ranked list of microsites to user device 210. As explained above, in some implementations, the information may include, for each microsite in the ranked list of microsites, a network address for the microsite and a list of sensors relevant to the microsite.

Process 700 may include receiving the information regarding the ranked list of microsites (block 730). For example, user device 210 may receive the information regarding the ranked list of microsites from ranking component 330.

Process 700 may include providing a request for a microsite in the ranked list (block 735). For example, based on receiving the information regarding the ranked list of microsites, user device 210 may obtain sensor data associated with the list of sensors that have been identified as relevant to the microsites in the ranked list. For each relevant microsite, user device 210 may generate a request that includes the network address for the relevant microsite and the sensor data relevant to the relevant microsite. User device 210 may provide the request to one or more servers 240. Whether user device 210 provides the requests to more than one server 240 depends on which server(s) 240 is/are hosting the relevant microsites. In other words, all of the relevant microsites may be hosted by a single server 240, all of the relevant microsites may be hosted by separate, different servers 240, or something in between these two extremes.

Process 700 may include receiving a request for a microsite (block 740). For example, server 240 may receive a request, for a microsite, from user device 210 and obtain content of the relevant microsite. In some implementations, the content of a relevant microsite may be dynamic in the sense that the content of the relevant microsite may be based on the sensor data received from user device 210.

Process 700 may include providing the microsite (block 745). For example, server 240 may provide the content of the relevant microsite to user device 210.

Process 700 may include receiving the content of the microsite (block 750). For example, user device 210 may receive the content of the microsite from server 240.

Process 700 may include rendering the content of the microsite (block 755). For example, user device 210 may present the content of the microsite on a display associated with user device 210. When content is received for multiple microsites, user device 210 may push the content, for the relevant microsites, as a sliding display of content. In some implementations, content for one of the relevant microsites may be presented on the display at a time. A user, of user device 210, may interact with the content, using a finger or the like, to express the user's interest or disinterest in the content or to see the content for another one of the relevant microsites.

A system and method, described herein, may allow a microsite creator to specify triggering criteria that dictate when the creator's microsite is to be presented—e.g., pushed—to a user device. In some implementations, the microsite may be based on context data without the need for a user, of the user device, to request the microsite. The microsite may provide information that may be useful to the user.

Example 2

A system and/or method, as described herein, may provide a microsite to a user device based on context data and without the need for a user, of the user device, to request the microsite. The context data may include user profile data relating to the user or the user device and/or sensor data relating to one or more conditions associated with the user device. The microsite may provide information that may be useful to the user.

Figure 8:
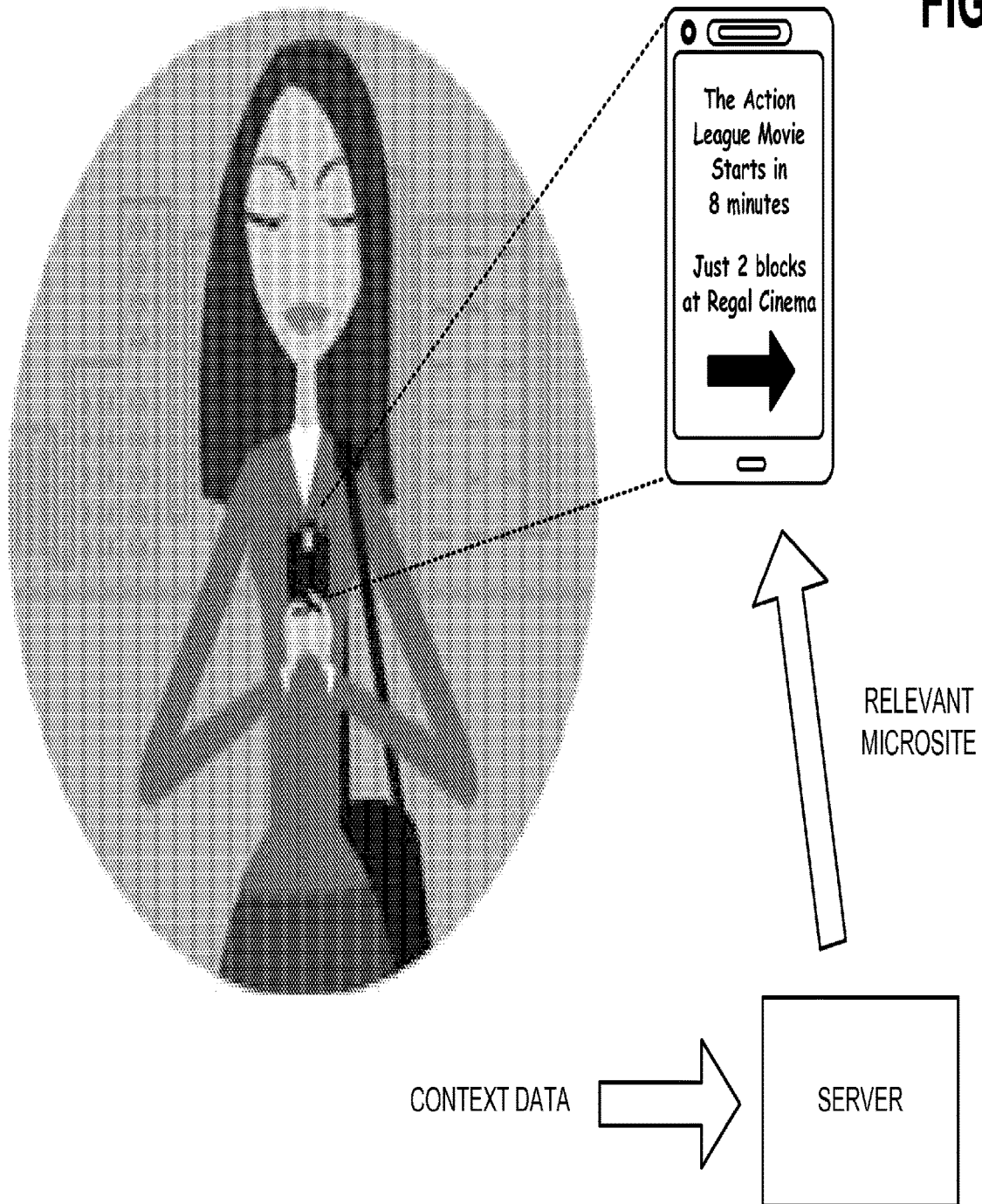
FIG. 8 is a diagram illustrating an overview of an example implementation described herein.

FIG. 8 is a diagram illustrating an overview of an example implementation described herein. Assume that a user ("Mary") is walking in the city and has her mobile device with her. Mary has previously expressed an interest in a movie called "The Action League Movie" by posting information about the movie on a social networking site; by communicating about the movie with her friend (e.g., via e-mail, text messaging, instant messaging, etc.); by watching a trailer of the movie on the web; by searching for information regarding the movie on the web; or the like.

As shown in FIG. 8, a server may obtain context data relating to Mary and/or Mary's mobile device. The context data may include information regarding Mary's interest in the movie, information regarding current conditions (e.g., time, date, weather, etc.), information regarding the current geographic location of Mary's mobile device, or the like. The server may use the context data to determine whether to trigger the presentation of a microsite.

The server may store information regarding a group of microsites and criteria for triggering the presentation of these microsites. The server may compare the context data to the triggering criteria for the microsites and use the comparison results to generate scores for the microsites. The server may select a relevant microsite based on its score and provide information, regarding the relevant microsite, to Mary's mobile device. In the example shown in FIG. 1, the relevant microsite may include details regarding an upcoming showing of The Action League Movie. For example, Mary may be presented with information that a showing of the movie begins in eight minutes at the Regal Cinema and information regarding how to get to the Regal Cinema (e.g., Mary may be informed that the Regal Cinema is just two blocks away and an arrow may identify the direction of the Regal Cinema relative to Mary's current location). As a result, Mary may be presented with information in which Mary is interested without the need for Mary to request the information.

Figure 9:
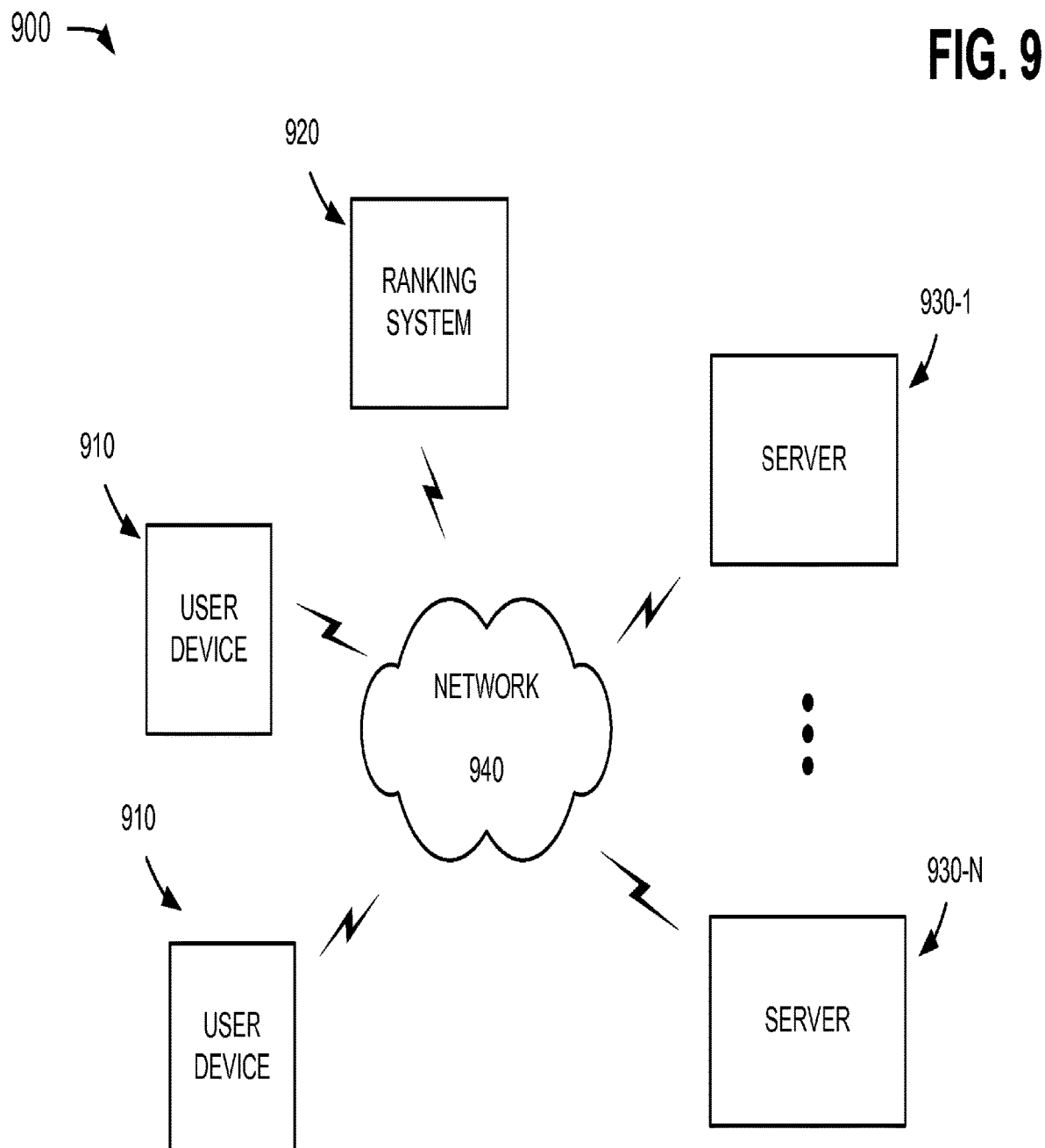
FIG. 9 is a diagram of an example environment in which systems and/or methods described herein may be implemented.

FIG. 9 is a diagram of an example environment 900 in which systems and/or methods described herein may be implemented. Environment 900 may include multiple user devices 910 connected to ranking system 920, and multiple servers 930-1, . . . , 930-N(N≥1) (referred to collectively as "servers 930," and individually as "server 930") via a network 940. Three user devices 910, one ranking system 920, and N servers 930 have been illustrated as connected to network 940 for simplicity. In practice, there may be additional or fewer user devices, ranking systems, servers, and/or networks. Also, in some instances, a user device 910 may perform a function described below as being performed by ranking system 920, and/or ranking system 920 may perform a function described below as being performed by a user device 910.

User device 910 may include a client device, or a collection of client devices, that is capable of presenting a microsite on a display. Examples of user device 910 may include a smart phone, a personal digital assistant, a laptop, a tablet computer, a personal computer, a watch, a gaming device, or a combination of these and/or other devices. User device 910 may include one or more browsers via which microsites may be presented on a display associated with user device 910.

Ranking system 920 may include a server device or a collection of server devices which may be co-located or remotely located. Ranking system 920 may identify microsites and index information associated with the microsites. Ranking system 920 may identify relevant microsites to present to a user device 910, based on context data received from user device 910 and criteria for triggering the presentation of the microsites, and provide information regarding the relevant microsites to user device 910.

Server 930 may include a server device or a collection of server devices that may be co-located or remotely located. Any two or more of servers 930 may be implemented within a single, common server device or a single, common collection of server devices. Servers 930 may host microsites. In some implementations, one or more of servers 930 may be affiliated with a same entity (e.g., party, organization, business, company, etc.) as ranking system 920. In some implementations, none of servers 930 may be affiliated with the same entity as ranking system 920.

While ranking system 920 is shown as separate from servers 930, it may be possible for ranking system 920 to perform one or more of the functions described as being performed by a server 930 and/or a server 930 to perform one or more of the functions described as being performed by ranking system 920. For example, ranking system 920 may host some of the microsites. Additionally, or alternatively, a user device 910 may host some of the microsites.

While ranking system 920 is shown as separate from user device 910, it may be possible for user device 910 to perform one or more of the functions described as being performed by ranking system 920 and/or ranking system 920 to perform one or more of the functions described as being performed by user device 910.

Network 940 may include any type of network, such as a local area network ("LAN"), a wide area network ("WAN"), a telephone network, such as the Public Switched Telephone Network ("PSTN") or a cellular network, an intranet, the Internet, or a combination of networks. User devices 910, ranking system 920, and servers 930 may connect to network 940 via wired and/or wireless connections. In other words, any one of user devices 910, ranking system 920, and/or servers 930 may connect to network 940 via a wired connection, a wireless connection, or a combination of a wired connection and a wireless connection.

Figure 10:
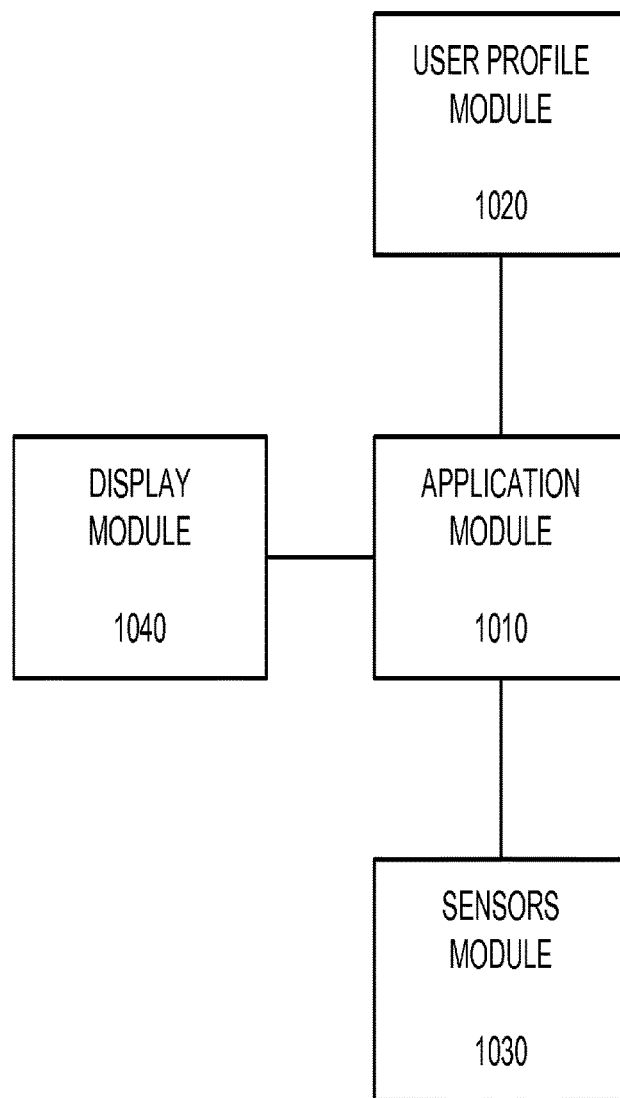
FIG. 10 is a diagram of example functional components of the user device of FIG. 9.

FIG. 10 is a diagram of example functional components of user device 910. In some implementations, the functional components, shown in FIG. 10, may be implemented by user device 910. In some implementations, one or more of the functional components, shown in FIG. 10, may be implemented by a device separate from user device 910, such as another user device 910 operating in combination with user device 910.

As shown in FIG. 10, user device 910 may include an application module 1010, a user profile module 1020, a sensors module 1030, and a display module 1040. In some implementations, user device 910 may include additional or fewer functional components than are illustrated in FIG. 10.

Application module 1010 may control the operation of user device 910 with regard to the presentation of microsites on user device 910. In some implementations, application module 1010 may take the form of a browser application. In some implementations, application module 1010 may automatically run when user device 910 powers on or boots up, or may run when instructed by a user of user device 910. In some implementations, application module 1010 may run in the background on user device 1010. The user, of user device 910, may stop application module 1010 from running at any time.

Application module 1010 may obtain information from user profile module 1020 and sensors module 1030 and provide the information to ranking system 920. Application module 1010 may also receive information regarding one or more microsites from ranking system 920. In some implementations, the information, regarding a microsite, may include a network address, such as a URL or URI, associated with the microsite from ranking system 920. Additionally, or alternatively, the information, regarding a microsite, may include a list of sensors that is relevant to the content of the microsite. Application module 1010 may provide the information to display module 1040. In some implementations, application module 1010 may automatically obtain information from user profile module 1020 and/or sensors module 1030, and/or automatically provide the information to ranking system 920—e.g., without input from a user of user device 910. In some implementations, application module 1010 may periodically provide the information to ranking system 920—e.g., according to no predefined schedule. In some implementations, application module 1010 may regularly provide the information to ranking system 920—e.g., according to a predefined schedule. In some implementations, application module 1010 may provide the information to ranking system 920 based on a schedule identified by the user of user device 910—e.g., every 5 minutes between 10 AM and 11 PM when user device 910 has been idle for at least 5 minutes but not when user device 910 is charging. In some implementations, application module 1010 may provide the information to ranking system 920 according to some other criteria.

User profile module 1020 may obtain, store, and/or provide user profile data. User profile data may include various information regarding user device 910, a user of user device 910, and/or one or more other user devices 910 associated with the user of user device 910. The user profile data may only be obtained, stored, and/or provided with the user's express permission, and the user profile data may be anonymized with regard to the identity of the user. In some implementations, user profile module 1020 may store some user profile data and an identifier associated with additional user profile data, which may be stored externally to user device 910, such as at ranking system 920 or at a server accessible by ranking system 920. In some implementations, user profile module 1020 may simply store an identifier associated with the user profile data, which may be stored externally to user device 910, such as at ranking system 920 or at a server accessible by ranking system 920. Thus, references, herein, to user profile data may refer to an identifier associated with the user profile data.

Examples of user profile data may include information regarding geographic addresses associated with the user, such as the address of the user's home, the address of the user's place of business, the address of a location frequented by the user, etc.; information inputted into a calendar associated with the user; information regarding the user's interaction with microsites that have been presented to the user, such as ratings given to the microsites, whether the user has dismissed—e.g., swiped away—from microsites that have been presented to the user, or the like; information regarding the user's communications, such as e-mails, text messages, instant messages, voicemail messages, or the like; information regarding the user's activity on the web, such as information regarding the user's searches, the user's browsing activity, the user's posts on social networks, blogs, and/or other public web sites; information regarding the user's social contacts, such as identifiers—e.g., identifiers that are anonymized with regard to the identities of particular individuals—associated with people listed in the user's address book, people friended by the user on social networks or other public web sites, people with whom the user has communicated, or other people having a social relationship with the user; and/or information regarding the user's habits, such as places that the user has visited, things that the user has done, at what time the user usually gets up in the morning, or the like. While certain examples of user profile data have been identified above, other types of user profile data are possible.

The user may review, add, remove, and/or revise the user profile data at any time. In some implementations, the user may specify what type of information is to be used for the user profile data. For example, the user may specify that the information regarding the user's activity on the web is to be used for the user profile data, and the information regarding the user's communications and the information regarding the user's friends' activities on the web are not to be used for user profile data.

Sensors module 1030 may obtain, store, and/or provide sensor data. Sensor data may include various information regarding user device 910 and/or conditions associated with user device 910. The sensor data may only be obtained, stored, and/or provided with the user's express permission, and the sensor data may be anonymized with regard to the identity of the user. Sensor module 1030 may interact with one or more components of user device 910, such as an accelerometer, a global positioning system component, a communication component, or the like, to obtain the sensor data. Additionally, or alternatively, sensor module 1030 may interact with one or more external devices, such as one or more servers 930, to obtain the sensor data.

Examples of sensor data may include information regarding a current geographic location of user device 910; information regarding sounds occurring at or around user device 910; information regarding current lighting condition at user device 910; information regarding a current date and/or time associated with user device 910; information regarding a current speed of user device 910; information regarding a current direction in which user device 910 is moving; information regarding a current orientation or change in orientation of user device 910; information regarding a current weather condition in the location in which user device 910 is located; information regarding a current temperature in the location in which user device 910 is located; and/or information regarding interaction of user device 910 with other devices with which user device 910 is in communication. While certain examples of sensor data have been identified above, other types of sensor data are possible.

The user may specify what type of information is to be used for the sensor data. For example, the user may specify that the current geographic location, the current time, the current speed, the current direction, and the current orientation or change in orientation of user device 910 are to be used for the sensor data, and the interaction of user device 910 with other devices is not to be used for the sensor data.

Display module 1040 may receive information, such as a network address associated with a microsite and/or a list of sensors that are relevant to the microsite, from application module 1010. Display module 1040 may use the information to transmit a request to a server 930 to obtain the content of the microsite. The request may include the network address, associated with the microsite, and sensor data associated with the sensors in the list. The sensor data, included with the request, may be a subset of the sensor data obtained by sensors module 1030. In some particular implementations, the request may include a GET request and the content of the microsite may include hypertext mark-up language (HTML), cascading style sheets (CSS), or Javascript.

Display module 1040 may receive the content of the microsite and render the content of the microsite on a display associated with user device 910. In some implementations, the content of the microsite may include code to obtain real-time sensor data from user device 910 or a device separate from user device 910. In some example implementations, this code may obtain the real-time sensor data once when the content of the microsite is rendered on the display. In some example implementations, this code may obtain the real-time sensor data more than once while the content of the microsite is rendered on the display. The content of the microsite may be updated based on the real-time sensor data.

In some implementations, display module 1040 may push the content to the display so as to override any content already on the display. In some implementations, display module 1040 may determine an appropriate time to render the content of the microsite, such as when user device 910 is idle for a particular amount of time, when user device 910 is in a lock mode, when user device 910 is in a particular orientation, or the like. In some implementations, a user of user device 910 may specify how and when the user will be presented with the content of a microsite. For example, the user may specify that the content of a microsite can only be presented between 8 AM and 8 PM on weekdays and between 12 PM and 11 PM on weekends; that the content of a microsite can only be presented when the user is located in her home state of Virginia; that the content of a microsite can only be presented when the user is moving at a speed of less than 20 KPH; or the like.

In some implementations, display module 1040 may present the content of the microsite on the display of user device 910 for a particular amount of time and, thereafter, remove the content of the microsite from the display. In some example implementations, the particular amount of time may be configurable by the user of user device 910. In some example implementations, the particular amount of time may be preset by application module 1010, by an entity associated with ranking system 920, or by an entity associated with server 930 hosting the content of the microsite.

In some implementations, display module 1040 may present the content of the microsite within a particular region of the display of user device 910. The particular region may include the entire display area of the display or a subset of the entire display area of the display. In some example implementations, the size and/or location of the particular region may be configurable by the user of user device 910. In some example implementations, the size and/or location of the particular region may be preset by application module 1010, by an entity associated with ranking system 920, or by an entity associated with server 930 hosting the content of the microsite.

A user may interact with the content of the microsite to dismiss the content—e.g., by swiping the content—or to obtain additional information regarding the content—e.g., by selecting the content. The user's interaction with the microsite content may be recorded as user profile data by user profile module 1020.

Figure 11:
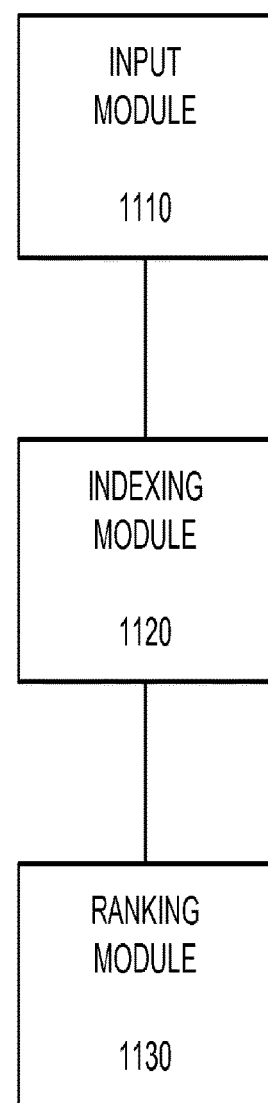
FIG. 11 is a diagram of example functional components of the ranking system of FIG. 9.

FIG. 11 is a diagram of example functional components of ranking system 920. In some implementations, the functional blocks, shown in FIG. 11, may be implemented by ranking system 920. In some implementations, one or more of the functional components, shown in FIG. 11, may be implementation by a device separate from or in combination with ranking system 920.

As shown in FIG. 11, ranking system 920 may include an input module 1110, an indexing module 1120, and a ranking module 1130. In some implementations, ranking system 920 may include additional or fewer functional components than are illustrated in FIG. 11.

Input module 1110 may identify microsites for use by ranking system 920. In some implementations, input module 1110 may identify microsites through crawling. For example, input module 1110 may include or interact with a crawler to locate microsites on a network, such as network 940. The crawler may follow links to locate documents on the network. Input module 1110 may determine which documents are microsites by locating particular information on documents that are microsites. This particular information may include a piece of code that identifies the document as a microsite. In some implementations, the particular information may also include triggering criteria that specifies criteria for when the microcode is a candidate for presentation on a user device 910 and/or a list of sensors that are relevant to the microsite.

In some implementations, input module 1110 may identify microsites via manual input. For example, input module 1110 may provide a user interface via which users may provide information regarding microsites that the users have created. In some implementations, a user, via the user interface, may identify a network address associated with a microsite and/or may specify triggering criteria and a list of sensors that are relevant for the microsite. Additionally, or alternatively, the user, via the user interface, may upload the content of the microsite. The content of the microsite may be hosted by ranking system 920 or a device separate from ranking system 920, such as a server 930.

Indexing module 1120 may include one or more indexes that may be stored in one or more memory devices, which may be co-located or remotely located. In some implementations, indexing module 1120 may store information regarding various microsites in an index. For a particular microsite, for example, the index may store a descriptive name of the particular microsite, a network address for the particular microsite, triggering criteria for the particular microsite, and/or a list of sensors that are relevant for the particular microsite. Ranking module 1130 may use the information in the index to identify microsites that are relevant for a particular user and/or in a particular situation.

Ranking module 1130 may receive user profile data and sensor data from a user device 910. Ranking module 1130 may use the user profile data and/or the sensor data to identify relevant microsites. In some implementations, ranking module 1130 may identify microsites that are relevant based on the sensor data and the triggering criteria, compare the sensor data to the triggering criteria for the microsites, and generate scores for the microsites based on result of the comparisons. For example, ranking module 1130 may perform a first analysis to identify relevant microsites based on the sensor data and the triggering criteria; and perform a second analysis on the relevant microsites, based on a comparison of the sensor data and the triggering criteria, to generate a score for each of the relevant microsites.

In some implementations, ranking module 1130 may identify microsites that are relevant to information in the user profile data, compare the sensor data to the triggering criteria for the microsites, and generate scores for the microsites based on result of the comparisons. For example, ranking module 1130 may perform a first analysis to identify microsites based on the user profile data; perform a second analysis to identify relevant microsites based on the sensor data and the triggering criteria; and perform a third analysis on the relevant microsites, based on a comparison of the sensor data and the triggering criteria, to generate a score for each of the relevant microsites.

In some implementations, ranking module 1130 may modify the score, of a microsite, based on one or more factors. For example, ranking module 1130 may modify the score, of a microsite, based on a popularity score of the microsite. In some implementations, the popularity score of a microsite may be generated based on user behavior data associated with the microsite, such as how many users expressed disinterest in the microsite by, for example, swiping away from the microsite or providing a negative rating when the microsite was presented to a user device 910, and/or how many users expressed interest in the microsite by, for example, providing a positive rating when the microsite was presented to a user device 910, requesting additional information regarding the microsite, or purchasing a service associated with the microsite. In some implementations, the popularity score of a microsite may be generated using one or more factors instead of, or in addition to, the user behavior data, such as a quantity of times that the microsite has been presented to user devices 910, an age of the microsite, a prior ranking or score of the microsite, or the like.

Additionally, or alternatively, ranking module 1130 may modify the score, of a microsite, based on a personalization score of the microsite. In some implementations, the personalization score of a microsite may be generated based on the user profile data, such as user activity data, associated with a user of a particular user device 910, with regard to the microsite. The user activity data may include, for example, whether the user has expressed disinterest in the microsite by, for example, swiping away from the microsite or providing a negative rating when the microsite was presented to the particular user device 910, and/or whether the user expressed interest in the microsite by, for example, providing a positive rating when the microsite was presented to the particular user device 910, requesting additional information regarding the microsite, purchasing a service or product associated with the microsite, bookmarking the microsite, orienting the particular user device 910 to view the microsite without swiping away from the microsite, and/or following a recommendation provided by the microsite—e.g., a recommendation to visit a particular restaurant, see a particular movie, ride a particular bus, or the like. In some implementations, the personalization score of a microsite may be generated using one or more factors instead of, or in addition to, the user profile data, such as whether the user has recommended the microsite to one of the user's friends.

Additionally, or alternatively, ranking module 1130 may modify the score, of a microsite, based on a social score of the microsite. In some implementations, the social score of a microsite may be generated based on friend activity data, associated with social contacts—e.g., friends—of the user of a particular user device 910, with regard to the microsite. The user's friends may be identified based on the user's communications, the user's address book, and/or the user's account on one or more social networks. Examples of friend activity data, associated with a microsite, include whether the user's friends have expressed disinterest in the microsite by, for example, swiping away from the microsite or providing a negative rating when the microsite was presented to the friends' user devices 910, and/or whether the user's friends expressed interest in the microsite by, for example, providing a positive rating when the microsite was presented to the friends' user devices 910, requesting additional information regarding the microsite, purchasing a service associated with the microsite, bookmarking the microsite, and/or following a recommendation provided by the microsite—e.g., a recommendation to visit a particular restaurant, see a particular movie, ride a particular bus, or the like. In some implementations, the social score of a microsite may be generated using one or more factors instead of, or in addition to, the friend activity data, such as whether the friends have recommended the microsite to others.

In some implementations, ranking module 1130 may generate a total score for a microsite based on a combination of the score and the popularity score, the personalization score, and/or the social score. In some implementations, ranking module 1130 may generate a total score for a microsite based on a combination of the score, the popularity score, the personalization score, and the social score. In some implementations, ranking module 1130 may generate a total score for a microsite based on a weighted combination of the score, the popularity score, the personalization score, and the social score. For example, ranking module 1130 may assign a weight value to the score, the popularity score, the personalization score, and/or the social score. The weight values may differ—in other words, the amount that each of the score, the popularity score, the personalization score, and the social score contributes to the total score may vary. Rank module 1130 may combine the weighted score, the weighted popularity score, the weighted personalization score, and/or the weighted social score to generate the total score.

Ranking module 1130 may select a set of microsites based on their scores. For example, ranking module 1130 may select the top scoring X microsites (X≥1). In some implementations, ranking module 1130 may select only the top scoring microsite (X=1). In some implementations, ranking module 1130 may select the top scoring five (5) microsites (X=5).

Ranking module 1130 may provide information, regarding the set of microsites, to user device 910. In some implementations, the information may include a network address and/or a list of sensors for each microsite in the set of microsites. In some implementations, the network addresses of the microsites may be provided in a ranked list based on the scores of the microsites. In some implementations, the network addresses of the microsites may be provided along with the scores of the microsites.

Figure 12:
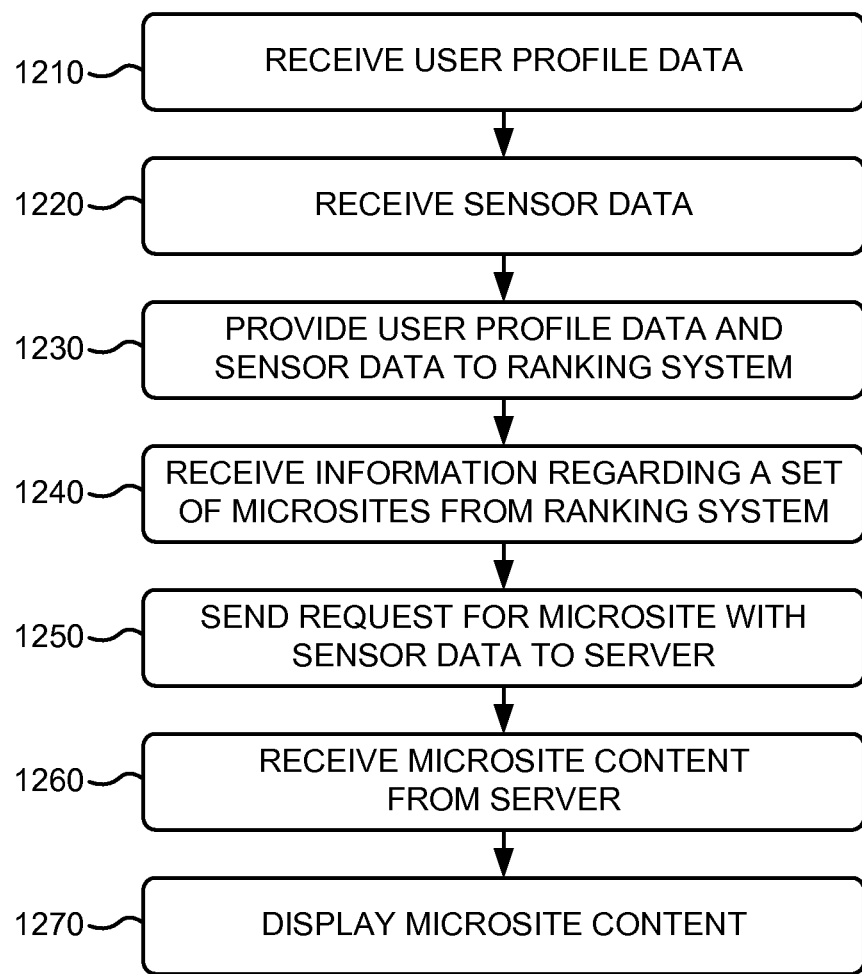
FIG. 12 is a flowchart of an example process for presenting content of a microsite.

FIG. 12 is a flowchart of an example process 1200 for presenting content of a microsite. In some implementations, process 1200 may be performed by user device 910. In some implementations, one or more blocks of process 1200 may be performed by one or more devices instead of, or possibly in conjunction with, user device 910.

Process 1200 may include receiving user profile data (block 1210). For example, user profile module 1020, of user device 910, may receive and store user profile data associated with user device 910 and/or a user of user device 910. User profile module 1020 may receive user profile data from the user and/or may receive user profile data from one or more other components or programs of user device 910. Examples of user profile data have been identified above. User profile module 1020 may provide the user profile data to application module 1010.

Process 1200 may include receiving sensor data (block 1220). For example, sensors module 1030, of user device 910, may receive and store sensor data associated with user device 910. Sensors module 1030 may receive sensor data from one or more components of user device 910 and/or may receive sensor data from one or more devices external to user device 910, such as one or more servers 930 and/or one or more other user devices 910. Examples of sensor data have been identified above. Sensors module 1030 may provide the sensor data to application module 1010.

Process 1200 may include providing the user profile data and the sensor data to ranking system 920 (block 1230). In some implementations, application module 1010, of user device 910, may periodically or regularly provide the user profile data and the sensor data to ranking system 920. Application module 1010 may provide the user profile data and the sensor data to ranking system 920 automatically—e.g., without user input.

As described above, ranking system 920 may receive the user profile data and the sensor data from user device 910. Ranking system 920 may use the user profile data and/or the sensor data to identify a set of relevant microsites. Ranking system 920 may compare the sensor data to the triggering criteria for a microsite and generate a score for the microsite based on a result of the comparison. As described above, ranking system 920 may modify the score based on one or more factors, such as a popularity score, a personalization score, and/or a social score. Ranking system 920 may select a set of microsites based on their scores and provide information, regarding the set of microsites, to user device 910.

Process 1200 may include receiving information regarding a set of microsites from ranking system 920 (block 1240). For example, application module 1010, of user device 910, may receive information, such as network addresses and lists of sensors, for the set of microsites.

Process 1200 may include sending a request for a microsite with sensor data to a server 930 (block 1250). For example, display module 1040 may, for each microsite in the set of microsites, send a request to a server 930 that hosts the microsite. Display module 1040 may use the network address, associated with the microsite, to send the request and provide sensor data associated with the list of sensors that are relevant to the microsite. In some implementations, as described above, the request may take the form of a GET request.

Process 1200 may include receiving microsite content from server 930 (block 1260). In response to sending the request and the sensor data to server 930, server 930 may identify the microsite content to send to user device 910. The microsite content may be dynamic in the sense that the content may change depending on the sensor data received from user device 910. For example, if the microsite relates to an exercise microsite, server 930 may receive information regarding the current geographic location, the current speed, and the current direction of user device 910, and may generate the microsite content based on this information. Server 930 may send the microsite content to display module 1040 of user device 910. Display module 1040 may receive the microsite content from server 930.

Process 1200 may display the microsite content (block 1270). For example, display module 1040 may cause the microsite content to appear on a display associated with user device 910. In some implementations, display module 1040 may determine whether it is an appropriate time to display the microsite content. For example, display module 1040 may determine whether user device 910 has been idle for a particular amount of time and cause the microsite content to be displayed only if user device 910 has been idle for at least the particular amount of time. Alternatively, or additionally, display module 1040 may determine whether user device 910 is in a lock mode and cause the microsite content to be displayed only if user device 910 is in the lock mode. Alternatively, or additionally, display module 1040 may use another factor to determine whether to cause the microsite content to be displayed.

While FIG. 12 shows process 1200 as including a particular quantity and arrangement of blocks, in some implementations, process 1200 may include fewer blocks, additional blocks, or a different arrangement of blocks. Additionally, or alternatively, some of the blocks may be performed in parallel.

Figure 13:
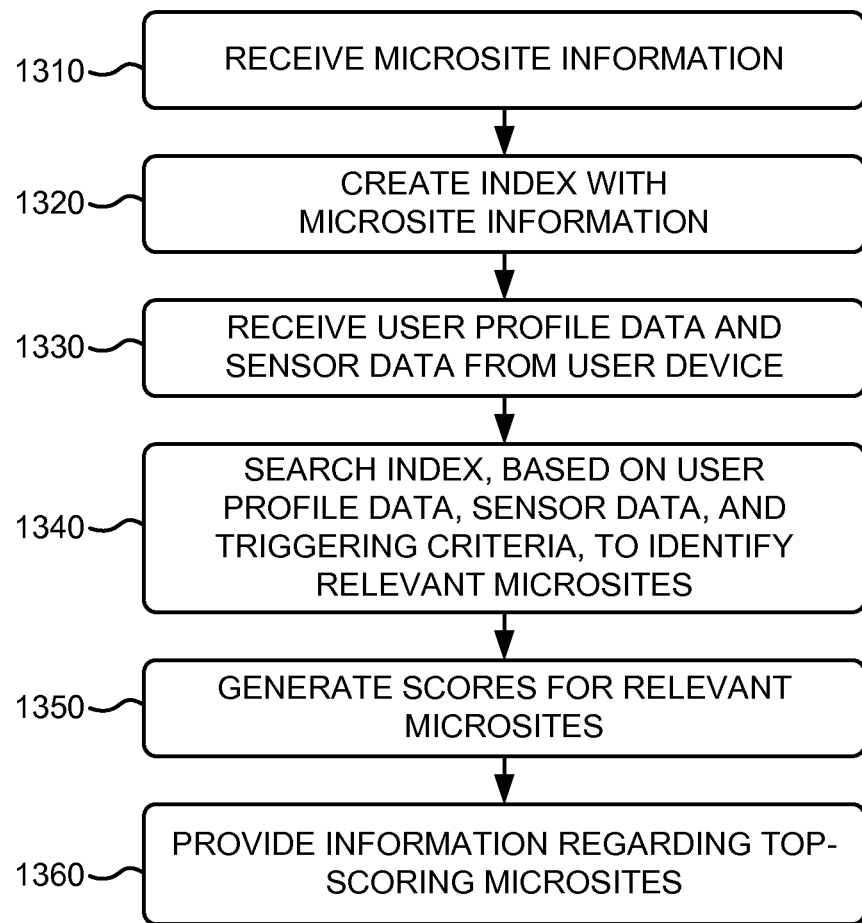
FIG. 13 is a flowchart of an example process for providing information regarding a set of microsites.

FIG. 13 is a flowchart of example process 1300 for providing information regarding a set of microsites. In some implementations, process 1300 may be performed by ranking system 920. In some implementations, one or more blocks of process 1300 may be performed by one or more devices instead of, or possibly in conjunction with, ranking system 920.

Process 1300 may include receiving microsite information (block 1310). For example, input module 1110, of ranking system 920, may include or interact with a crawler that locates microsites via a crawling operation. As described above, the microsites may be located based on a piece of code, located on the microsites, which identifies the microsites as microsites. The microsites may be analyzed to identify information regarding the microsites. Additionally, or alternatively, input module 1110 may receive information regarding microsites via manual input via a user interface provided by input module 1110. In some implementations, input module 1110 may receive or determine microsite information, such as descriptive names of the microsites, network addresses associated with the microsites, triggering criteria that specify when the microsites may be identified for presentation, and/or lists of sensors that are relevant to the content of the microsites.

Process 1300 may include creating an index with the microsite information (block 1320). For example, indexing module 1120, of ranking system 920, may store the microsite information in an index. For a particular microsite, indexing module 1120 may store a descriptive name for the particular microsite, a network address for the particular microsite, triggering criteria for the particular microsite, and/or a list of sensors for the particular microsite.

Process 1300 may include receiving user profile data and sensor data from user device 910 (block 1330). For example, as described above, user device 910 may automatically and periodically/regularly send user profile data and sensor data to ranking system 920. Ranking module 1130, of ranking system 920, may receive the user profile data and the sensor data from user device 910.

Process 1300 may include searching the index, based on the user profile data, the sensor data, and the triggering criteria, to identify relevant microsites (block 1340), and generating scores for the relevant microsites (block 1350). For example, ranking module 1130 may identify relevant microsites, in the index of indexing module 1120, based on the user profile data and/or the sensor data, as described above. Ranking module 1130 may generate a score for a relevant microsite based on how well the sensor data matches the triggering criteria for the relevant microsite. In some implementations, as described above, ranking module 1130 may modify the score, for the microsite, based on one or more factors, such as a popularity score, a personalization score, and/or a social score for the microsite, to generate a total score for the microsite.

Process 1300 may include providing information regarding top-scoring microsites (block 1360). For example, ranking module 1130 may select a set of the relevant microsites based on their scores, such as the top scoring X microsites.

Ranking module 1130 may provide information, regarding the set of relevant microsites, to user device 910. In some implementations, as described above, the information may include a network address and a list of sensors for each microsite in the set of relevant microsites. User device 910 may use the network address, of a microsite, to retrieve the content of the microsite from a server 930.

While FIG. 13 shows process 1300 as including a particular quantity and arrangement of blocks, in some implementations, process 1300 may include fewer blocks, additional blocks, or a different arrangement of blocks. Additionally, or alternatively, some of the blocks may be performed in parallel.

Figure 14:
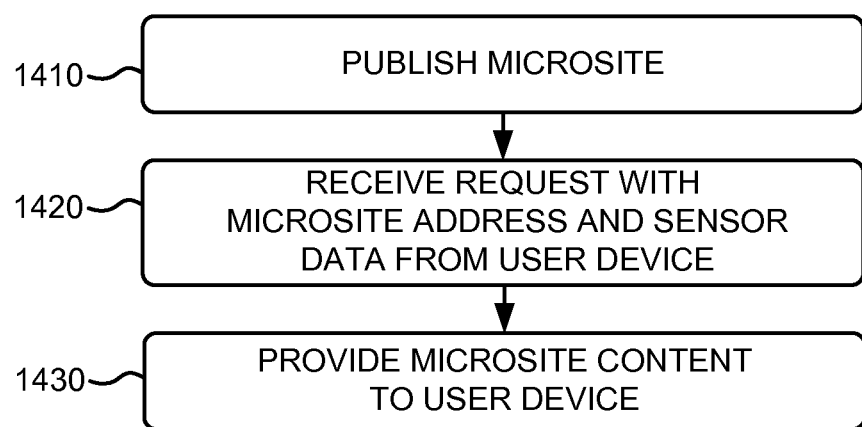
FIG. 14 is a flowchart of an example process for providing content of a microsite.

FIG. 14 is a flowchart of example process 1400 for providing content of a microsite. In some implementations, process 1400 may be performed by server 930. In some implementations, one or more blocks of process 1400 may be performed by one or more devices instead of, or possibly in conjunction with, server 930.

Process 1400 may include publishing a microsite (block 1410). For example, a user may create a microsite and store the content for the microsite on server 930. Server 930 may host the microsite and connect to network 960 to make the microsite available to user devices 910 and ranking system 920. In some implementations, ranking system 920 may crawl the content of the microsite. In some implementations, the user may upload information, regarding the microsite, to ranking system 920.

Process 1400 may include receiving a request with a network address and sensor data from a user device 910 (block 1420). For example, server 930 may receive a request from a user device 910. As described above, user device 910 may use the network address of a microsite to access the microsite. The content of the microsite may be dynamic in the sense that the content may be generated based on the sensor data. In other words, server 930 may generate the microsite content based on the sensor data received from user device 910. In some implementations, server 930 may simply provide the content of the microsite without knowing the identity of user device 910 or identity of the user of user device 910.

Process 1400 may include providing microsite content to user device 910 (block 1430). For example, server 930 may provide the microsite content to user device 910. In some implementations, the microsite content may be provided as HTML content, CSS content, or Javascript content.

While FIG. 14 shows process 1400 as including a particular quantity and arrangement of blocks, in some implementations, process 1400 may include fewer blocks, additional blocks, or a different arrangement of blocks. Additionally, or alternatively, some of the blocks may be performed in parallel.

Figure 15:
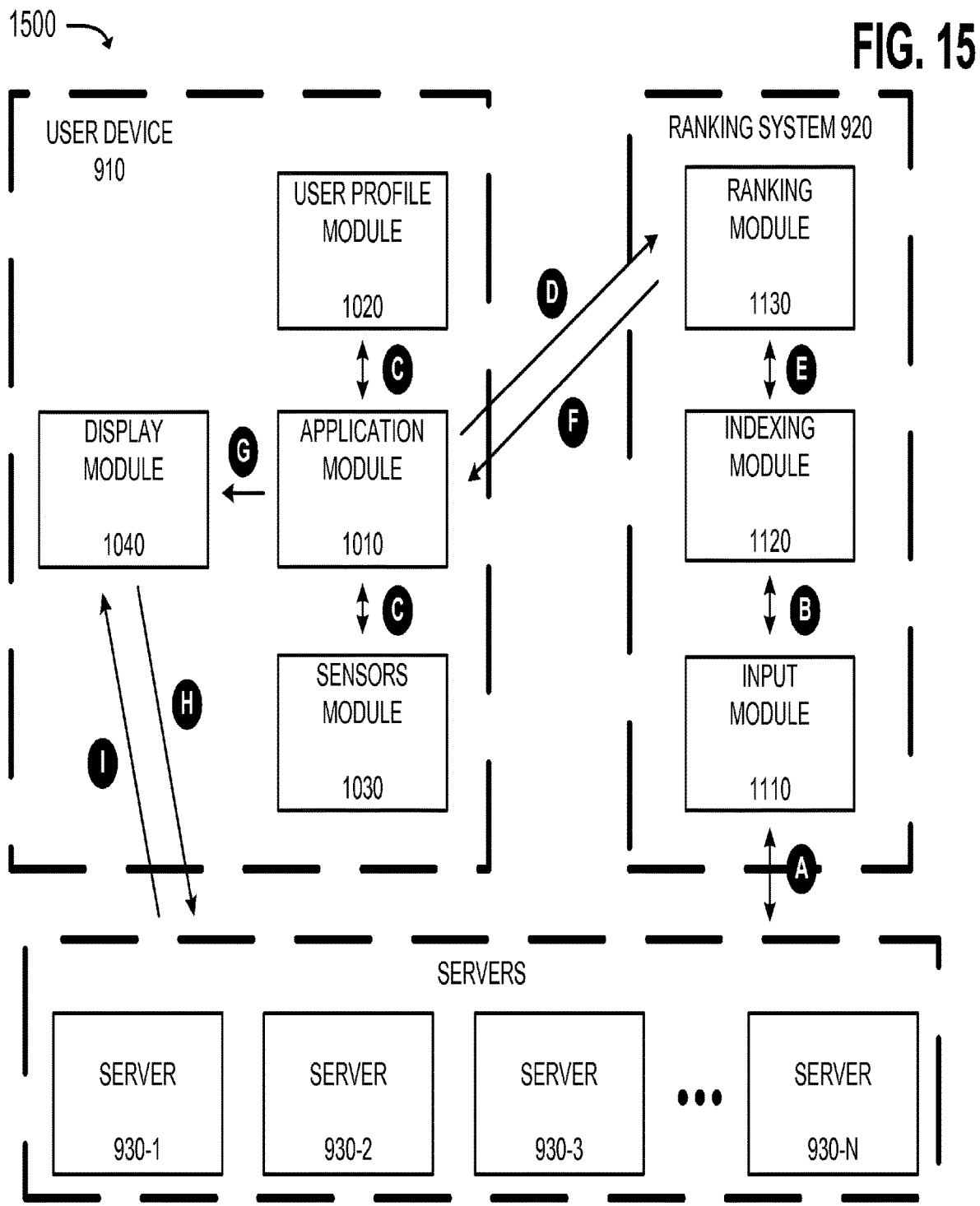
FIG. 15 is a diagram illustrating an example process flow that involves the user device, the ranking system, and the servers of FIG. 9.

FIG. 15 is a diagram of illustrating an example process flow 1500 that involves user device 910, ranking system 920, and servers 930. While FIG. 15 shows process flow 1500 as including a particular sequence of interactions among user device 910, ranking system 920, and servers 930, in some implementation, some of these interactions may occur in another order or in parallel.

As shown at (A) in FIG. 15, input module 1110, of ranking system 920, may identify microsites for use by ranking system 920. In some implementations, as described above, input module 1110 may identify microsites through crawling and/or via manual input. In either situation, input module 1110 may obtain information regarding a particular microsite, such as a descriptive name of the particular microsite, a network address for the particular microsite, triggering criteria for the particular microsite, and/or a list of sensors that are relevant for the particular microsite.

As shown at (B) in FIG. 15, input module 1110, of ranking system 920, may provide information regarding various microsites to indexing module 1120. Indexing module 1120 may store information regarding the microsites in one or more indexes. In some implementations, as described above, indexing module 1120 may store, for a particular microsite in an index, a descriptive name of the particular microsite, a network address for the particular microsite, triggering criteria for the particular microsite, and/or a list of sensors that are relevant for the particular microsite.

As shown at (C) in FIG. 15, application module 1010, of user device 910, may obtain user profile data from user profile module 1020 and/or may obtain sensor data from sensors module 1030. The user profile data may include various information regarding user device 910 and/or a user of user device 910. Examples of user profile data have been given above. The sensor data may include various information regarding user device 910 and/or conditions associated with user device 910. Examples of sensor data have been given above.

As shown at (D) in FIG. 15, application module 1010 may provide the user profile data and/or the sensor data to ranking system 920. As described above, application module 1010 may automatically—e.g., without requiring an instruction from a user of user device 910—provide the user profile data and/or the sensor data to ranking system 920. Ranking module 1130, of ranking system 920, may receive the user profile data and/or the sensor data.

As shown at (E) in FIG. 15, ranking module 1130 may use the user profile data and/or the sensor data to identify relevant microsites. As described above, in some implementations, ranking module 1130 may identify relevant microsites, in the index, based on the sensor data and the triggering criteria, and generate a score for the relevant microsites based on a result of a comparison of the sensor data and the triggering criteria. As also described above, in some implementations, ranking module 1130 may identify microsites, in the index, based on the user profile data, determine which of these microsites is relevant based on the sensor data and the triggering criteria, and generate a score for the relevant microsites based on a result of a comparison of the sensor data and the triggering criteria. As described above, in some implementations, ranking module 1130 may modify the score, for a microsite, based on one or more factors to generate a total score for the microsite. Ranking module 1130 may use the score, or total score, to identify a set of relevant microsites.

As shown at (F) in FIG. 15, ranking module 1130 may provide information, regarding the set of relevant microsites, to user device 910. As explained above, in some implementations, the information may include, for each microsite in the set of relevant microsites, a network address for the microsite and a list of sensors relevant to the microsite. Application module 1010, of user device 910, may receive the information regarding the set of relevant microsites.

As shown at (G) in FIG. 15, application module 1010 may provide the information, regarding the set of relevant microsites, to display module 1040 of user device 910. Display module 1040 may receive the information regarding the set of relevant microsites. Display module 1040 may obtain sensor data associated with the list of sensors that have been identified as relevant to the relevant microsites. For each relevant microsite, display module 1040 may generate a request that includes the network address for the relevant microsite and the sensor data relevant to the relevant microsite.

As shown at (H) in FIG. 15, display module 1040 may transmit the requests to one or more servers 930. Whether display module 1040 transmits the requests to more than one server 930 depends on which server(s) 930 is/are hosting the relevant microsites. In other words, all of the relevant microsites may be hosted by a single server 930, all of the relevant microsites may be hosted by separate, different servers 930, or something in between these two extremes.

Server(s) 930 may receive the requests from user device 910 may obtain content of the relevant microsites. In some implementations, as described above, the content of a relevant microsite may be dynamic in the sense that the content of the relevant microsite is based on the sensor data received from user device 910.

As shown at (I) in FIG. 15, server(s) 930 may provide the content of the relevant microsites to user device 910. Display module 1040, of user device 910, may receive the content and present the content on a display associated with user device 910. For example, display module 1040 may push the content, for the relevant microsites, as a sliding display of content. In some implementations, content for one of the relevant microsites may be presented on the display at a time. A user, of user device 910, may interact with the content, using a finger or the like, to express the user's interest or disinterest in the content or to see the content for another one of the relevant microsites.

Figure 16:
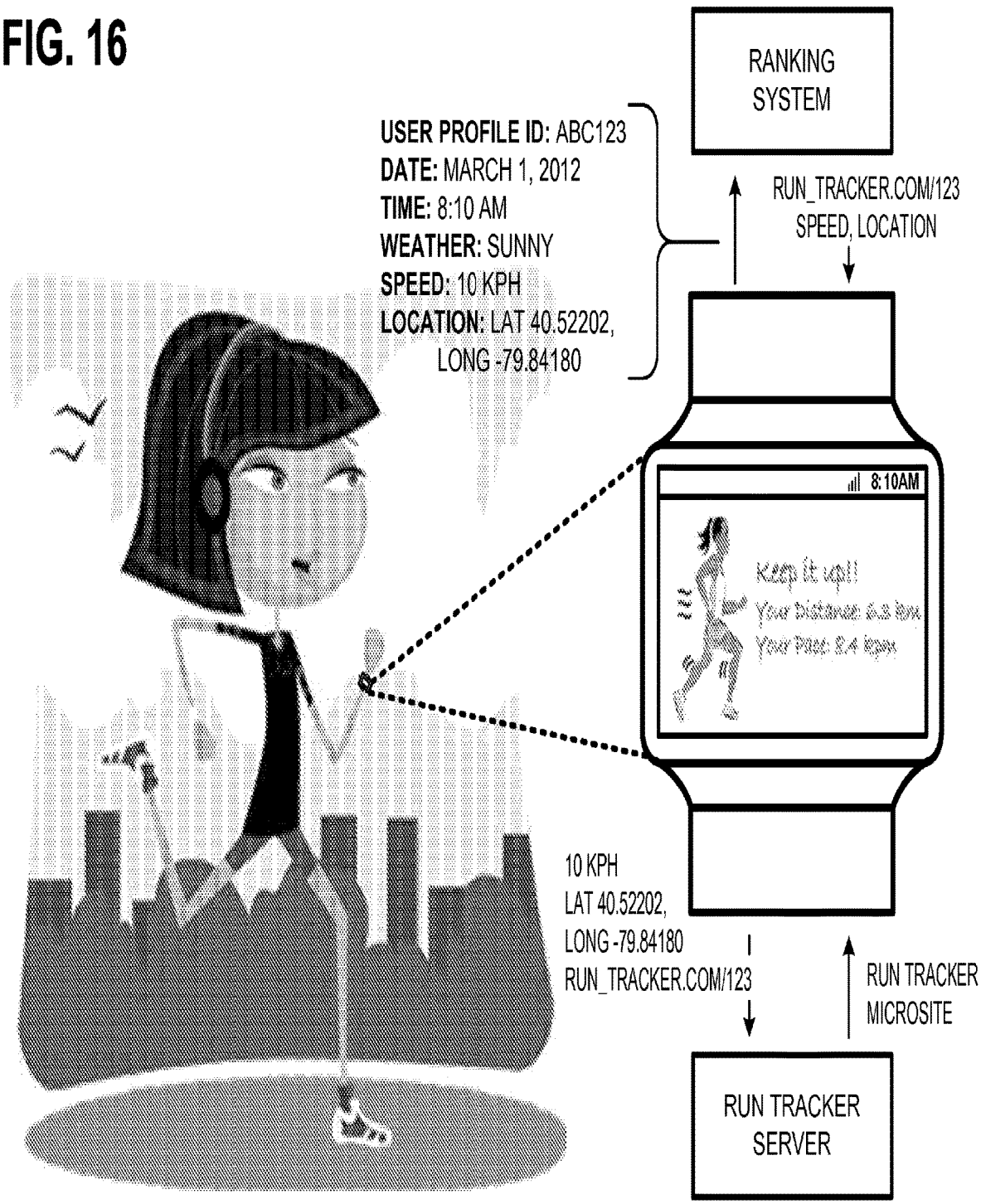
FIG. 16, FIG. 17A, FIG. 17B, FIG. 17C, and FIG. 17D illustrate examples of microsite content that may be presented in certain contexts.

FIG. 16 illustrates an example of microsite content that may be presented in a certain context. As shown in FIG. 16, assume that a user ("Emma") goes out for a run and takes, with her, a user device in the form of a watch. The watch sends user profile data and sensor data to the ranking system. As shown in FIG. 16, assume that the user profile data includes information identifying Emma's user profile—i.e., ABC123—which may include any kind of identifier that the ranking system may use to locate Emma's user profile. The ranking system may obtain Emma's preferences from her user profile. As further shown in FIG. 16, assume that the sensor data includes information identifying the current date—i.e., Mar. 1, 2012; the current time—i.e., 8:10 AM; the current weather condition—i.e., sunny; Emma's current speed—i.e., 10 kilometers per hour (KPH); and Emma's current geographic location—i.e., latitude (LAT) 40.52202 and longitude (LONG) −79.84180.

Assume that the ranking system identifies, based on the user profile data and the sensor data, that a Run Tracker microsite is relevant. For example, the Run Tracker microsite might have triggering criteria that specifies a condition that the user be moving at a speed between 3 KPH and 20 KPH during the hours between 6 AM and 8 PM. In this case, Emma's sensor data indicates that she is moving at a speed of 10 KPH, which is between 3 KPH and 20 KPH, at 8:10 AM, which is between 6 AM and 8 PM. Thus, the ranking system identifies the Run Tracker microsite as a relevant microsite.

The ranking system may provide, to the watch, information associated with the Run Tracker microsite, such as a network address for the microsite—i.e., run tracker.com/123—and a list of sensors relevant to the microsite—i.e., speed and location. The watch may receive the information associated with the Run Tracker microsite and generate a request based on the information.

The watch may transmit the request, including the network address of run tracker.com/123 and the sensor data that includes the speed of 10 KPH and the location of LAT 40.52202 and LONG −79.84180, to a server associated with the Run Tracker microsite— hereinafter called the run tracker server. The run tracker server may process the sensor data to generate and/or modify the content of the Run Tracker microsite. The run tracker server may provide the content of the Run Tracker microsite to the watch. The watch may then display the content of the Run Tracker microsite on its display. As shown in FIG. 16, the Run Tracker microsite may display the distance that Emma has run and her current pace.

Figure 17A:
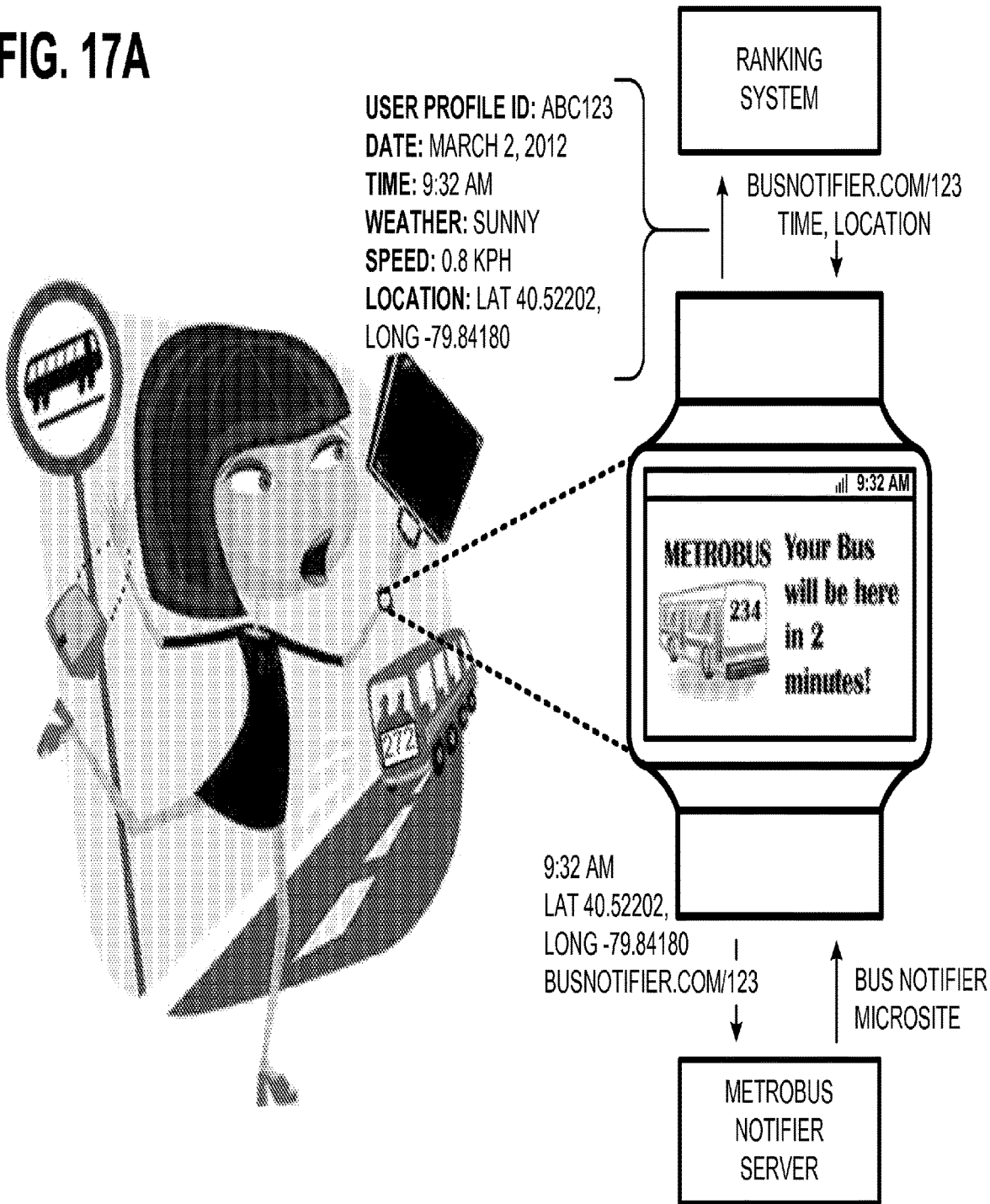

FIGS. 17A-17D illustrate examples of microsite content that may be presented in a certain context. As shown in FIG. 17A, assume that a user ("Emma") is walking to work and takes, with her, a user device in the form of a watch. The watch sends user profile data and sensor data to the ranking system. As shown in FIG. 17A, assume that the user profile data includes information identifying Emma's user profile—i.e., ABC123—which may include any kind of identifier that the ranking system may use to locate Emma's user profile. The ranking system may obtain Emma's preferences from her user profile. As further shown in FIG. 17A, assume that the sensor data includes information identifying the current date—i.e., Mar. 2, 2012; the current time—i.e., 9:32 AM; the current weather condition—i.e., sunny; Emma's current speed—i.e., 0.8 kilometers per hour (KPH); and Emma's current geographic location— i.e., latitude (LAT) 40.52202 and longitude (LONG) −79.84180.

Assume that the ranking system identifies, based on the user profile data and the sensor data, that a Bus Notifier microsite is relevant. For example, the Bus Notifier microsite might have triggering criteria that specifies that the user be moving at a speed below 3 KPH and that the user be located within 50 meters of a bus stop within 5 minutes of the scheduled time that a bus is going to arrive at the bus stop. In this case, Emma's sensor data indicates that she is moving at a speed of 0.8 KPH, which is below 3 KPH, that she is located within 5 meters of a bus stop, and that, based on the current time of 9:32 AM, a bus is scheduled to arrive in 2 minutes. Thus, the ranking system identifies the Bus Notifier microsite as a relevant microsite.

The ranking system may provide, to the watch, information associated with the Bus Notifier microsite, such as a network address for the microsite—i.e., busnotifier.com/123—and a list of sensors relevant to the microsite—i.e., time and location. The watch may receive the information associated with the Bus Notifier microsite and generate a request based on the information.

The watch may transmit the request, including the network address of busnotifier.com/123 and the sensor data that includes the current time of 9:32 AM and the location of LAT 40.52202 and LONG −79.84180, to a server associated with the Bus Notifier microsite—hereinafter called the metrobus notifier server. The metrobus notifier server may process the sensor data to generate and/or modify the content of the Bus Notifier microsite. The metrobus notifier server may provide the content of the Bus Notifier microsite to the watch. The watch may then display the content of the Bus Notifier microsite on its display.

Figure 17B:
Figure 17C:
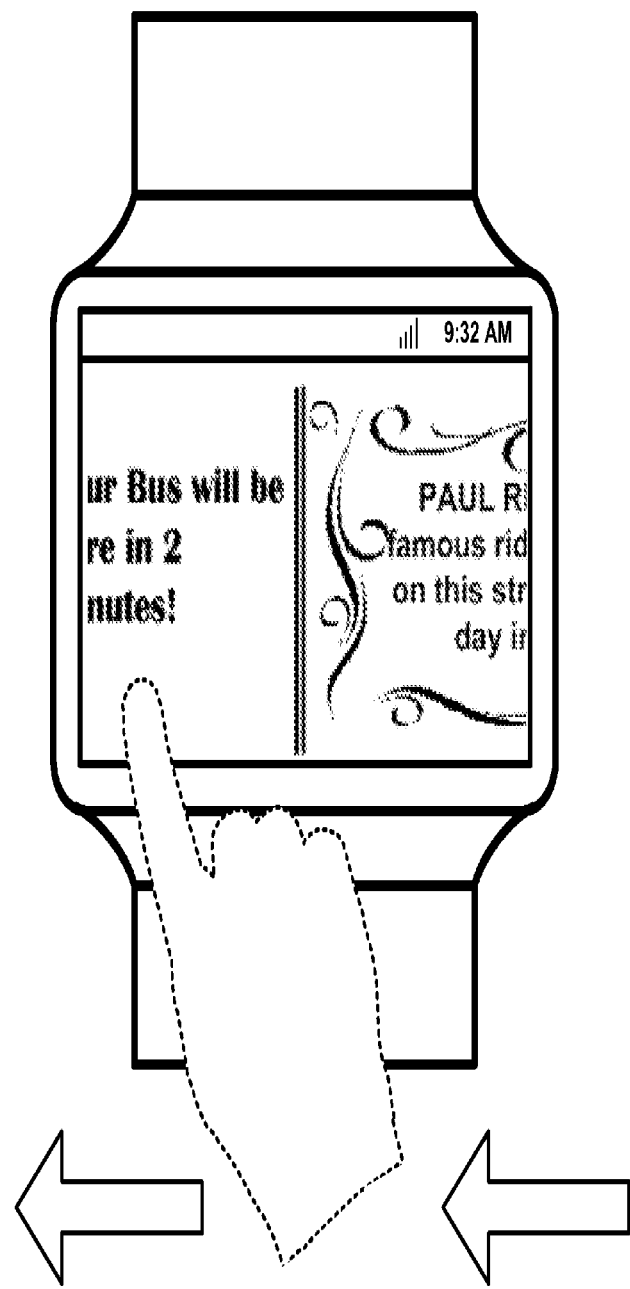
Figure 17D:
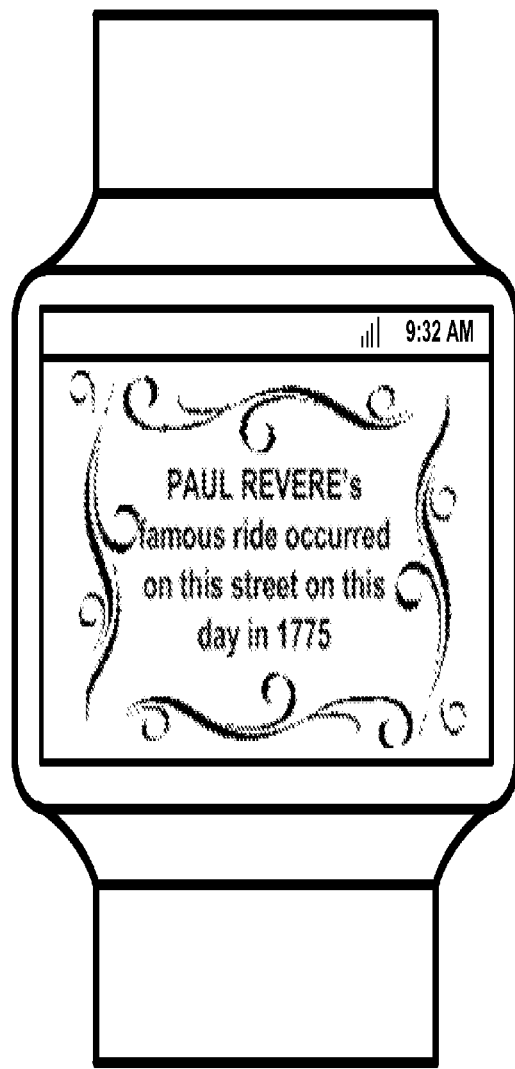

Assume, for the purposes of FIGS. 17B-17D, that, in the above example, the ranking system not only provided information regarding the Bus Notifier microsite, but also provided information regarding a history microsite. Assume that the history microsite provides historical facts relating to a user's location and the current day.

As shown in FIG. 17B, the watch may display the content of the Bus Notifier microsite. Emma may interact with the content using, for example, her finger. Assume that Emma is disinterested in the content of the Bus Notifier microsite and uses her finger to swipe away from the Bus Notifier microsite. Information regarding Emma's disinterest in the Bus Notifier microsite, as evidenced by her swiping away from the Bus Notifier microsite, may be recorded as additional user profile data.

As shown in FIG. 17C, Emma swipes the screen of the watch with her finger. As a result of the swiping action, the watch displays the content of the next microsite—i.e., the content of the history microsite, as shown in FIG. 17D. The history microsite indicates a historical fact relating to Emma's current location on this day—i.e., Paul Revere's famous ride occurred on the street on which Emma is walking on this day in 1775.

A system and method, described herein, may push a microsite to a user device based on context data without the need for a user, of the user device, to request the microsite. The microsite may provide information that may be useful to the user.

Example 3

A system and/or method, as described herein, may provide information regarding a relevant microsite to a user device based on context data. The context data may include user profile data relating to the user or the user device and/or sensor data relating to one or more conditions associated with the user device. The relevant microsite may be determined based on popularity data associated with the microsite, personalization data associated with the user, and/or social data associated with a social contact of the user. The microsite may provide information that may be useful to the user.

Figure 18:
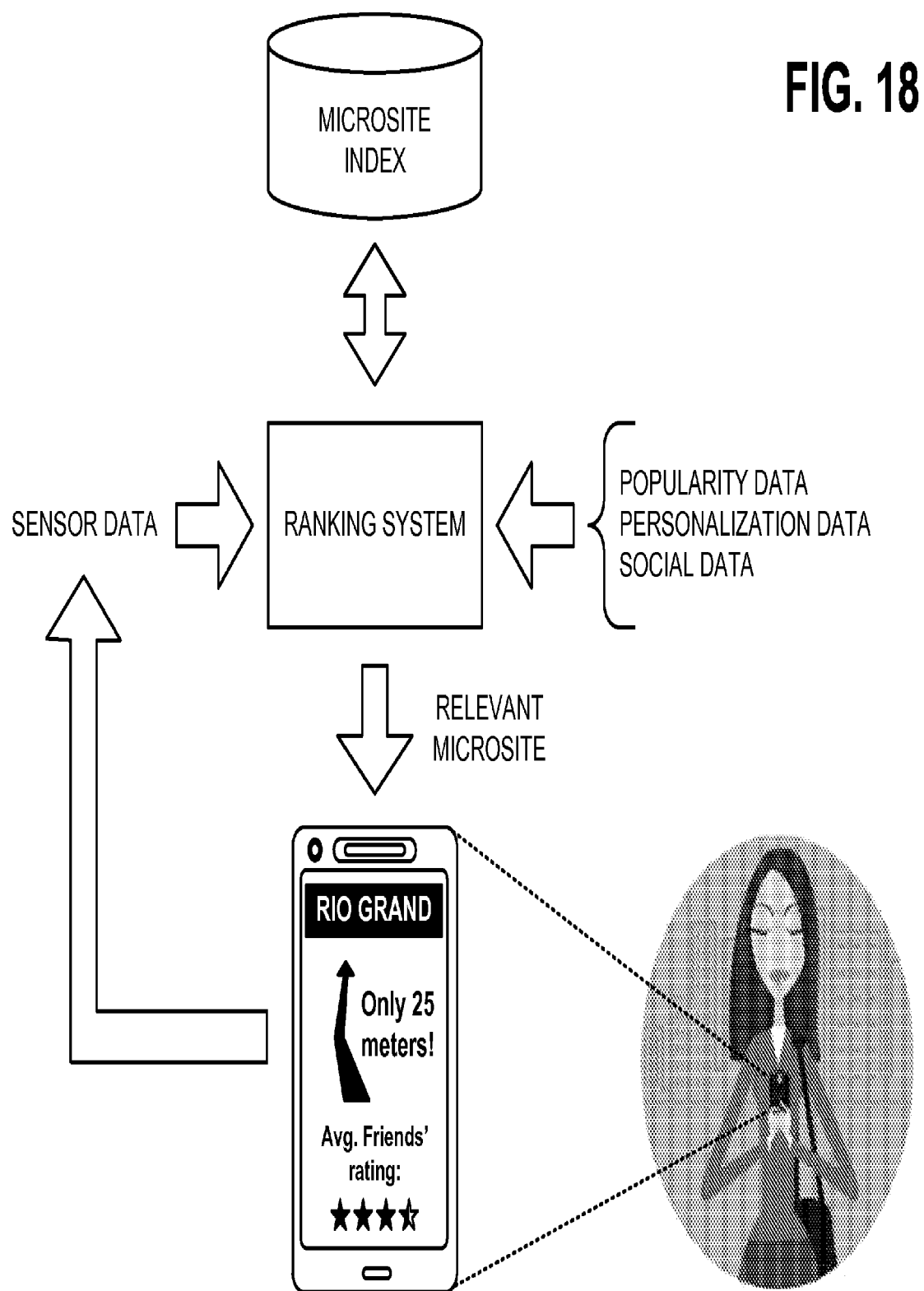
FIG. 18 is a diagram illustrating an overview of an example implementation described herein.

FIG. 18 is a diagram illustrating an overview of an example implementation described herein. Assume that a user ("Mary") is walking in the city and has her mobile device with her. Mary's mobile device may send sensor data, such as information regarding the current date and time, Mary's current geographic location, Mary's current speed and direction, or the like, to a ranking system.

The ranking system may maintain a microsite index. The microsite index may store information regarding microsites. For a particular microsite, the microsite index may store triggering criteria that indicates when the particular microsite is relevant. The ranking system may compare the sensor data, from Mary's mobile device, to the triggering criteria in the microsite index to identify a set of relevant microsites.

The ranking system may generate scores for the relevant microsites based on popularity data, personalization data, and/or social data. The popularity data, for a particular microsite, may reflect a measure of popularity of the particular microsite. Assume, for the example of FIG. 18, that a microsite for the Rio Grand restaurant has been identified as a popular microsite. The personalization data may reflect a measure of interest, by a user, in the particular microsite. Assume, for the example of FIG. 18, that Mary has expressed an interest in the Rio Grand restaurant by, for example, accessing a web site associated with the Rio Grand restaurant, entering information in her calendar regarding a lunch date at the Rio Grand restaurant on more than one occasion, and communicating with a friend about meeting at the Rio Grand restaurant. The social data may reflect a measure of interest, by a social contact of the user, in the particular microsite. Assume, for the example of FIG. 18, that Mary's friends Bob, Alice, and Diane have expressed an interest in the Rio Grand restaurant by, for example, posting information regarding a recent dinner at the Rio Grand restaurant on a social network, visiting the Rio Grand restaurant, and/or giving a favorable rating to the Rio Grand microsite.

The ranking system may select one or more of the relevant microsites based on the scores of the relevant microsites. Assume that the Rio Grand microsite is the highest scoring microsite in the set of relevant microsites. As shown in FIG. 18, the ranking system may provide information regarding the Rio Grand microsite to Mary's mobile device. Mary's mobile device may, thereafter, display the content of the Rio Grand microsite. As shown in FIG. 18, the content of the Rio Grand microsite may include information regarding the distance to the restaurant relative to Mary's current location and information regarding Mary's friends' average rating. As a result, Mary may be presented with information in which Mary is interested without the need for Mary to request the information.

Figure 19:
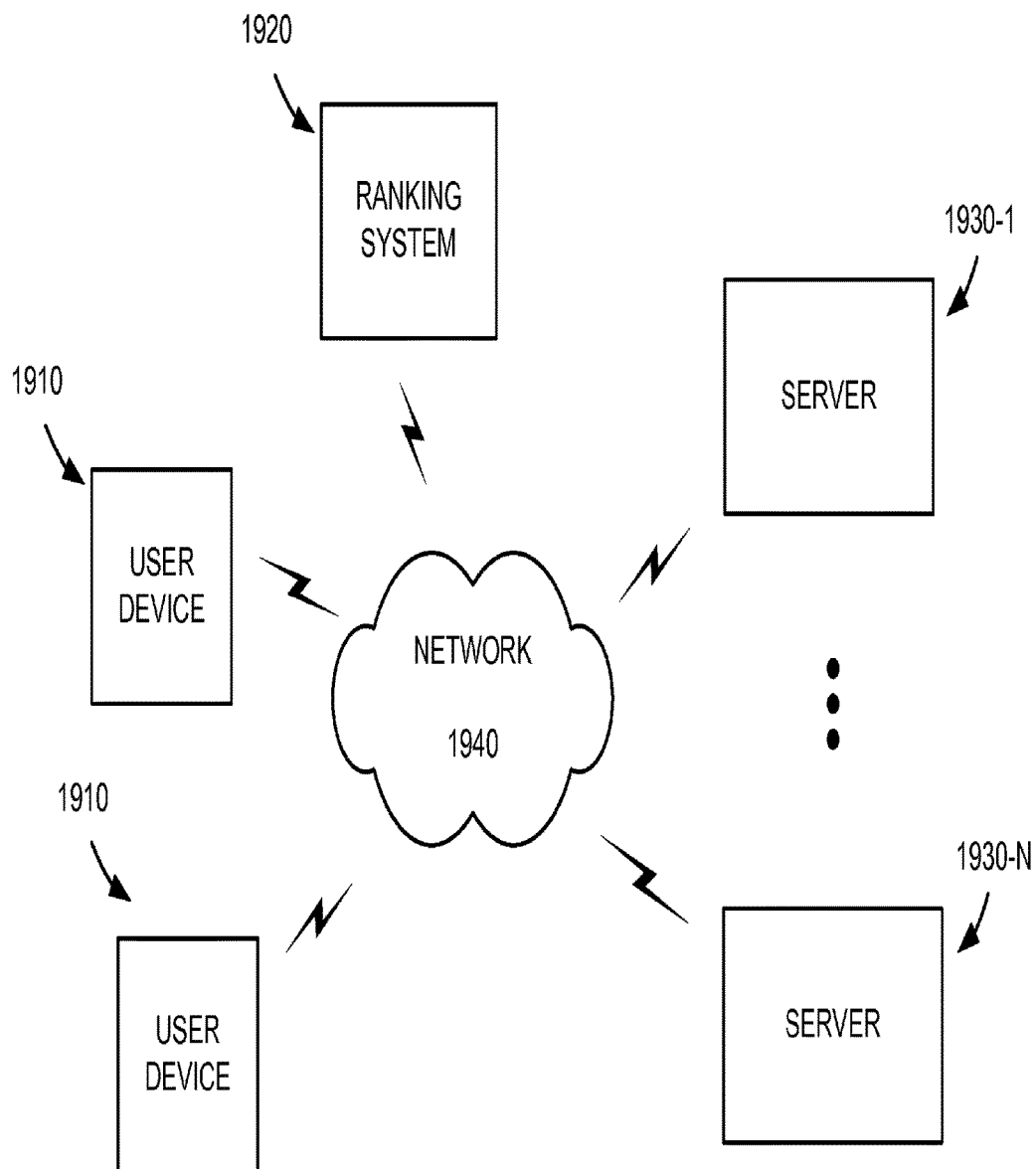
FIG. 19 is a diagram of an example environment in which systems and/or methods described herein may be implemented.

FIG. 19 is a diagram of an example environment 1900 in which systems and/or methods described herein may be implemented. Environment 1900 may include multiple user devices 1910 connected to ranking system 1920, and multiple servers 1930-1, . . . , 1930-N(N≥1) (referred to collectively as "servers 1930," and individually as "server 1930") via a network 1940.

User device 1910 may include a client device, or a collection of client devices, that is capable of presenting a microsite on a display. Examples of user device 1910 may include a smart phone, a personal digital assistant, a laptop, a tablet computer, a personal computer, a watch, a gaming device, or a combination of these and/or other devices. User device 1910 may include one or more browsers via which microsites may be presented on a display associated with user device 1910.

Ranking system 1920 may include a server device or a collection of server devices which may be co-located or remotely located. Ranking system 1920 may identify microsites and index information associated with the microsites. Ranking system 1920 may identify relevant microsites to present to a user device 1910, based on context data received from user device 1910 and criteria for triggering the presentation of the microsites, generate scores for the relevant microsites based on popularity data, personalization data, and/or social data, and provide information regarding the relevant microsites, based on the scores, to user device 1910.

Server 1930 may include a server device or a collection of server devices that may be co-located or remotely located. Any two or more of servers 1930 may be implemented within a single, common server device or a single, common collection of server devices. Servers 1930 may host microsites. In some implementations, one or more of servers 1930 may be affiliated with a same entity (e.g., party, organization, business, company, etc.) as ranking system 1920. In some implementations, none of servers 1930 may be affiliated with the same entity as ranking system 1920.

While ranking system 1920 is shown as separate from servers 1930, it may be possible for ranking system 1920 to perform one or more of the functions described as being performed by a server 1930 and/or a server 1930 to perform one or more of the functions described as being performed by ranking system 1920. For example, ranking system 1920 may host some of the microsites. Additionally, or alternatively, a user device 1910 may host some of the microsites.

While ranking system 1920 is shown as separate from user device 1910, it may be possible for user device 1910 to perform one or more of the functions described as being performed by ranking system 1920 and/or ranking system

1920 to perform one or more of the functions described as being performed by user device 210.

Network 1940 may include any type of network, such as a local area network ("LAN"), a wide area network ("WAN"), a telephone network, such as the Public Switched Telephone Network ("PSTN") or a cellular network, an intranet, the Internet, or a combination of networks. User devices 1910, ranking system 1920, and servers 1930 may connect to network 1940 via wired and/or wireless connections. In other words, any one of user devices 1910, ranking system 1920, and/or servers 1930 may connect to network 1940 via a wired connection, a wireless connection, or a combination of a wired connection and a wireless connection.

While FIG. 19 shows environment 1900 as having a particular quantity and arrangement of user devices 1910, ranking system 1920, servers 1930, and network 1940, in some implementations, environment 1900 may include fewer, additional, or different user devices 1910, ranking system 1920, servers 1930, and network 1940 than are shown in FIG. 19.

Figure 20:
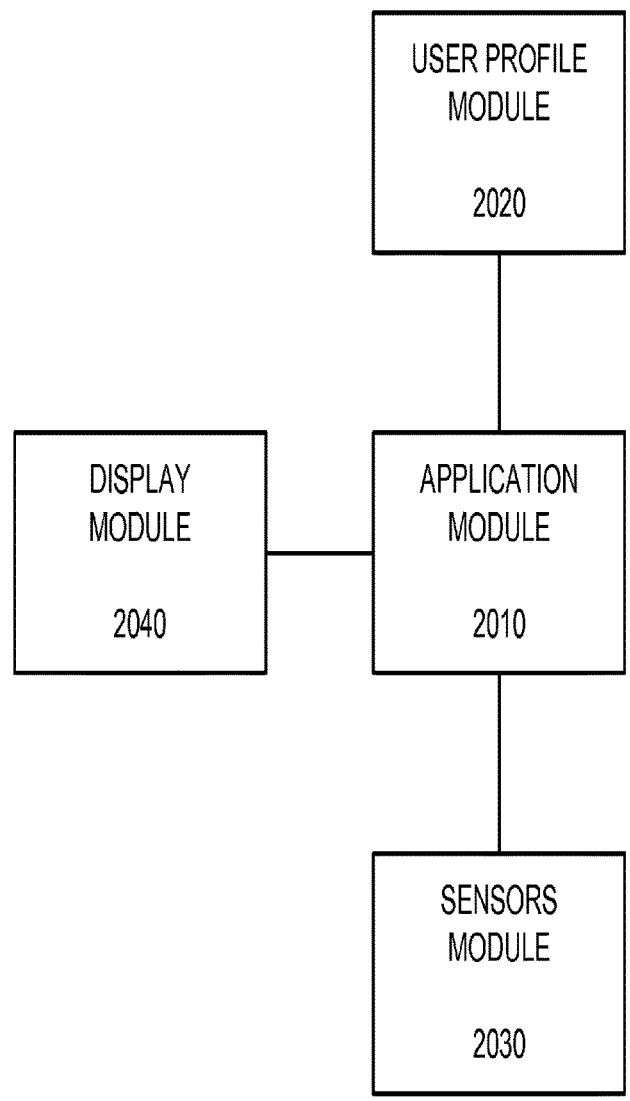
FIG. 20 is a diagram of example functional components of the user device of FIG. 19.

FIG. 20 is a diagram of example functional components of user device 1910. As shown in FIG. 20, user device 1910 may include an application module 2010, a user profile module 2020, a sensors module 2030, and a display module 2040. In some implementations, the functional components, shown in FIG. 20, may be implemented by user device 1910. In some implementations, one or more of the functional components, shown in FIG. 20, may be implemented by a device separate from user device 1910, such as another user device 1910 operating in combination with user device 1910.

Application module 2010 may control the operation of user device 1910 with regard to the presentation of microsites on user device 1910. In some implementations, application module 2010 may take the form of a browser application. In some implementations, application module 2010 may automatically run when user device 1910 powers on or boots up, or may run when instructed by a user of user device 1910. In some implementations, application module 2010 may run in the background on user device 2010. The user, of user device 1910, may stop application module 2010 from running at any time.

Application module 2010 may obtain information from user profile module 2020 and sensors module 2030 and provide the information to ranking system 1920. Application module 2010 may also receive information regarding one or more microsites from ranking system 1920. In some implementations, the information, regarding a microsite, may include a network address, such as a Uniform Resource Locator (URL) or Uniform Resource Identifier (URI), associated with the microsite from ranking system 1920. Additionally, or alternatively, the information, regarding a microsite, may include a list of sensors that is relevant to the content of the microsite. Application module 2010 may provide the information to display module 2040. In some implementations, application module 2010 may automatically obtain information from user profile module 2020 and/or sensors module 2030, and/or automatically provide the information to ranking system 1920—e.g., without input from a user of user device 1910. In some implementations, application module 2010 may periodically provide the information to ranking system 1920—e.g., according to no predefined schedule. In some implementations, application module 2010 may regularly provide the information to ranking system 1920—e.g., according to a predefined schedule. In some implementations, application module 2010 may provide the information to ranking system 1920 based on a schedule identified by the user of user device 1910—e.g., every 5 minutes between 10 AM and 11 PM when user device 1910 has been idle for at least 5 minutes but not when user device 1910 is charging. In some implementations, application module 2010 may provide the information to ranking system 1920 according to some other criteria.

User profile module 2020 may obtain, store, and/or provide user profile data. User profile data may include various information regarding user device 1910, a user of user device 1910, and/or one or more other user devices 1910 associated with the user of user device 1910. The user profile data may only be obtained, stored, and/or provided with the user's express permission, and the user profile data may be anonymized with regard to the identity of the user. In some implementations, user profile module 2020 may store some user profile data and an identifier associated with additional user profile data, which may be stored externally to user device 1910, such as at ranking system 1920 or at a server or another device accessible by ranking system 1920. In some implementations, user profile module 2020 may simply store an identifier associated with the user profile data, which may be stored externally to user device 1910, such as at ranking system 1920 or at a server or another device accessible by ranking system 1920. Thus, references, herein, to user profile data may refer to an identifier associated with the user profile data.

Examples of user profile data may include information regarding geographic addresses associated with the user, such as the address of the user's home, the address of the user's place of business, the address of a location frequented by the user, etc.; information inputted into a calendar associated with the user; information regarding the user's interaction with microsites that have been presented to the user, such as ratings given to the microsites, whether the user has dismissed—e.g., swiped away—from microsites that have been presented to the user, or the like; information regarding the user's communications, such as e-mails, text messages, instant messages, voicemail messages, or the like; information regarding the user's activity on the web, such as information regarding the user's searches, the user's browsing activity, the user's posts on social networks, blogs, and/or other public web sites; information regarding the user's social contacts, such as identifiers—e.g., identifiers that are anonymized with regard to the identities of particular individuals—associated with people listed in the user's address book, people friended by the user on social networks or other public web sites, people with whom the user has communicated, or other people having a social relationship with the user; and/or information regarding the user's habits, such as places that the user has visited, things that the user has done, at what time the user usually gets up in the morning, or the like. While certain examples of user profile data have been identified above, other types of user profile data are possible.

The user may review, add, remove, and/or revise the user profile data at any time. In some implementations, the user may specify what type of information is to be used for the user profile data and for what purpose. For example, the user may specify that the information regarding the user's activity on the web is to be used for the user profile data, and the information regarding the user's communications is not to be used for user profile data. Additionally, or alternatively, the user may specify that all or some of the user profile data may be used for generating a personalization score—described below—that can be used when determining what microsite content to present to the user. Additionally, or alternatively, the user may specify that all or some of the user profile data may be used for generating a social score—described below—that can be used when determining what microsite content to present to another user, for whom the user is a social contact.

Sensors module 2030 may obtain, store, and/or provide sensor data. Sensor data may include various information regarding user device 1910 and/or conditions associated with user device 1910. The sensor data may only be obtained, stored, and/or provided with the user's express permission, and the sensor data may be anonymized with regard to the identity of the user. Sensor module 2030 may interact with one or more components of user device 1910, such as an accelerometer, a global positioning system component, a communication component, or the like, to obtain the sensor data. Additionally, or alternatively, sensor module 2030 may interact with one or more external devices, such as one or more servers 1930 or other user devices, to obtain the sensor data.

Examples of sensor data may include information regarding a current geographic location of user device 1910; information regarding sounds occurring at or around user device 1910; information regarding current lighting condition at user device 1910; information regarding a current date and/or time associated with user device 1910; information regarding a current speed of user device 1910; information regarding a current direction in which user device 1910 is moving; information regarding a current orientation or change in orientation of user device 1910; information regarding a current weather condition in the location in which user device 1910 is located; information regarding a current temperature in the location in which user device 1910 is located; and/or information regarding interaction of user device 1910 with other devices with which user device 1910 is in communication. While certain examples of sensor data have been identified above, other types of sensor data are possible.

The user may specify what type of information is to be used for the sensor data. For example, the user may specify that the current geographic location, the current time, the current speed, the current direction, and the current orientation or change in orientation of user device 1910 are to be used for the sensor data, and the interaction of user device 1910 with other devices is not to be used for the sensor data.

Display module 2040 may receive information, such as a network address associated with a microsite and/or a list of sensors that are relevant to the microsite, from application module 2010. Display module 2040 may use the information to transmit a request to a server 1930 to obtain the content of the microsite. The request may include the network address, associated with the microsite, and sensor data associated with the sensors in the list. The sensor data, included with the request, may be a subset of the sensor data obtained by sensors module 2030. In some particular implementations, the request may include a GET request and the content of the microsite may include hypertext mark-up language (HTML), cascading style sheets (CSS), or Javascript.

Display module 2040 may receive the content of the microsite and render the content of the microsite on a display associated with user device 1910. In some implementations, the content of the microsite may include code to obtain real-time sensor data from user device 1910 or a device separate from user device 1910. In some example implementations, this code may obtain the real-time sensor data once when the content of the microsite is rendered on the display. In some example implementations, this code may obtain the real-time sensor data more than once while the content of the microsite is rendered on the display. The content of the microsite may be updated based on the real-time sensor data.

In some implementations, display module 2040 may push the content to the display so as to override any content already on the display. In some implementations, display module 2040 may determine an appropriate time to render the content of the microsite, such as when user device 1910 is idle for a particular amount of time, when user device 1910 is in a lock mode, when user device 1910 is in a particular orientation, or the like. In some implementations, a user of user device 1910 may specify how and when the user will be presented with the content of a microsite. For example, the user may specify that the content of a microsite can only be presented between 8 AM and 8 PM on weekdays and between 12 PM and 11 PM on weekends; that the content of a microsite can only be presented when the user is located in her home state of Virginia; that the content of a microsite can only be presented when the user is moving at a speed of less than 20 KPH; or the like.

In some implementations, display module 2040 may present the content of the microsite on the display of user device 1910 for a particular amount of time and, thereafter, remove the content of the microsite from the display. In some example implementations, the particular amount of time may be configurable by the user of user device 1910. In some example implementations, the particular amount of time may be preset by application module 2010, by an entity associated with ranking system 1920, or by an entity associated with server 1930 hosting the content of the microsite.

In some implementations, display module 2040 may present the content of the microsite within a particular region of the display of user device 1910. The particular region may include the entire display area of the display or a subset of the entire display area of the display. In some example implementations, the size and/or location of the particular region may be configurable by the user of user device 1910. In some example implementations, the size and/or location of the particular region may be preset by application module 2010, by an entity associated with ranking system 1920, or by an entity associated with server 1930 hosting the content of the microsite.

A user may interact with the content of the microsite to dismiss the content—e.g., by swiping the content—or to obtain additional information regarding the content—e.g., by selecting the content. The user's interaction with the microsite content may be recorded as user profile data by user profile module 2020.

While FIG. 20 shows user device 1910 as having a particular quantity and arrangement of functional components, in some implementations, user device 1910 may include fewer functional components, additional functional components, or different functional components than are shown in FIG. 20.

Figure 21:
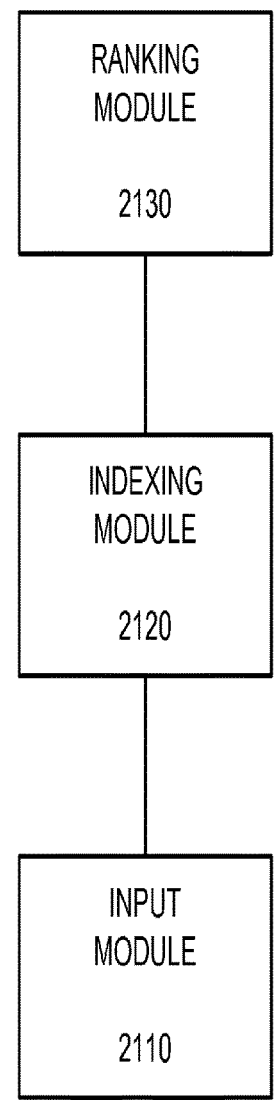
FIG. 21 is a diagram of example functional components of the ranking system of FIG. 19.

FIG. 21 is a diagram of example functional components of ranking system 1920. In some implementations, the functional blocks, shown in FIG. 21, may be implemented by ranking system 1920. In some implementations, one or more of the functional components, shown in FIG. 21, may be implemented by a device separate from or in combination with ranking system 1920.

As shown in FIG. 21, ranking system 1920 may include an input module 2110, an indexing module 2120, and a ranking module 2130. In some implementations, ranking system 1920 may include additional or fewer functional components than are illustrated in FIG. 21.

Input module 2110 may identify microsites for use by ranking system 1920. In some implementations, input module 2110 may identify microsites through crawling. For example, input module 2110 may include or interact with a crawler to locate microsites on a network, such as network 1940. The crawler may follow links to locate documents on the network. Input module 2110 may determine which documents are microsites by locating particular information on documents that are microsites. This particular information may include a piece of code that identifies the document as a microsite. In some implementations, the particular information may also include triggering criteria that specifies criteria for when the microcode is a candidate for presentation on a user device 1910 and/or a list of sensors that are relevant to the microsite.

In some implementations, input module 2110 may identify microsites via manual input. For example, input module 2110 may provide a user interface via which users may provide information regarding microsites that the users have created. In some implementations, a user, via the user interface, may identify a network address associated with a microsite and/or may specify triggering criteria and a list of sensors that are relevant for the microsite. Additionally, or alternatively, the user, via the user interface, may upload the content of the microsite. The content of the microsite may be hosted by ranking system 1920 or a device separate from ranking system 1920, such as a server 1930.

Indexing module 2120 may include one or more indexes that may be stored in one or more memory devices, which may be co-located or remotely located. In some implementations, indexing module 2120 may store information regarding various microsites in an index. For a particular microsite, for example, the index may store a descriptive name of the particular microsite, a network address for the particular microsite, triggering criteria for the particular microsite, and/or a list of sensors that are relevant for the particular microsite. Ranking module 2130 may use the information in the index to identify microsites that are relevant for a particular user and/or in a particular situation.

Figure 22:
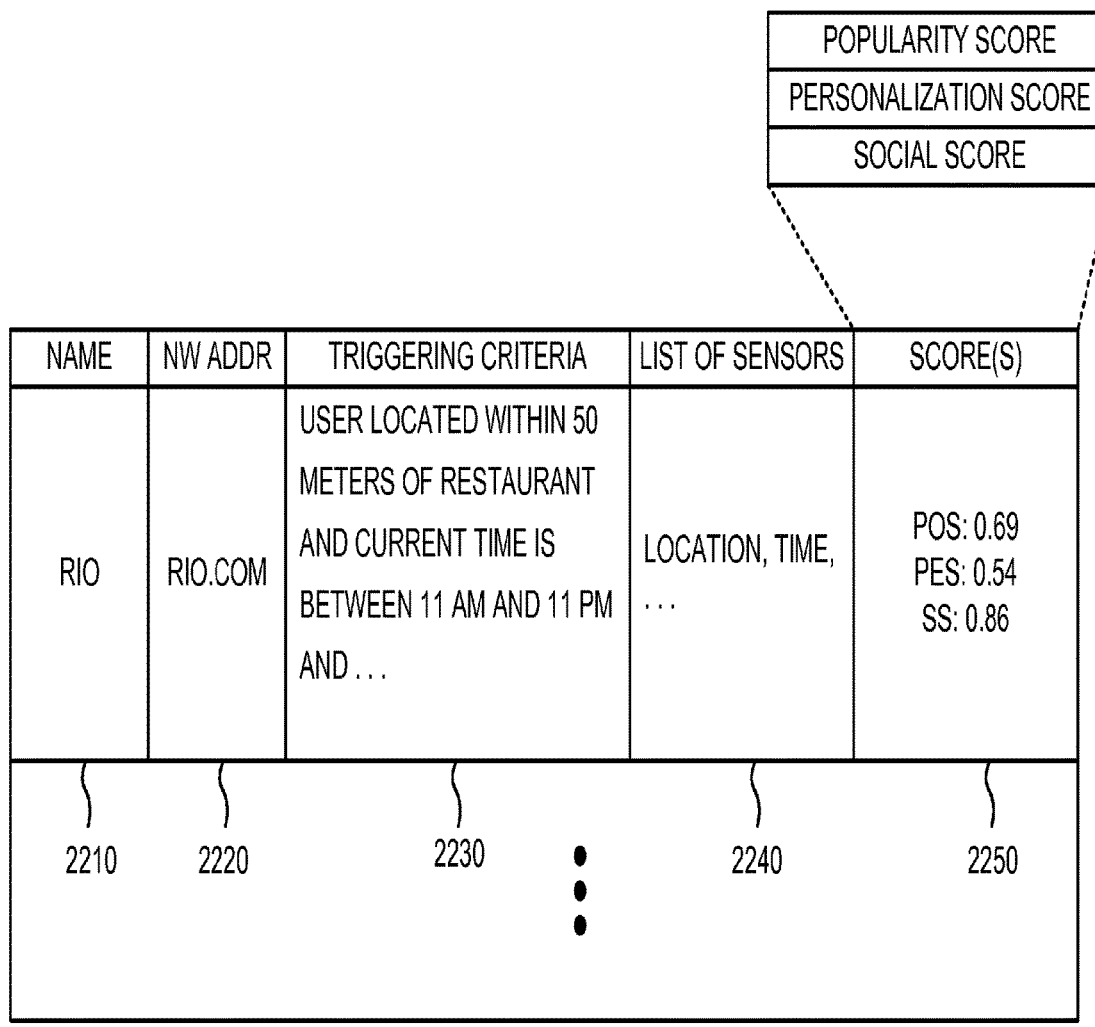
FIG. 22 is a diagram of an example entry that may be stored in an index maintained by the indexing module of FIG. 21.

FIG. 22 is a diagram of an example entry 2200 that may be stored in an index maintained by indexing module 2120. Each entry in the index may correspond to a respective microsite. As shown in FIG. 22, entry 2200 may include a name field 2210, a network address (NW ADDR) field 2220, a triggering criteria field 2230, a list of sensors field 2240, and a score(s) field 2250.

Name field 2210 may store a descriptive name for a particular microsite. In some implementations, the descriptive name may be unique among the microsites included in the index. As shown in FIG. 22, assume that entry 2200 corresponds to the Rio Grand microsite from the example of FIG. 1. Name field 2210 may store the descriptive name "Rio" for the Rio Grand microsite.

Network address field 2220 may store a network address, such as a URL or URI, via which the particular microsite is available on a network, such as network 1940. As shown in FIG. 22, network address field 2220 may store the network address "rio.com" for the Rio Grand microsite.

Triggering criteria field 2230 may store triggering criteria that identify when the particular microsite will be identified as relevant. The triggering criteria may relate to various types of sensor data. In some implementations, the triggering criteria may be stored in an N-ary tree. As shown in FIG. 22, triggering criteria field 2230 may store triggering criteria that specifies that the Rio Grand microsite is relevant when a user is located within 50 meters of the restaurant AND the current time is between 11 AM and 11 PM AND . . . .

The triggering criteria may be specified as a Boolean expression. Assume that the triggering criteria, for the particular microsite, include criterion A and criterion B. In this case, for example, the triggering criteria may be specified as criterion A AND criterion B, or as criterion A OR criterion B. The Boolean expression may include operators other than AND and OR.

In some implementations, indexing module 2120 may order the triggering criteria to place the criterion that is least likely to be satisfied, from among the triggering criteria, first. As one example, assume that the triggering criteria include criterion A—the time is between 6 AM and 8 PM—AND criterion B—a user is located within 10 meters of a bus stop. In this case, indexing module 2120 may order the triggering criteria as criterion B AND criterion A, because criterion B is least often to be satisfied between criterion A and criterion B. As another example, assume that the triggering criteria include criterion A—the time is between 6 AM and 8 PM—AND criterion B—a user is located within 10 meters of a bus stop—OR criterion C—the user is located within 25 meters of a train stop. In this case, indexing module 2120 may order the triggering criteria as (criterion B or criterion C) AND criterion A, because criterion B and criterion C are least likely to be satisfied among criterion A, criterion B, and criterion C.

By placing the least likely criterion, or criteria, first in the Boolean expression, it may be determined whether to exclude the particular microsite from consideration without having to test every criterion in the triggering criteria. Returning to the example above with the triggering criteria of criterion B AND criterion A, the particular microsite may be excluded from further consideration when criterion B is not satisfied regardless of whether criterion A is satisfied. Returning to the example above with the triggering criteria of (criterion B or criterion C) AND criterion A, the particular microsite may be excluded from further consideration when criterion B and criterion C are not satisfied regardless of whether criterion A is satisfied. This may help reduce the set of microsites, in the index, considered for presentation to a user device 1910.

List of sensors field 2240 may store information identifying a list of sensors that is relevant to the particular microsite. The list of sensors may identify sensors that output sensor data that is relevant to the triggering criteria in triggering criteria field 2230 and/or sensor data that is relevant to the generation of the content of the particular microsite that will be presented on a user device 1910. As shown in FIG. 22, list of sensors field 2240 may indicate that sensors relating to location, time, etc. are relevant to the Rio Grand microsite.

Score(s) field 2250 may store information regarding one or more scores generated for the particular microsite, such as a popularity score, a personalization score, and/or a social score. Other types of scores may additionally, or alternatively, be generated. One or more techniques, for generating the score(s) stored in score(s) field 2250, will be described below.

The popularity score may be generated based on popularity data associated with the particular microsite. The personalization score may be generated based on personalization data specific to a particular user relative to the particular microsite. Score(s) field 2250 may store a respective personalization score for each of multiple users with a personalization score, for the particular microsite, that satisfies a personalization threshold. The social score may be generated based on social data specific to one or more social contacts, associated with a particular user, for the particular microsite. Score(s) field 2250 may store a respective social score for each of multiple users with a social score, for the particular microsite, that satisfies a social threshold. It may be possible for score(s) field 2250 to store, for the same user, a personalization score and a social score. The personalization score, in this situation, may be used when presenting information regarding the particular microsite to the user. The social score, in this situation, may be used when presenting information regarding the particular microsite to another user for which the user is a social contact.

While FIG. 22 shows entry 2200 of the index as including particular fields, in some implementations, entry 2200 may include additional fields, fewer fields, or different fields than are shown in FIG. 22.

Returning to FIG. 21, ranking module 2130 may receive user profile data and sensor data from a user device 1910. Ranking module 2130 may use the user profile data and/or the sensor data to identify relevant microsites. Ranking module 2130 may generate scores for the relevant microsites and present information regarding one or more of the relevant microsites, to user device 1910, based on the scores.

Figure 23:
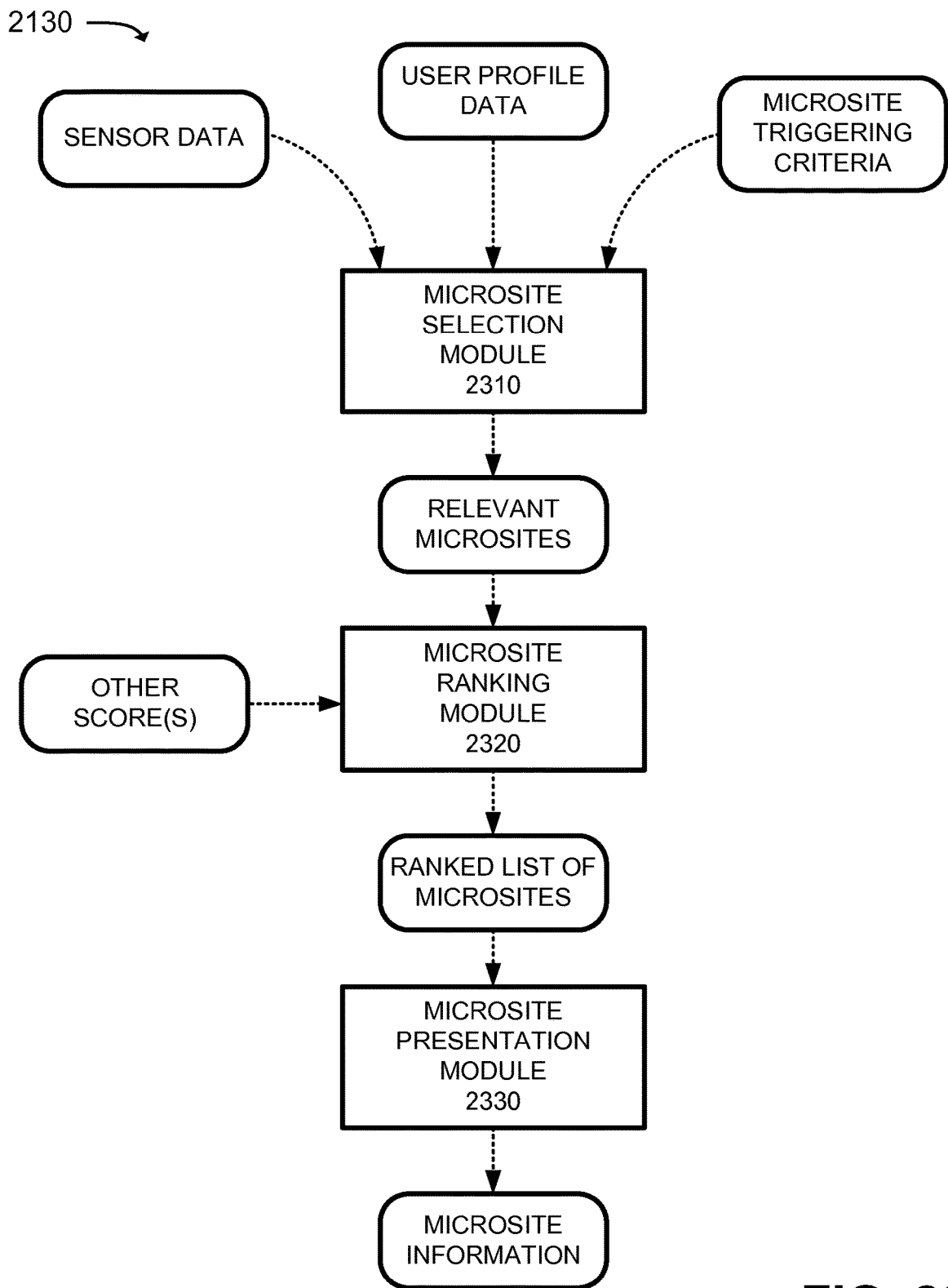
FIG. 23 is a diagram of example functional components of the ranking module of FIG. 21.

FIG. 23 is a diagram of example functional components of ranking module 2130. As shown in FIG. 23, ranking module 2130 may include microsite selection module 2310, microsite ranking module 2320, and microsite presentation module 2330.

Microsite selection module 2310 may receive the sensor data and user profile data associated with a user device 1910 and use the triggering criteria, in the index, to identify relevant microsites. In some implementations, microsite selection module 2310 may identify microsites that are relevant based on the sensor data and the triggering criteria. For example, microsite selection module 2310 may perform a matching of the sensor data to the triggering criteria. In some implementations, microsite selection module 2310 may identify microsites that are relevant based on the sensor data, the user profile data, and the triggering criteria. For example, microsite selection module 2310 may perform a matching of the sensor data and the user profile data to the triggering criteria.

In either situation, as described above, the triggering criteria may be represented as a Boolean expression. Microsite selection module 2310 may analyze as many of the triggering criteria, as necessary, to determine whether a microsite is relevant. For example, if the triggering criteria include criterion A AND criterion B, microsite selection module 2310 may determine that microsites, which do not satisfy criterion A, are not relevant microsites. As another example, if the triggering criteria include criterion A AND criterion B, microsite selection module 2310 may determine that microsites, which satisfy criterion A but do not satisfy criterion B, are not relevant microsites.

Microsite ranking module 2320 may generate scores for the relevant microsites and create a ranked list of microsites based on the scores. In some implementations, microsite ranking module 2320 may perform a matching of the sensor data to the triggering criteria, for a relevant microsite, to generate an index score for the relevant microsite. In some implementations, microsite ranking module 2320 may perform a matching of the sensor data and the user profile data to the triggering criteria, for a relevant microsite, to generate an index score for the relevant microsite. In either situation, microsite ranking module 2320 may compare the sensor data and/or the user profile data to each criterion, of the triggering criteria, and generate a real value that represents a result of the comparison. Microsite ranking module 2320 may combine the real values to generate the index score for the relevant microsite.

FIGS. 24A-24C are examples of functions that may be used to generate real values based on matching sensor data and/or user profile data to triggering criteria. FIG. 24A illustrates a linear ascendant function. The linear ascendant function generates a real value as a result of matching sensor data and/or user profile data, x, relative to two criterion variables, a and b. The two criterion variables, a and b, may represent any of a number of attributes, such as time, distance, weather, etc. As shown in FIG. 24A, the real value may be zero when $x<a$; one when $x>b$; and $(x-a)/(b-a)$ when $a \leq x \leq b$. Assume that a criterion states: a user is within 50 meters of home. In this case, $a=0$ and $b=50$. The linear ascendant function may generate a real value based on where the user is located, x, relative to a and b.

FIG. 24B illustrates a quadratic ascendant function. The quadratic ascendant function generates a real value as a result of matching sensor data and/or user profile data, x, relative to two criterion variables, a and b. As described above, the two criterion variables, a and b, may represent any of a number of attributes, such as time, distance, weather, etc. As shown in FIG. 24B, the real value may be zero when $x<a$; one when $x>b$; and $((x-a)/(b-a))^2$ when $a \leq x \leq b$. Assume that a criterion states: a user is within 50 meters of home. In this case, $a=0$ and $b=50$. The quadratic ascendant function may generate a real value based on where the user is located, x, relative to a and b.

FIG. 24C illustrates a quadratic parabola function. The quadratic parabola function generates a real value as a result of matching sensor data and/or user profile data, x, relative to two criterion variables, a and b. As described above, the two criterion variables, a and b, may represent any of a number of attributes, such as time, distance, weather, etc. As shown in FIG. 24C, the real value may be zero when $x<a$; zero when $x>b$; and $1-((x-(a+b)/2)^2/(b-a))$ when $a \leq x \leq b$. Assume that a criterion states: a user is within 50 meters of home. In this case, $a=0$ and $b=50$. The quadratic parabola function may generate a real value based on where the user is located, x, relative to a and b.

While examples of functions are illustrated in FIGS. 24A-24C, other functions are possible instead of the linear ascendant, quadratic ascendant, and quadratic parabola functions.

Returning to FIG. 23, microsite ranking module 2320 may generate the index score for a relevant microsite by combining the real values. In some implementations, microsite ranking module 2320 may calculate the index score as a sum, or some other combination, of the real values. In some example implementations, each criterion, of the triggering criteria, may contribute equally to the index score. In some example implementations, each criterion, of the triggering criteria, may be assigned a weight so that one criterion may contribute more to the index score than another criterion.

In some implementations, microsite ranking module 2320 may use the index scores of the relevant microsites, as the total scores described below, to rank the relevant microsites in the ranked list of microsites. In some implementations, microsite ranking module 2320 may modify the index scores with one or more other scores, such as a popularity score, a personalization score, and/or a social score, to generate total scores for the relevant microsites and rank the relevant microsites, in the ranked list of microsites, based on the total scores.

In some implementations, as described above, microsite ranking module 2320 may modify the score, of a microsite, based on a popularity score of the microsite. The popularity score of a microsite may be generated based on user behavior data associated with the microsite, such as how many users expressed disinterest in the microsite by, for example, swiping away from the microsite or providing a negative rating when the microsite was presented to a user device 1910, and/or how many users expressed interest in the microsite by, for example, providing a positive rating when the microsite was presented to a user device 1910, requesting additional information regarding the microsite, or purchasing a service or product associated with the microsite. In some implementations, the popularity score of a microsite may be generated using one or more factors instead of, or in addition to, the user behavior data, such as a quantity of times that the microsite has been presented to user devices 1910, an age of the microsite, a prior ranking or score of the microsite, or the like.

The popularity score, for a particular microsite, may be based on multiple factors. A popularity factor score may be calculated for each of the factors and these popularity factor scores may be combined to form the popularity score. In some example implementations, each of the popularity factor scores may contribute equally to the popularity score. In some example implementations, each of the popularity factor scores may be assigned a weight, such that one of the popularity factor scores may contribute more to the popularity score than another one of the popularity factor scores. A weight associated with a popularity factor score, corresponding to a particular popularity factor, may depend on how well the particular popularity factor is indicative of measuring the popularity of a microsite.

Additionally, or alternatively, microsite ranking module 2320 may modify the score, of a microsite, based on a personalization score of the microsite. In some implementations, the personalization score of a microsite may be generated based on the user profile data, such as user activity data, associated with a user of a particular user device 1910, with regard to the microsite. The user activity data may include, for example, whether the user has expressed disinterest in the microsite by, for example, swiping away from the microsite or providing a negative rating when the microsite was presented to the particular user device 1910, and/or whether the user expressed interest in the microsite by, for example, providing a positive rating when the microsite was presented to the particular user device 1910, requesting additional information regarding the microsite, purchasing a service or product associated with the microsite, bookmarking—e.g., saving—the microsite, orienting the particular user device 1910 to view the microsite without swiping away from the microsite, and/or following a recommendation provided by the microsite—e.g., a recommendation to visit a particular restaurant, see a particular movie, ride a particular bus, or the like. In some implementations, the personalization score of a microsite may be generated using one or more factors instead of, or in addition to, the user profile data, such as whether the user has recommended the microsite to one of the user's social contacts.

The personalization score, for a particular microsite, may be based on multiple factors. A personalization factor score may be calculated for each of the factors and these personalization factor scores may be combined to form the personalization score. In some example implementations, each of the personalization factor scores may contribute equally to the personalization score. In some example implementations, each of the personalization factor scores may be assigned a weight, or multiple weights, such that one of the personalization factor scores may contribute more to the personalization score than another one of the personalization factor scores. A weight associated with a personalization factor score, corresponding to a particular personalization factor, may depend on how well the particular personalization factor is indicative of measuring a user's interest in a microsite.

Additionally, or alternatively, microsite ranking module 2320 may modify the score, of a microsite, based on a social score of the microsite. In some implementations, the social score of a microsite may be generated based on friend activity data, associated with social contacts—e.g., friends—of the user of a particular user device 1910, with regard to the microsite. The user's friends may be identified based on the user's communications, the user's address book, and/or the user's account on one or more social networks. Examples of friend activity data, associated with a microsite, include whether the user's friends have expressed disinterest in the microsite by, for example, swiping away from the microsite or providing a negative rating when the microsite was presented to the friends' user devices 1910, and/or whether the user's friends expressed interest in the microsite by, for example, providing a positive rating when the microsite was presented to the friends' user devices 1910, requesting additional information regarding the microsite, purchasing a service or product associated with the microsite, bookmarking the microsite, and/or following a recommendation provided by the microsite—e.g., a recommendation to visit a particular restaurant, see a particular movie, ride a particular bus, or the like. In some implementations, the social score of a microsite may be generated using one or more factors instead of, or in addition to, the friend activity data, such as whether the friends have recommended the microsite to others.

In some implementations, the friend activity data may correspond to the same data included in the user activity data. In some implementations, the friend activity data may include a subset—less than all—of the user activity data. For example, the friend activity data may include that data, of the user activity data, that can be anonymized—i.e., not traceable to a particular social contact. For example, the friend activity data may include information regarding ratings of microsites given by social contacts, and may not include information contained in communications of the social contacts. In some example implementations, particular friend activity data may be used only when the same friend activity data is available from at least a threshold quantity of social contacts. In some example implementations, particular friend activity data, associated with a particular social contact, may be used only with the express permission of the particular social contact.

In some implementations, the social score, for a particular user and a particular microsite, may be based on friend activity data of multiple social contacts. A social contact score may be calculated for each of the social contacts and these social contact scores may be combined to form the social score. In some example implementations, each of the social contact scores may contribute equally to the social score. In some example implementations, each of the social contact scores may be assigned a weight, such that one of the social contact scores may contribute more to the social score than another one of the social contact scores. A weight associated with a social contact score, corresponding to a particular social contact, may depend on how close of a friend the particular social contact is to the particular user. This may be determined in a number of different ways, such as whether the particular social contact is in an address book of the particular user, whether the particular user has friended the particular social contact in a social network, the quantity of social networks that the particular user has friended the particular social contact, the quantity of communications that the particular user has had with the particular social contact, the frequency of communications that the particular user has had with the particular social contact, or the like.

In some implementations, as described above, microsite ranking module 2320 may generate a total score for a relevant microsite based on a combination of the index score and the popularity score, the personalization score, and/or the social score. In some implementations, microsite ranking module 2320 may generate a total score for a relevant microsite based on a combination of the index score, the popularity score, the personalization score, and the social score. For example, microsite ranking module 2320 may add the popularity score, the personalization score, and/or the social score to the index score; multiply the index score by the popularity score, the personalization score, and/or the social score; boost the index score based on the popularity score, the personalization score, and/or the social score; or combine the index score with the popularity score, the personalization score, and/or the social score using a combination of these and/or other ways of combining the index score with the popularity score, the personalization score, and/or the social score.

In some implementations, microsite ranking module 2320 may generate a total score for a microsite based on a weighted combination of the index score, the popularity score, the personalization score, and the social score. For example, microsite ranking module 2320 may assign a weight to the index score, the popularity score, the personalization score, and/or the social score. The weights may differ—in other words, the amount that each of the index score, the popularity score, the personalization score, and the social score contributes to the total score may vary. Microsite ranking module 2320 may combine the weighted index score, the weighted popularity score, the weighted personalization score, and/or the weighted social score to generate the total score.

Microsite ranking module 2320 may generate a ranked list of microsites based on the total scores. For example, microsite ranking module 2320 may sort the relevant microsites based on the total scores for the relevant microsites. In some implementations, microsite ranking module 2320 may rank a relevant microsite, with a higher total score, closer to a top of the ranked list than another relevant microsite, with a lower total score. In some implementations, microsite ranking module 2320 may rank a relevant microsite, with a higher total score, closer to a bottom of the ranked list than another relevant microsite, with a lower total score.

Microsite presentation module 2330 may select a set of microsites from the ranked list of microsites and provide microsite information, regarding the set of microsites, to user device 1910. In some implementations, microsite presentation module 2330 may select a set of microsites based on the total scores. For example, microsite presentation module 2330 may select the top scoring X microsites (X≥1). In some implementations, microsite presentation module 2330 may select only the top scoring microsite (X=1). In some implementations, microsite presentation module 2330 may select the top scoring five (5) microsites (X=5). Rather than simply selecting the top scoring X microsites, in some implementations, microsite presentation module 2330 may select a top scoring microsite only when the total score, for the top scoring microsite, satisfies a score threshold.

Microsite presentation module 2330 may provide information, regarding the set of microsites, to user device 1910. In some implementations, the information may include a network address and/or a list of sensors for each microsite in the set of microsites. In some implementations, the network addresses of the microsites may be provided in a ranked list based on the total scores of the microsites. In some implementations, the network addresses of the microsites may be provided along with the total scores of the microsites.

While FIG. 23 shows a particular quantity and arrangement of modules, in some implementations, ranking module 2130 may include fewer modules, additional modules, different modules, or differently arranged modules.

Figure 25:
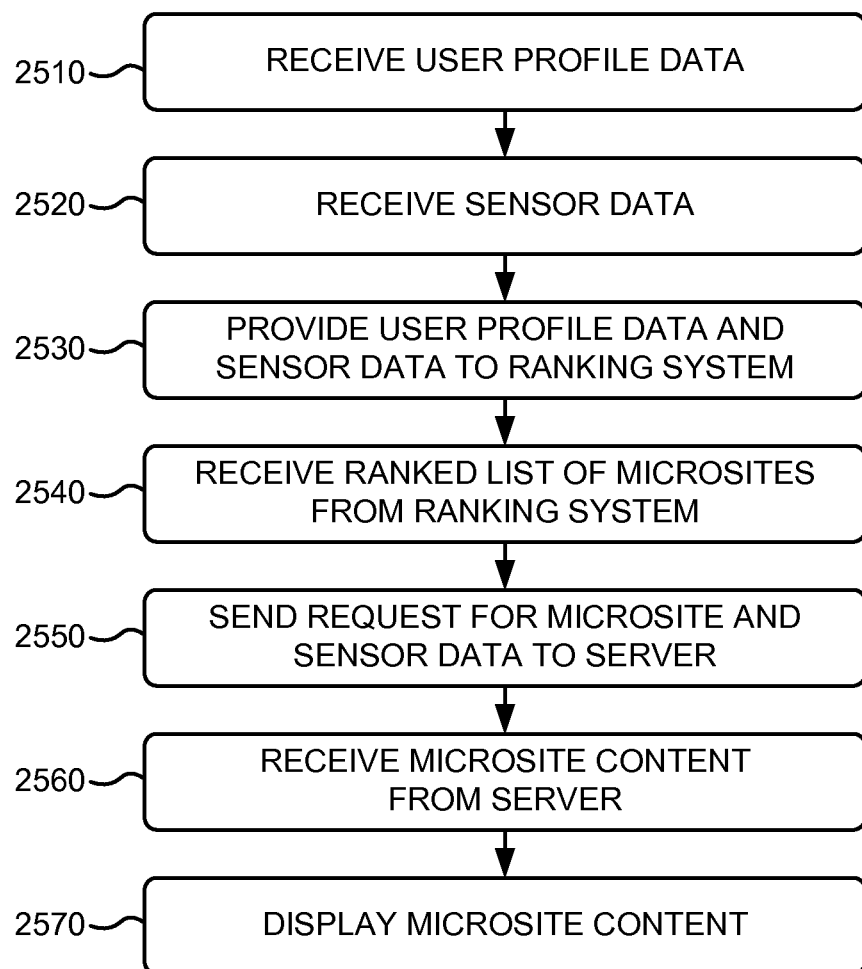
FIG. 25 is a flowchart of an example process for presenting content of a microsite.

FIG. 25 is a flowchart of an example process 2500 for presenting content of a microsite. In some implementations, process 2500 may be performed by user device 1910. In some implementations, one or more blocks of process 2500 may be performed by one or more devices instead of, or possibly in conjunction with, user device 1910.

Process 2500 may include receiving user profile data (block 2510). For example, user profile module 2020, of user device 1910, may receive and store user profile data associated with user device 1910 and/or a user of user device 1910. User profile module 2020 may receive user profile data from the user and/or may receive user profile data from one or more other components or programs of user device 1910. Examples of user profile data have been identified above. User profile module 2020 may provide the user profile data to application module 2010.

Process 2500 may include receiving sensor data (block 2520). For example, sensors module 2030, of user device 1910, may receive and store sensor data associated with user device 1910. Sensors module 2030 may receive sensor data from one or more components of user device 1910 and/or may receive sensor data from one or more devices external to user device 1910, such as one or more servers 1930 and/or one or more other user devices 1910. Examples of sensor data have been identified above. Sensors module 2030 may provide the sensor data to application module 2010.

Process 2500 may include providing the user profile data and the sensor data to ranking system 1920 (block 2530). In some implementations, application module 2010, of user device 1910, may periodically or regularly provide the user profile data and the sensor data to ranking system 1920. Application module 2010 may provide the user profile data and the sensor data to ranking system 1920 automatically—e.g., without user input.

As described above, ranking system 1920 may receive the user profile data and the sensor data from user device 1910. Ranking system 1920 may use the user profile data and/or the sensor data to identify a set of relevant microsites. Ranking system 1920 may compare the user profile data and/or the sensor data to the triggering criteria for a microsite and generate a score for the microsite based on a result of the comparison. As described above, ranking system 1920 may modify the score based on one or more factors, such as a popularity score, a personalization score, and/or a social score. Ranking system 1920 may select a set of microsites based on their scores and provide information, regarding the set of microsites, to user device 1910.

Process 2500 may include receiving information regarding a set of microsites from ranking system 1920 (block 2540). For example, application module 2010, of user device 1910, may receive information, such as network addresses and lists of sensors, for the set of microsites.

Process 2500 may include sending a request, for a microsite, with sensor data to a server 1930 (block 2550). For example, display module 2040 may, for each microsite in the set of microsites, send a request to a server 1930 that hosts the microsite. Display module 2040 may use the network address, associated with the microsite, to send the request and provide sensor data associated with the list of sensors that are relevant to the microsite. In some implementations, as described above, the request may take the form of a GET request.

Process 2500 may include receiving microsite content from server 1930 (block 2560). In response to sending the request and the sensor data to server 1930, server 1930 may identify the microsite content to send to user device 1910. The microsite content may be dynamic in the sense that the content may change depending on the sensor data received from user device 1910. For example, if the microsite relates to an exercise microsite, server 1930 may receive information regarding the current geographic location, the current speed, and the current direction of user device 1910, and may generate the microsite content based on this information. Server 1930 may send the microsite content to display module 2040 of user device 1910. Display module 2040 may receive the microsite content from server 1930.

Process 2500 may display the microsite content (block 2570). For example, display module 2040 may cause the microsite content to appear on a display associated with user device 1910. In some implementations, display module 2040 may determine whether it is an appropriate time to display the microsite content. For example, display module 2040 may determine whether user device 1910 has been idle for a particular amount of time and cause the microsite content to be displayed only if user device 1910 has been idle for at least the particular amount of time. Alternatively, or additionally, display module 2040 may determine whether user device 1910 is in a lock mode and cause the microsite content to be displayed only if user device 1910 is in the lock mode. Alternatively, or additionally, display module 2040 may use another factor to determine whether to cause the microsite content to be displayed.

While FIG. 25 shows process 2500 as including a particular quantity and arrangement of blocks, in some implementations, process 2500 may include fewer blocks, additional blocks, or a different arrangement of blocks. Additionally, or alternatively, some of the blocks may be performed in parallel.

Figure 26:
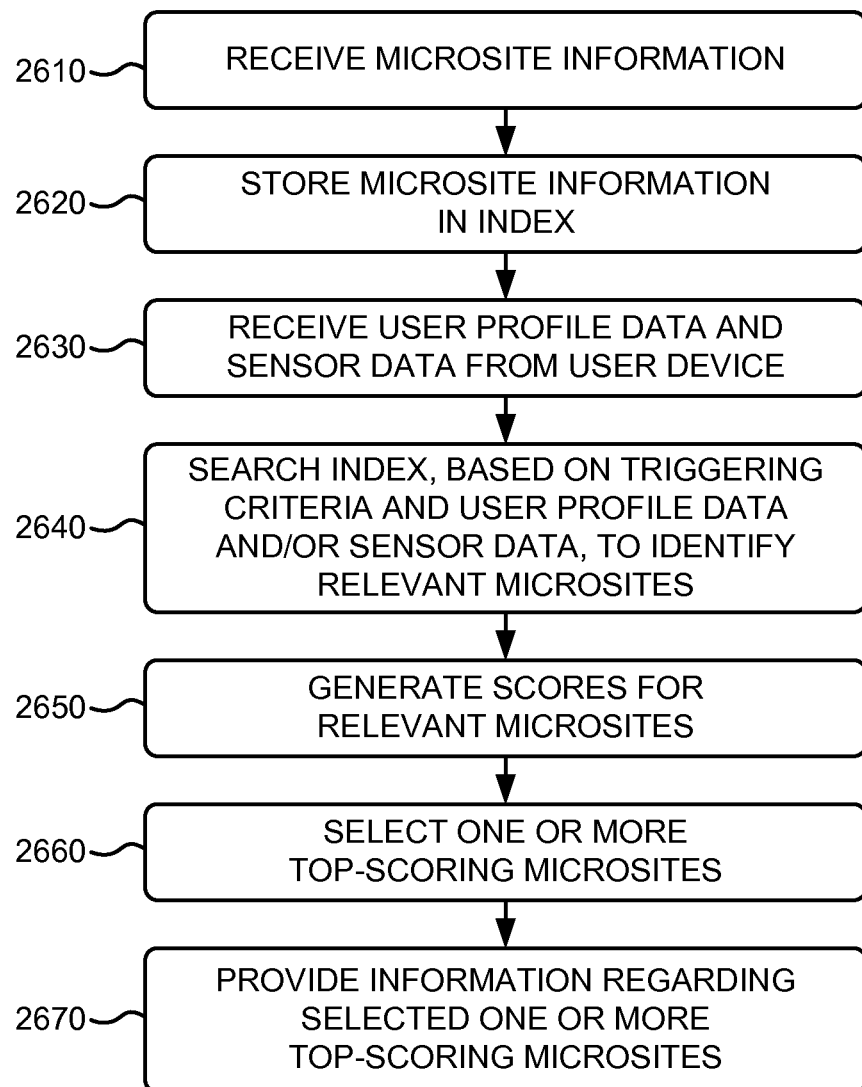
FIG. 26 is a flowchart of an example process for providing information regarding a set of microsites.

FIG. 26 is a flowchart of example process 2600 for providing information regarding a set of microsites. In some implementations, process 2600 may be performed by ranking system 1920. In some implementations, one or more blocks of process 2600 may be performed by one or more devices instead of, or possibly in conjunction with, ranking system 1920.

Process 2600 may include receiving microsite information (block 2610). For example, input module 2110, of ranking system 1920, may include or interact with a crawler that locates microsites via a crawling operation. As described above, the microsites may be located based on a piece of code, located on the microsites, which identifies the microsites as microsites. The microsites may be analyzed to identify information regarding the microsites. Additionally, or alternatively, input module 2110 may receive information regarding microsites via manual input via a user interface provided by input module 2110. In some implementations, input module 2110 may receive or determine microsite information, such as descriptive names of the microsites, network addresses associated with the microsites, triggering criteria that specify when the microsites may be identified for presentation, and/or lists of sensors that are relevant to the content of the microsites.

Process 2600 may include storing the microsite information in an index (block 2620). For example, indexing module 2120, of ranking system 1920, may store the microsite information in an index. For a particular microsite, indexing module 2120 may store a descriptive name for the particular microsite, a network address for the particular microsite, triggering criteria for the particular microsite, and/or a list of sensors for the particular microsite, as described above with regard to FIG. 22.

Process 2600 may include receiving user profile data and sensor data from user device 1910 (block 2630). For example, as described above, user device 1910 may automatically and periodically/regularly send user profile data and sensor data to ranking system 1920. Ranking module 2130, of ranking system 1920, may receive the user profile data and the sensor data from user device 1910.

Process 2600 may include searching the index, based on the triggering criteria and the user profile data and/or the sensor data, to identify relevant microsites (block 2640), and generating scores for the relevant microsites (block 2650). For example, ranking module 2130 may identify relevant microsites, in the index of indexing module 2120, based on the user profile data and/or the sensor data, as described above. Ranking module 2130 may generate an index score for a relevant microsite based on how well the user profile data and/or the sensor data matches the triggering criteria for the relevant microsite. In some implementations, as described above, ranking module 2130 may modify the index score, for the microsite, based on one or more scores, such as a popularity score, a personalization score, and/or a social score for the microsite, to generate a total score for the microsite.

Process 2600 may include selecting one or more of the top-scoring microsites (block 2660) and providing information regarding the selected top-scoring microsite(s) (block 2670). For example, ranking module 2130 may select a set of the relevant microsites based on their scores, such as the top scoring X microsites. Ranking module 2130 may provide information, regarding the set of relevant microsites, to user device 1910. In some implementations, as described above, the information may include a network address and a list of sensors for each microsite in the set of relevant microsites. User device 1910 may use the network address, of a microsite, to retrieve the content of the microsite from a server 1930.

While FIG. 26 shows process 2600 as including a particular quantity and arrangement of blocks, in some implementations, process 2600 may include fewer blocks, additional blocks, or a different arrangement of blocks. Additionally, or alternatively, some of the blocks may be performed in parallel.

Figure 27:
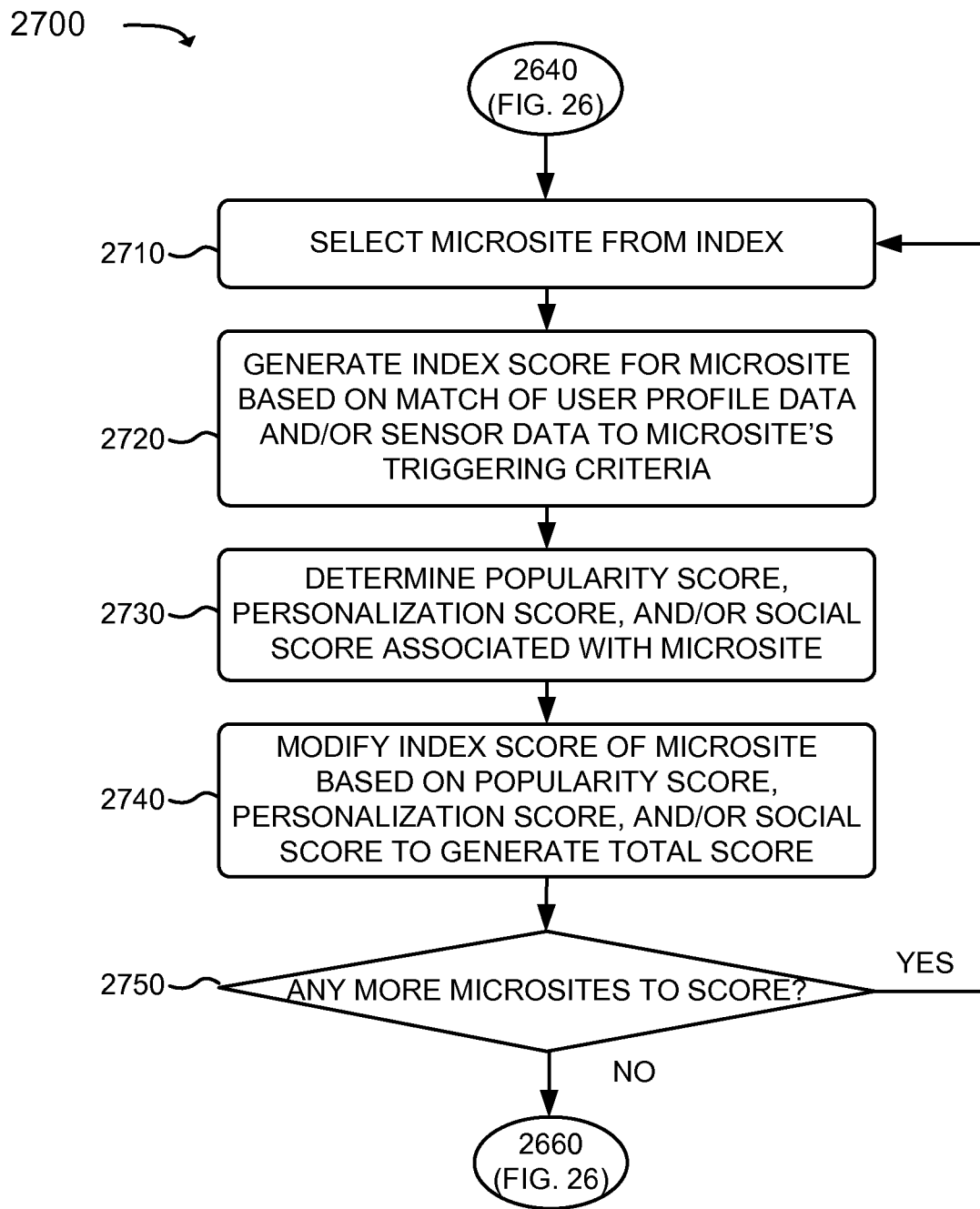
FIG. 27 is a flowchart of an example process that may correspond to a portion of the process of FIG. 26.

FIG. 27 is a flowchart of an example process 1000 that may correspond to block 2650 of process 2600 of FIG. 26. In some implementations, as described above, process 1000 may be performed by ranking system 1920. In some implementations, one or more of blocks of process 1000 may be performed by one or more devices instead of, or possibly in conjunction with, ranking system 1920.

Process 2700 may include selecting a microsite from the index (block 2710). For example, ranking module 2130 may select one of the relevant microsites to analyze. The selection may be made in any manner, such as based on name, network address, or the like.

Process 2700 may include generating an index score for the microsite based on a match of the sensor data and/or the user profile data to the microsite's triggering criteria (block 2720). In some implementations, ranking module 2130 may generate the index score based on a comparison of the sensor data to the triggering criteria. In some implementations, ranking module 2130 may generate the index score based on a comparison of the sensor data and the user profile data to the triggering criteria.

Process 2700 may include determining a popularity score, a personalization score, and/or a social score associated with the microsite (block 2730). In some implementations, ranking module 2130 may generate the popularity score, the personalization score, and/or the social score for the microsite using one or more of the factors described above. In some implementations, ranking module may determine the popularity score, the personalization score, and/or the social score for the microsite by, for example, reading the popularity score, the personalization score, and/or the social score from an entry in the index. In this situation, the popularity score, the personalization score, and/or the social score may be determined off-line and not in response to an analysis of a microsite.

Process 2700 may include modifying the index score of the microsite based on the popularity score, the personalization score, and/or the social score to generate a total score (block 2740). In some implementations, as described above, ranking module 2130 may use the index score as the total score for the microsite. In some implementations, ranking module 2130 may modify the index score to generate the total score based on the popularity score, the personalization score, and/or the social score, as described above.

Process 2700 may include determining whether there are any more microsites to score (block 2750). If there are additional microsites to score (block 2750— YES), then process 2700 may return to block 2710 to select another microsite. If there are no additional microsites to score (block 2750— NO), then process 2700 may proceed to block 2660 in FIG. 26. Process 2700 may be repeated for each relevant microsite identified with regard to block 2640 in FIG. 26 until all relevant microsites have been processed.

While FIG. 27 shows process 2700 as including a particular quantity and arrangement of blocks, in some implementations, process 2700 may include fewer blocks, additional blocks, or a different arrangement of blocks. Additionally, or alternatively, some of the blocks may be performed in parallel. Additionally, or alternatively, multiple instances of process 2700 may be performed concurrently for different microsites.

Figure 28:
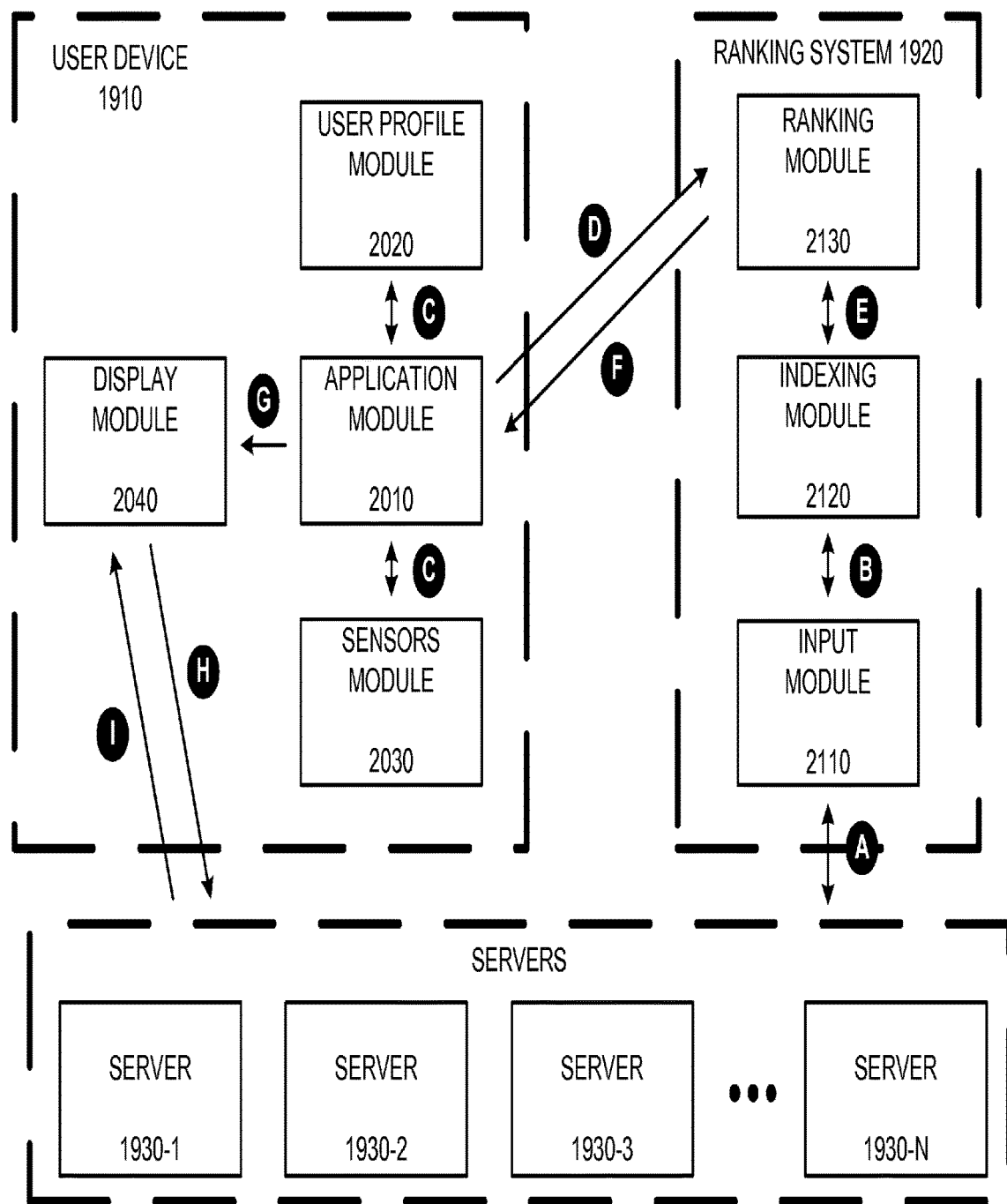
FIG. 28 is a diagram illustrating an example process flow that involves the user device, the ranking system, and the servers of FIG. 19.

FIG. 28 is a diagram of illustrating an example process flow 2800 that involves user device 1910, ranking system 1920, and servers 1930. While FIG. 28 shows process flow 2800 as including a particular sequence of interactions among user device 1910, ranking system 1920, and servers 1930, in some implementations, some of these interactions may occur in another order and/or in parallel.

As shown at (A) in FIG. 28, input module 2110, of ranking system 1920, may identify microsites for use by ranking system 1920. In some implementations, as described above, input module 2110 may identify microsites through crawling and/or via manual input. In either situation, input module 2110 may obtain information regarding a particular microsite, such as a descriptive name of the particular microsite, a network address for the particular microsite, triggering criteria for the particular microsite, and/or a list of sensors that are relevant for the particular microsite.

As shown at (B) in FIG. 28, input module 2110, of ranking system 1920, may provide information regarding various microsites to indexing module 2120. Indexing module 2120 may store information regarding the microsites in one or more indexes. In some implementations, as described above, indexing module 2120 may store, for a particular microsite in an index, a descriptive name of the particular microsite, a network address for the particular microsite, triggering criteria for the particular microsite, and/or a list of sensors that are relevant for the particular microsite.

As shown at (C) in FIG. 28, application module 2010, of user device 1910, may obtain user profile data from user profile module 2020 and/or may obtain sensor data from sensors module 2030. The user profile data may include various information regarding user device 1910 and/or a user of user device 1910. Examples of user profile data have been given above. The sensor data may include various information regarding user device 1910 and/or conditions associated with user device 1910. Examples of sensor data have been given above.

As shown at (D) in FIG. 28, application module 2010 may provide the user profile data and/or the sensor data to ranking system 1920. As described above, application module 2010 may automatically—e.g., without requiring an instruction from a user of user device 1910—provide the user profile data and/or the sensor data to ranking system 1920. Ranking module 2130, of ranking system 1920, may receive the user profile data and/or the sensor data.

As shown at (E) in FIG. 28, ranking module 2130 may use the user profile data and/or the sensor data to identify relevant microsites. As described above, in some implementations, ranking module 2130 may identify relevant microsites, in the index, based on the sensor data and the triggering criteria, and generate an index score for the relevant microsites based on a result of a matching of the sensor data to the triggering criteria. As also described above, in some implementations, ranking module 2130 may identify relevant microsites, in the index, based on the user profile data and the sensor data, and generate an index score for the relevant microsites based on a result of a matching of the user profile data and the sensor data to the triggering criteria. As described above, in some implementations, ranking module 2130 may modify the index score, for a microsite, based on one or more other scores to generate a total score for the microsite. Ranking module 2130 may use the total score to identify a set of relevant microsites.

As shown at (F) in FIG. 28, ranking module 2130 may provide information, regarding the set of relevant microsites, to user device 1910. As explained above, in some implementations, the information may include, for each microsite in the set of relevant microsites, a network address for the microsite and a list of sensors relevant to the microsite. Application module 2010, of user device 1910, may receive the information regarding the set of relevant microsites.

As shown at (G) in FIG. 28, application module 2010 may provide the information, regarding the set of relevant microsites, to display module 2040 of user device 1910. Display module 2040 may receive the information regarding the set of relevant microsites. Display module 2040 may obtain sensor data associated with the list of sensors that have been identified as relevant to the relevant microsites. For each relevant microsite, display module 2040 may generate a request that includes the network address for the relevant microsite and the sensor data relevant to the relevant microsite.

As shown at (H) in FIG. 28, display module 2040 may transmit the requests to one or more servers 1930. Whether display module 2040 transmits the requests to more than one server 1930 depends on which server(s) 1930 is/are hosting the relevant microsites. In other words, all of the relevant microsites may be hosted by a single server 1930, all of the relevant microsites may be hosted by separate, different servers 1930, or something in between these two extremes.

Server(s) 1930 may receive the requests from user device 1910 may obtain content of the relevant microsites. In some implementations, as described above, the content of a relevant microsite may be dynamic in the sense that the content of the relevant microsite is based on the sensor data received from user device 1910.

As shown at (I) in FIG. 28, server(s) 1930 may provide the content of the relevant microsites to user device 1910. Display module 2040, of user device 1910, may receive the content and present the content on a display associated with user device 1910. For example, display module 2040 may push the content, for the relevant microsites, as a sliding display of content. In some implementations, content for one of the relevant microsites may be presented on the display at a time. A user, of user device 1910, may interact with the content, using a finger or the like, to express the user's interest or disinterest in the content or to see the content for another one of the relevant microsites.

FIGS. 29-36 illustrate an example of identifying and presenting microsite content. As shown in FIG. 29, assume that a user ("Carly") is walking in town and takes, with her, a user device in the form of a watch. The watch sends user profile data and sensor data to the ranking system. As shown in FIG. 29, assume that the user profile data includes information identifying Carly's user profile—i.e., ABC123—which may include any kind of identifier that the ranking system may use to locate Carly's user profile. The ranking system may obtain Carly's preferences from her user profile. As further shown in FIG. 29, assume that the sensor data includes information identifying the current date—i.e., Mar. 2, 2012; the current time—i.e., 11:32 AM; the current weather condition—i.e., sunny; Carly's current speed—i.e., 0.8 kilometers per hour (KPH); and Carly's current geographic location—i.e., latitude (LAT) 40.52202 and longitude (LONG) −79.84180.

As shown in FIG. 30, assume that the ranking system applies the sensor data to the triggering criteria, for the microsites in the index, to identify a set of relevant microsites. For example, the ranking system may compare the sensor data to the triggering criteria, for each of the microsites in the index, to identify which of the microsites are relevant to the sensor data. As shown in FIG. 30, assume that the ranking system identifies the following relevant microsites: a bus notifier microsite, an Action League microsite, a Calendar microsite, a Rio Grand microsite, and a history microsite.

For the Action League microsite, assume that the index stores the following triggering criteria: user is within 100 meters of a theater showing the Action League movie AND the current time is within 60 minutes of the movie start time AND the user is moving less than 5 KPH. The ranking system may determine that the Carly's sensor data satisfies the triggering criteria. For example, assume that Carly is currently 50 meters from Regal Cinema which is showing the Action League movie, which satisfies the criterion that the user be within 100 meters of a theater showing the Action League movie. Further assume that the movie starts in 8 minutes, which satisfies the criterion that the current time be within 60 minutes of the movie start time. Based on Carly's sensor data, Carly is moving at 0.8 KPH, which satisfies the criterion that the user be moving less than 5 KPH.

Figure 31:
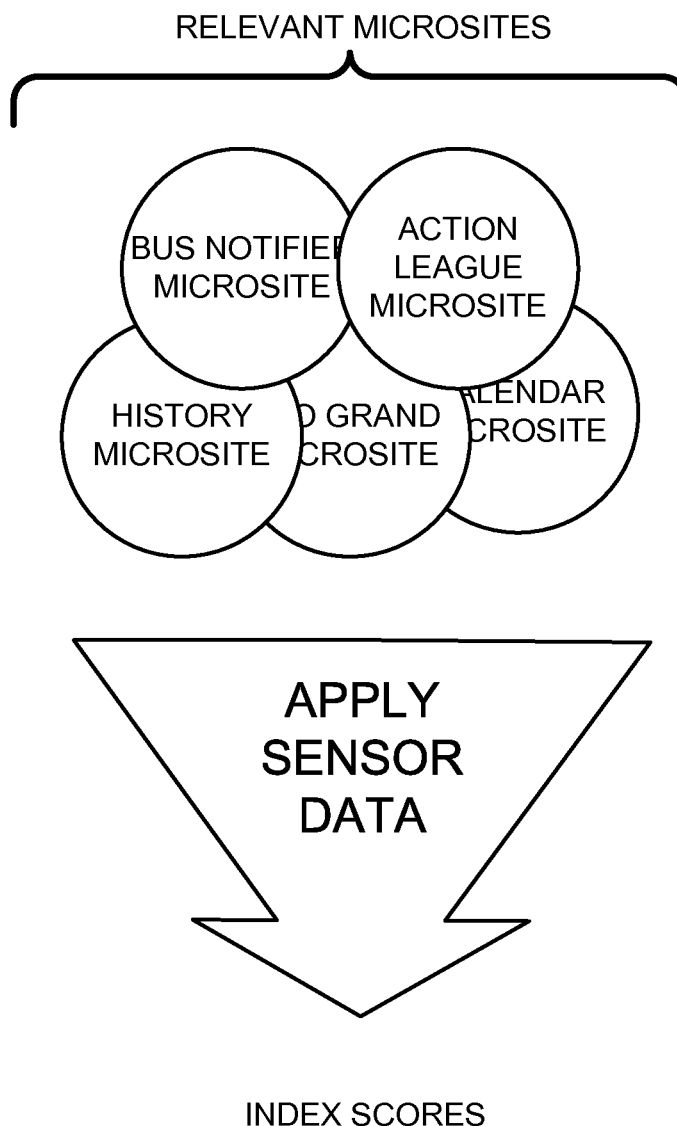

As shown in FIG. 31, assume that the ranking system applies the sensor data to the triggering criteria for the relevant microsites in the index to generate index scores for the relevant microsites. For example, the ranking system may compare the sensor data to the triggering criteria, for each of the relevant microsites, to generate the index scores. As described above, the ranking system may use a function, similar to the functions described with regard to FIGS. 24A-24C, to generate real values that may be used for the index scores.

For the Action League microsite, assume that the ranking system applies Carly's sensor data to the triggering criteria and generates an index score of 0.9—on an example scale of zero to one. Assume further that the Action League microsite is the top-scoring microsite among the relevant microsites.

Figure 32:
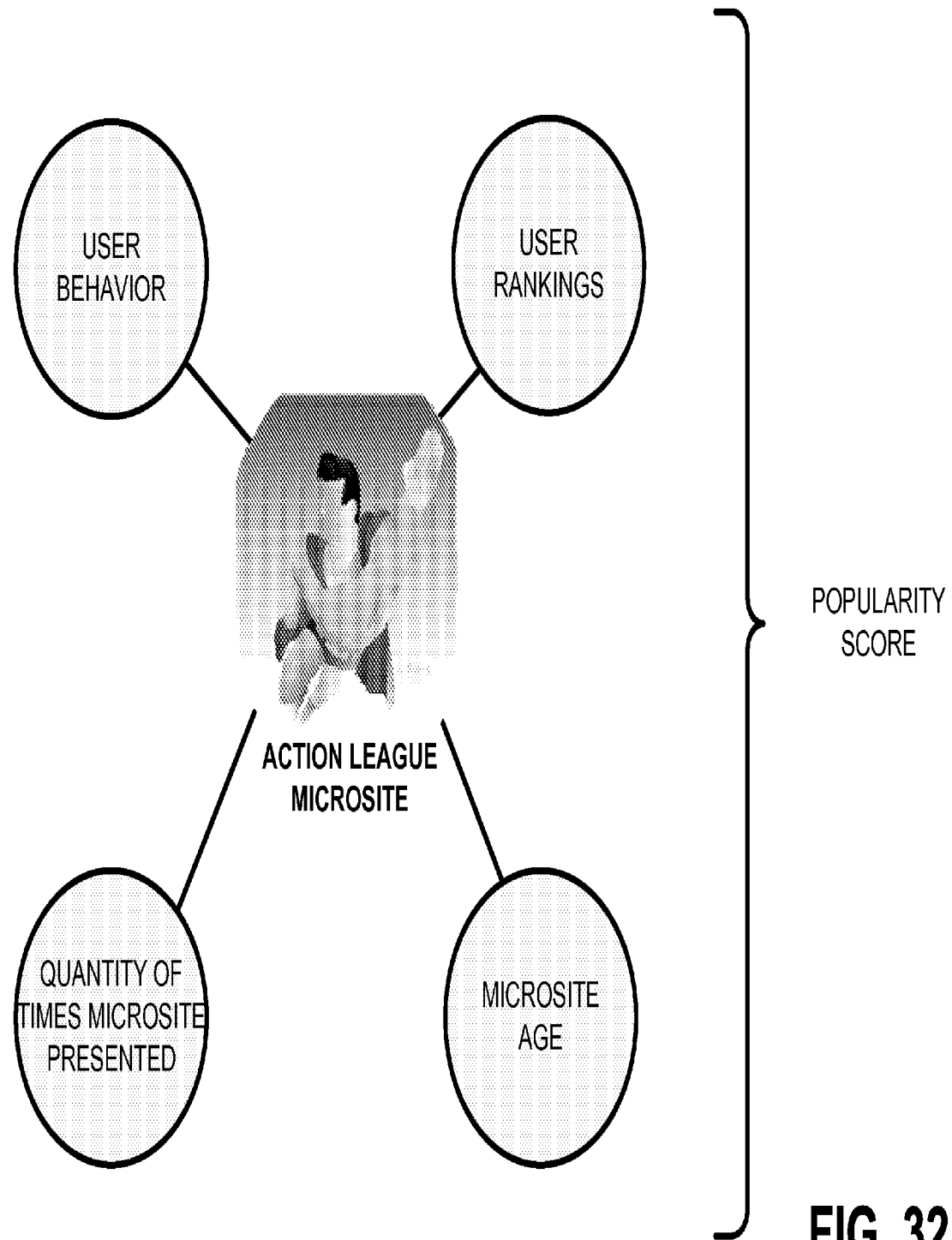

As shown in FIG. 32, the ranking system may determine a popularity score for a relevant microsite—shown as the Action League microsite in FIG. 32. The ranking system may use various data, as described above. Examples of types of data, shown in FIG. 32, include user behavior data relating to the Action League microsite; user rankings data relating to the Action League microsite; microsite age data corresponding to the age of the Action League microsite, and/or data reflecting the quantity of times that the Action League microsite has been presented to user devices 1910. Assume that the user behavior data indicates that users have previously followed a recommendation given by the Action League microsite by going to see the movie; that the user rankings data indicates that users have given the Action League microsites overall favorable ratings; that the microsite age data indicates that the Action League microsite is relatively new; and that the data reflecting the quantity of times that the microsite has been presented to user devices 1910 indicates that the Action League microsite has been presented 1,000 times. The ranking system may generate a popularity factor score for each of these types of data and combine the popularity factor scores to determine the popularity score for the Action League microsite.

Figure 33:
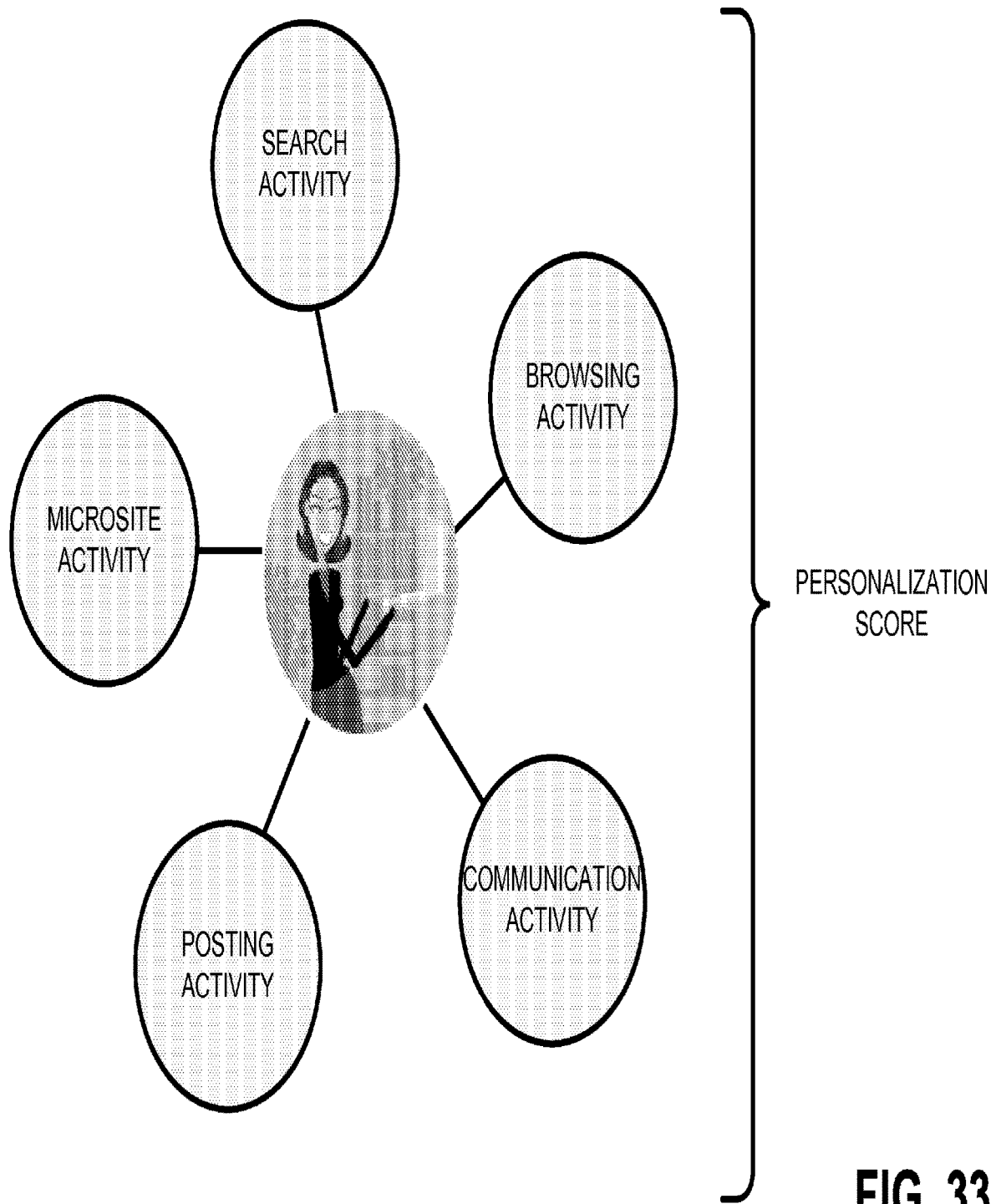

As shown in FIG. 33, the ranking system may determine a personalization score for Carly relative to the Action League microsite. The ranking system may use various data, as described above. Examples of types of data, shown in FIG. 33, include search activity data corresponding to Carly's searches relating to the Action League movie; browsing activity data corresponding to Carly browsing the web for information relating to the Action League movie; communication activity data corresponding to Carly's communications involving the Action League movie; posting activity data relating to Carly's postings on social networks, blogs, or other public sites relating to the Action League movie; and microsite activity data corresponding to Carly's prior interactions with the Action League microsite. Assume that the search activity data indicates that Carly has performed one or more web searches for the Action League movie; that the browsing activity data indicates that Carly has accessed a trailer for the Action League movie; that the communication activity data indicates that Carly has sent two e-mails regarding the Action League movie; that the posting activity data indicates that Carly has posted a comment regarding the Action League movie on a social network; and that the microsite activity data indicates that Carly has not dismissed—e.g., swiped away—the Action League microsite when previously presented on Carly's watch. The ranking system may generate a personalization factor score for each of these types of data and combine the personalization factor scores to determine the personalization score for Carly relative to the Action League microsite.

Figure 34:
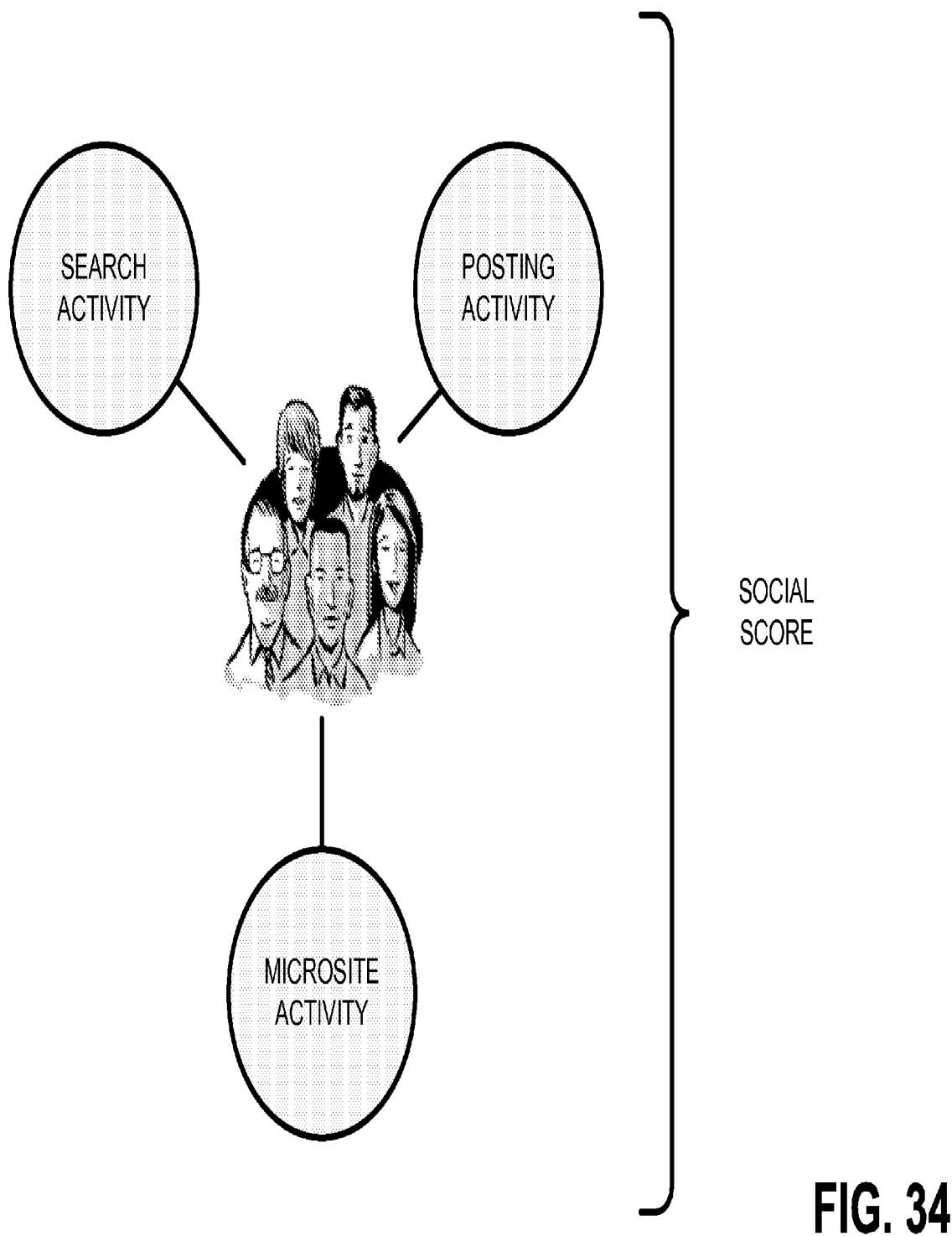

As shown in FIG. 34, the ranking system may determine a social score for Carly's social contacts relative to the Action League microsite. The ranking system may use various data, as described above. Examples of types of data, shown in FIG. 34, include search activity data corresponding to Carly's social contacts' searches relating to the Action League movie; posting activity data relating to Carly's social contacts' postings on social networks, blogs, or other public sites relating to the Action League movie; and microsite activity data corresponding to Carly's social contacts' prior interactions with the Action League microsite. Assume that the search activity data indicates that Carly's social contacts have performed web searches for the Action League movie; that the posting activity data indicates that Carly's social contacts have posted several comments regarding the Action League movie on social networks; and that the microsite activity data indicates that Carly's social contacts have provided favorable ratings to the Action League microsite when previously presented to user devices of Carly's social contacts. The ranking system may generate a social factor score for each of these types of data and combine the social factor scores to determine the social score for Carly's social contacts relative to the Action League microsite.

Figure 35:
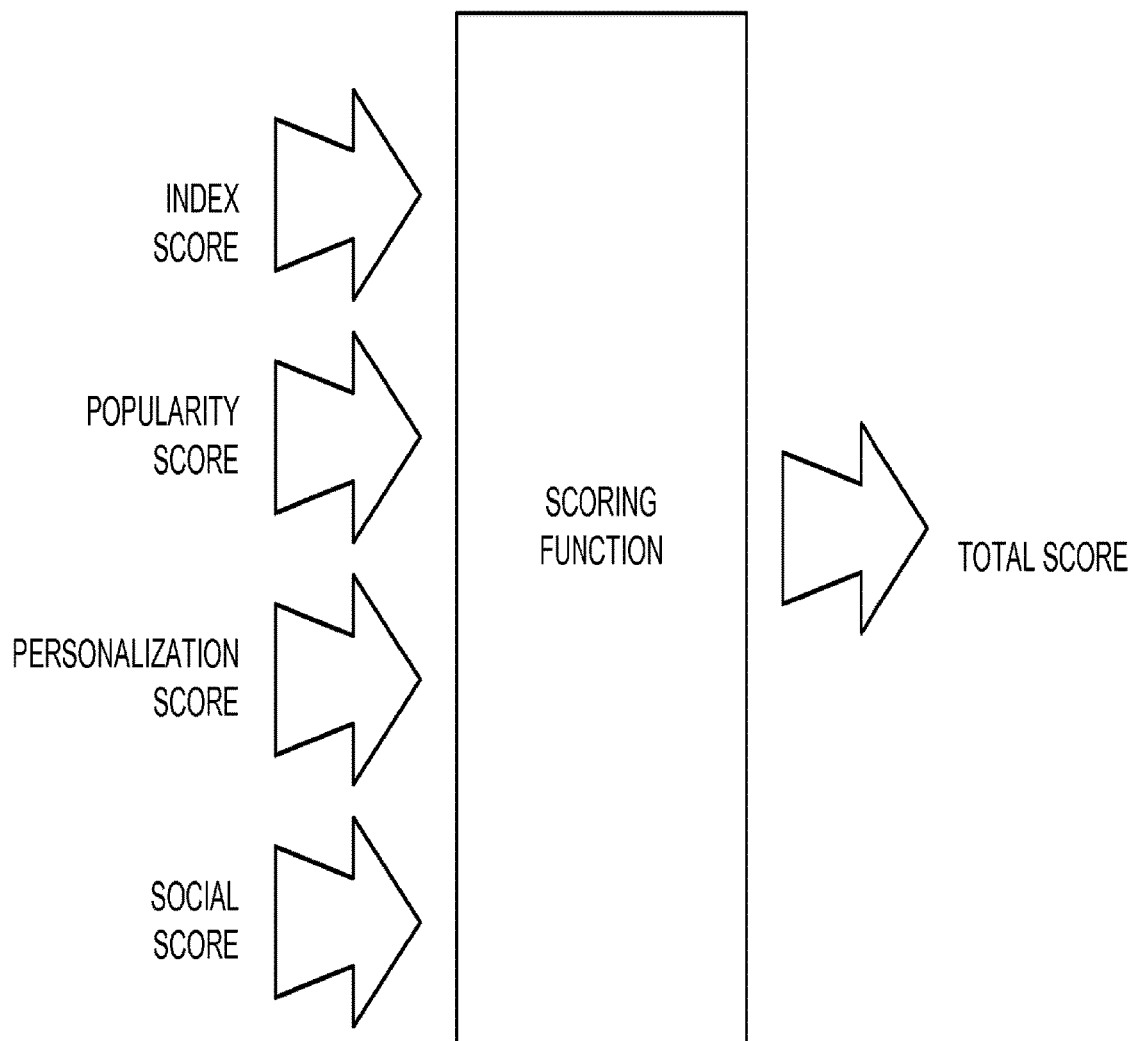

As shown in FIG. 35, the ranking system may input the index score, the popularity score, the personalization score, and the social score into a scoring function. The scoring function may be a simple summation of these scores or something more complex. For example, the ranking system may assign weights to the different scores and combine the weighted scores using the scoring function to obtain a total score.

Figure 36:
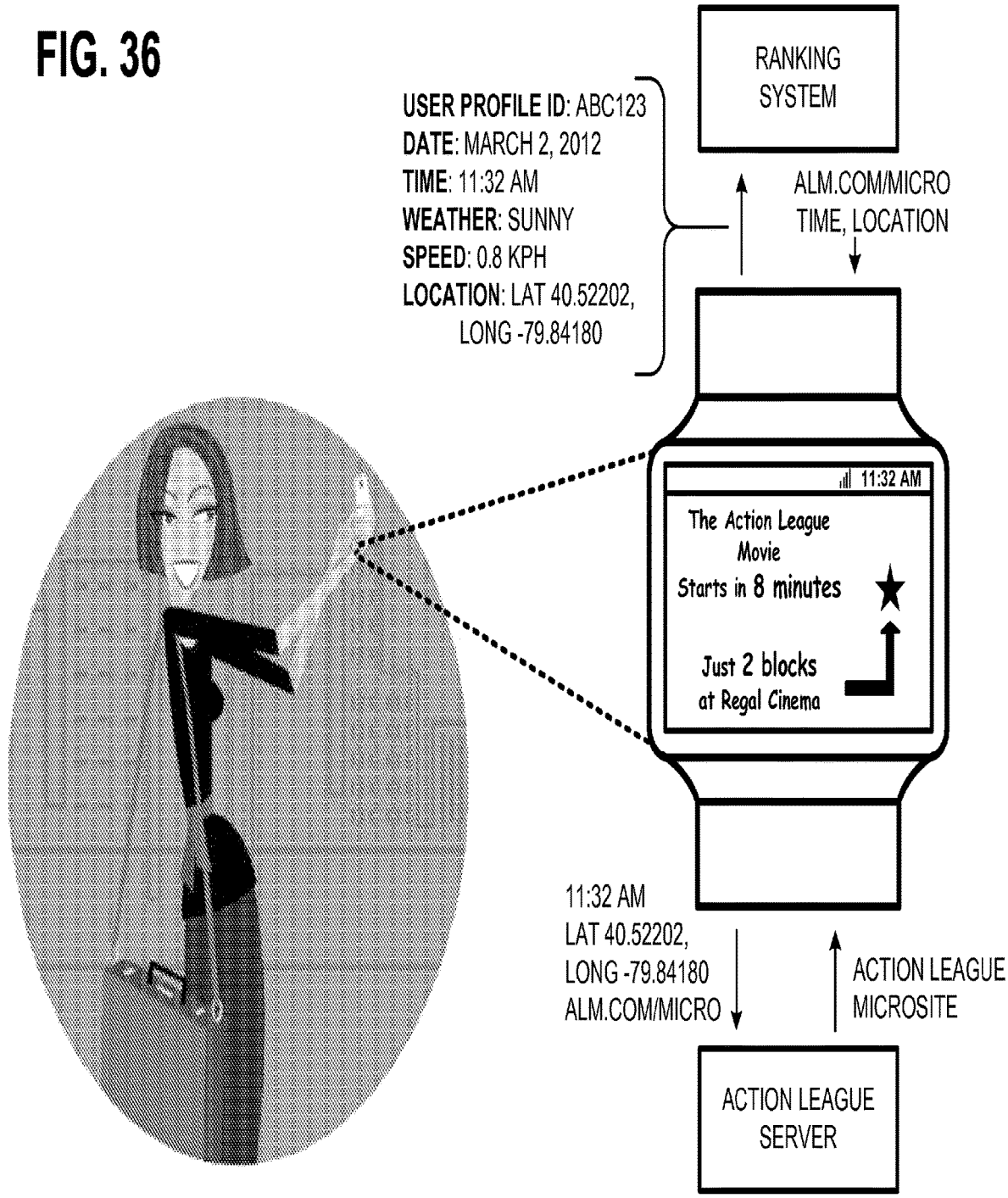

As shown in FIG. 36, assume that the ranking system selects the top-scoring Action League microsite for presentation to Carly's watch. The ranking system may provide information regarding the Action League microsite to Carly's watch. As shown in FIG. 36, the ranking system may provide a network address for the Action League microsite—shown as alm.com/micro—and a list of sensors for the Action League microsite—shown as time and location. Carly's watch may receive the network address and list of sensors and determine sensor data relating to the sensors on the list. Carly's watch may use the network address to access the Action League server and send the sensor data to the Action League server. The Action League server may generate or modify the content of the Action League microsite based on the sensor data and provide the content for presentation on a display of Carly's watch. As shown in FIG. 36, Carly's watch may display information that the Action League movie starts in 8 minutes at the Regal Cinema, which is just two blocks from Carly's current location.

A system and method, described herein, may determine a relevant microsite to provide to a user device based on context data without the need for a user, of the user device, to request the microsite. The microsite may provide information that may be useful to the user.

Example 4

A system and/or method, as described herein, may provide relevant microsites to a user device based on context data and without the need for a user, of the user device, to request the microsites. The context data may include user profile data relating to the user or the user device and/or sensor data relating to one or more conditions associated with the user device. In some implementations, the relevant microsites that are provided or the order in which the relevant microsites are provided to the user device may be based on whether the user has previously purchased any of the relevant microsites. The microsites may provide information that may be useful to the user.

Figure 37A:
FIG. 37A, FIG. 37B, FIG. 37C, and FIG. 37D are diagrams illustrating an overview of an example implementation described herein.

FIGS. 37A-37D are diagrams illustrating an overview 3700 of an example implementation described herein. With reference to FIG. 37A, assume a user, of a user device, accesses a microsite store, which provides microsites for purchase. Assume that the user has identified a microsite, named "Music ID," that the user desires to purchase. Thus, as shown in FIG. 37A, the user may select a BUY button to begin purchase of the microsite. Thereafter, the user's device may provide payment information for completing the purchase of the microsite.

Figure 37B:
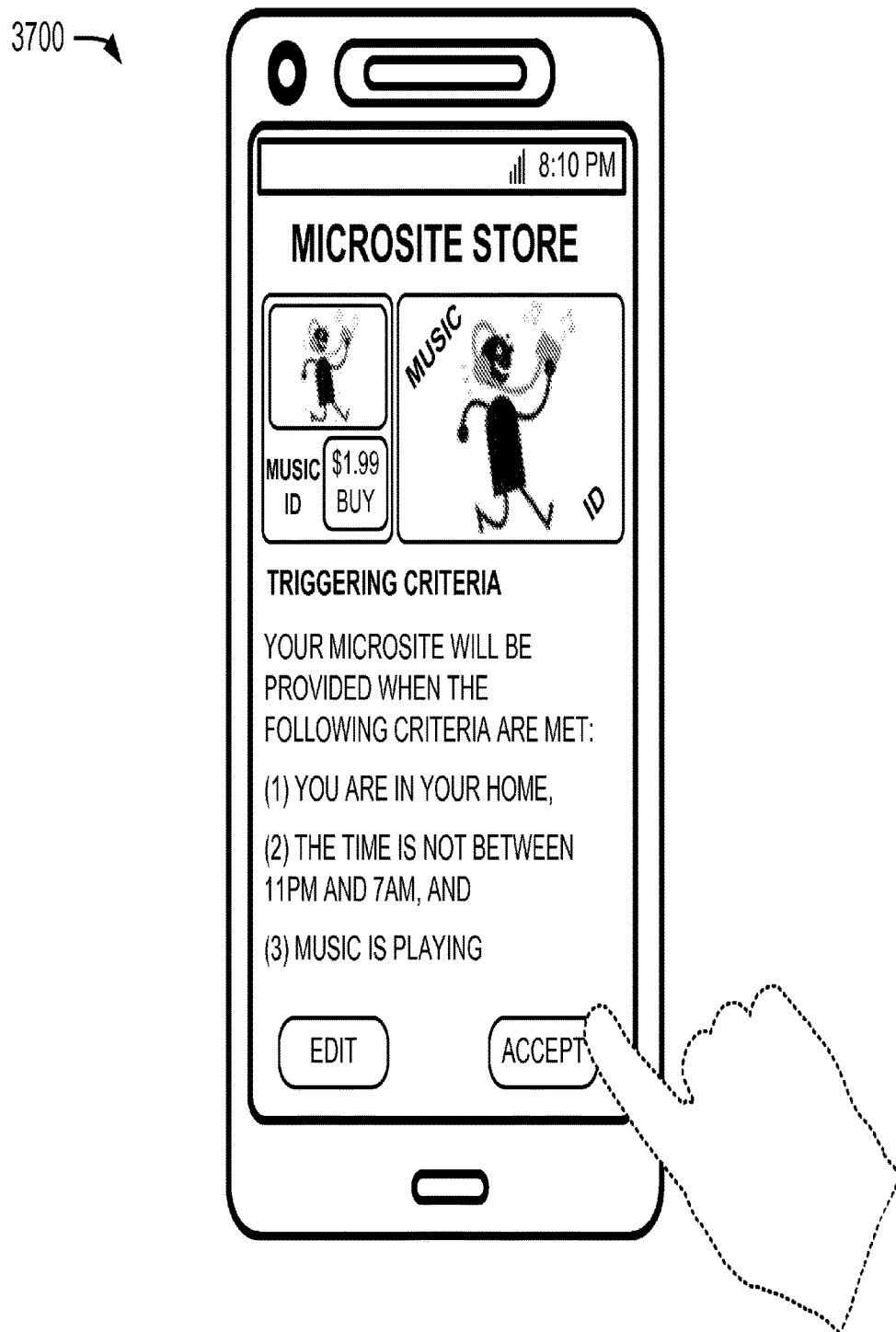

Upon purchase of the microsite, the user may be presented with a list of triggering criteria that dictate when the purchased microsite will be provided to the user's device, as shown in FIG. 37B. The user may accept or edit the triggering criteria. Upon acceptance of the originally-presented triggering criteria or an edited version of the triggering criteria, the user's device may store, in a user profile, information relating to the purchased microsite, such as information identifying the microsite and possibly the triggering criteria. Assume, for example 3700, that the user accepts the original triggering criteria, which indicate that the Music ID microsite will be presented to the user's device when the user is at home, the time is not between 11 PM and 7 AM, and music is playing.

Figure 37C:
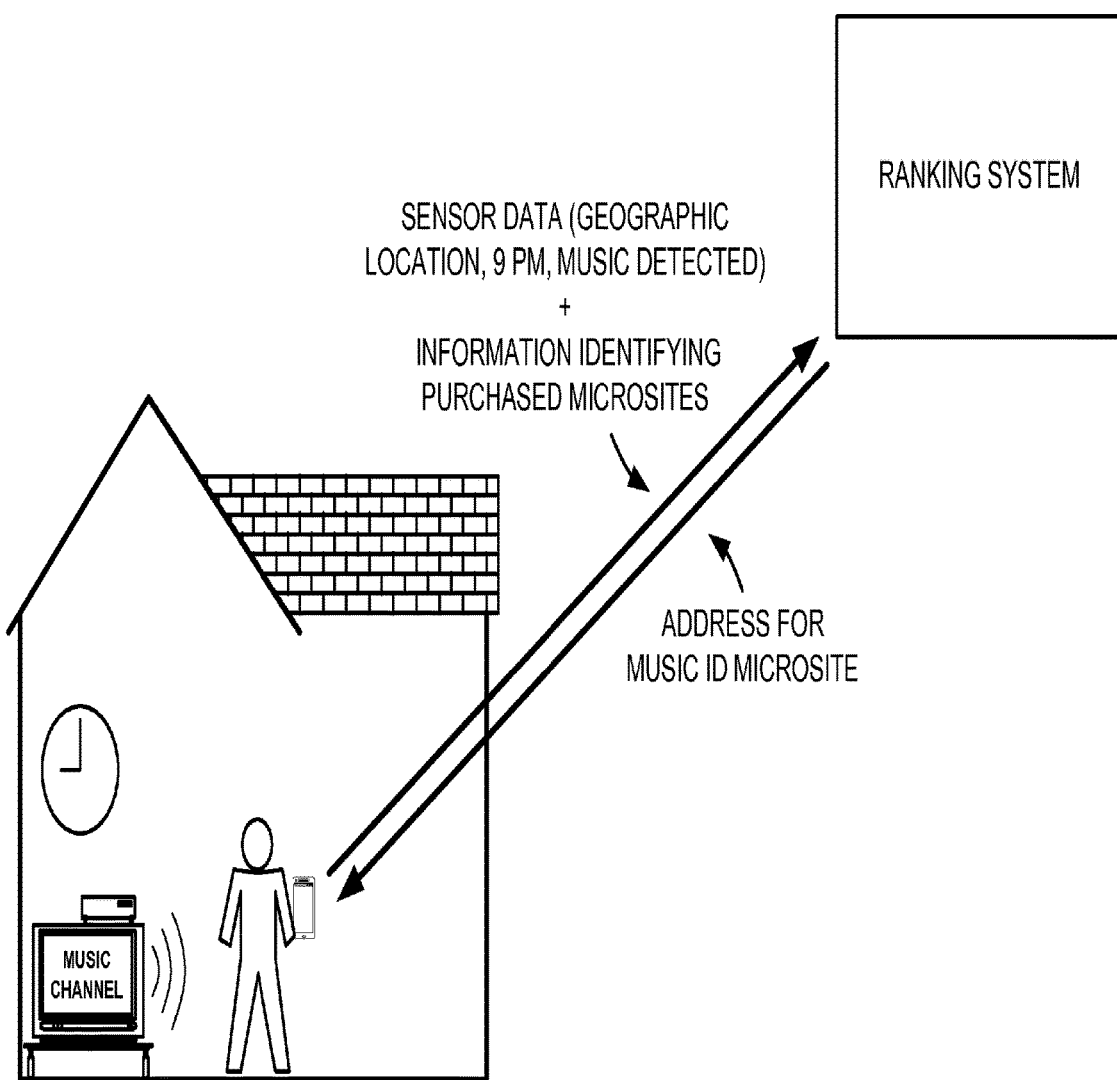

From time to time, the user's device may transmit, with the user's permission, sensor data to a ranking system. In addition, the user's device may transmit, with the user's permission, user profile data to the ranking system. Assume, at some point in time, the user's device transmits, as shown in FIG. 37C, sensor data, to the ranking system, that indicates that the current geographic location of the user's device corresponds to the user's home, that the time is 9 PM, and that music has been detected. In addition, the user's device may transmit, to the ranking system, information identifying microsites that have been purchased by the user. Thus, in example 3700, the user's device may transmit, to the ranking system, information identifying the Music ID microsite.

Based on the sensor data, assume that the ranking system identifies a group of microsites that are relevant to the sensor data. Since the sensor data satisfies the triggering criteria for the Music ID microsite, assume that the group of microsites includes the Music ID microsite. In addition, based on the information identifying microsites that have been purchased by the user, the ranking system may identify the Music ID microsite as the one that is to be provided to the user's device before the other microsites in the identified group. As a result, the ranking system may provide, to the user's device, an address for accessing the Music ID microsite, as illustrated in FIG. 37C.

Figure 37D:
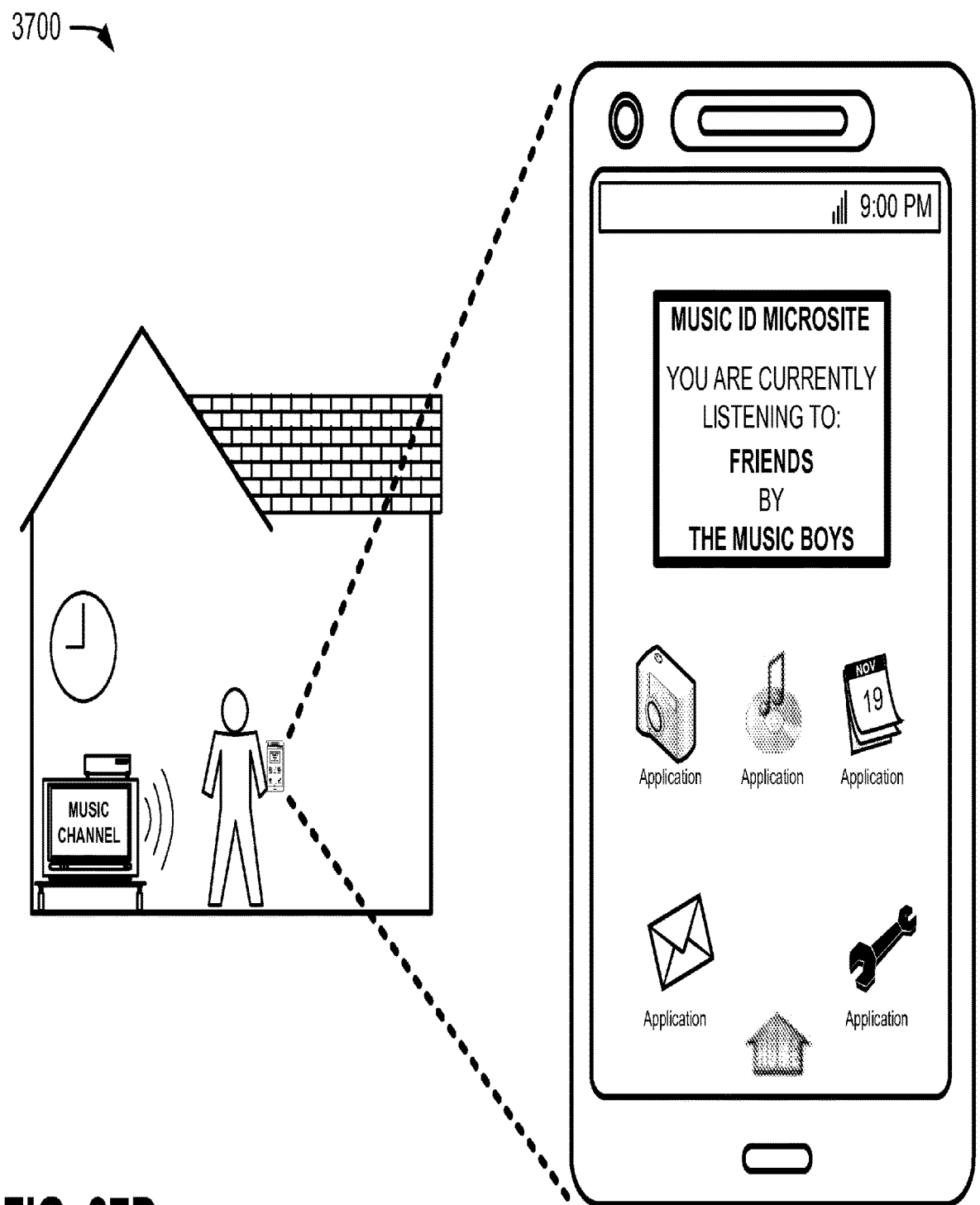

The user's device may use the address to obtain the Music ID microsite from, for example, a server that hosts the microsite. As part of obtaining the microsite, the user's device may send an audio clip, containing a portion of the music detected by the user's device, to the server. The server may use the audio clip to identify the song and artist. The Music ID microsite may be presented to the user via the user's device, as shown in FIG. 37D. As shown, the Music ID microsite may present the name of the song that is currently playing in the user's home and the name of the artist of the song. Thus, a purchased microsite that is determined to be relevant to sensor data, received from a user's device, may be provided before other relevant microsites that have not been purchased.

Figure 38:
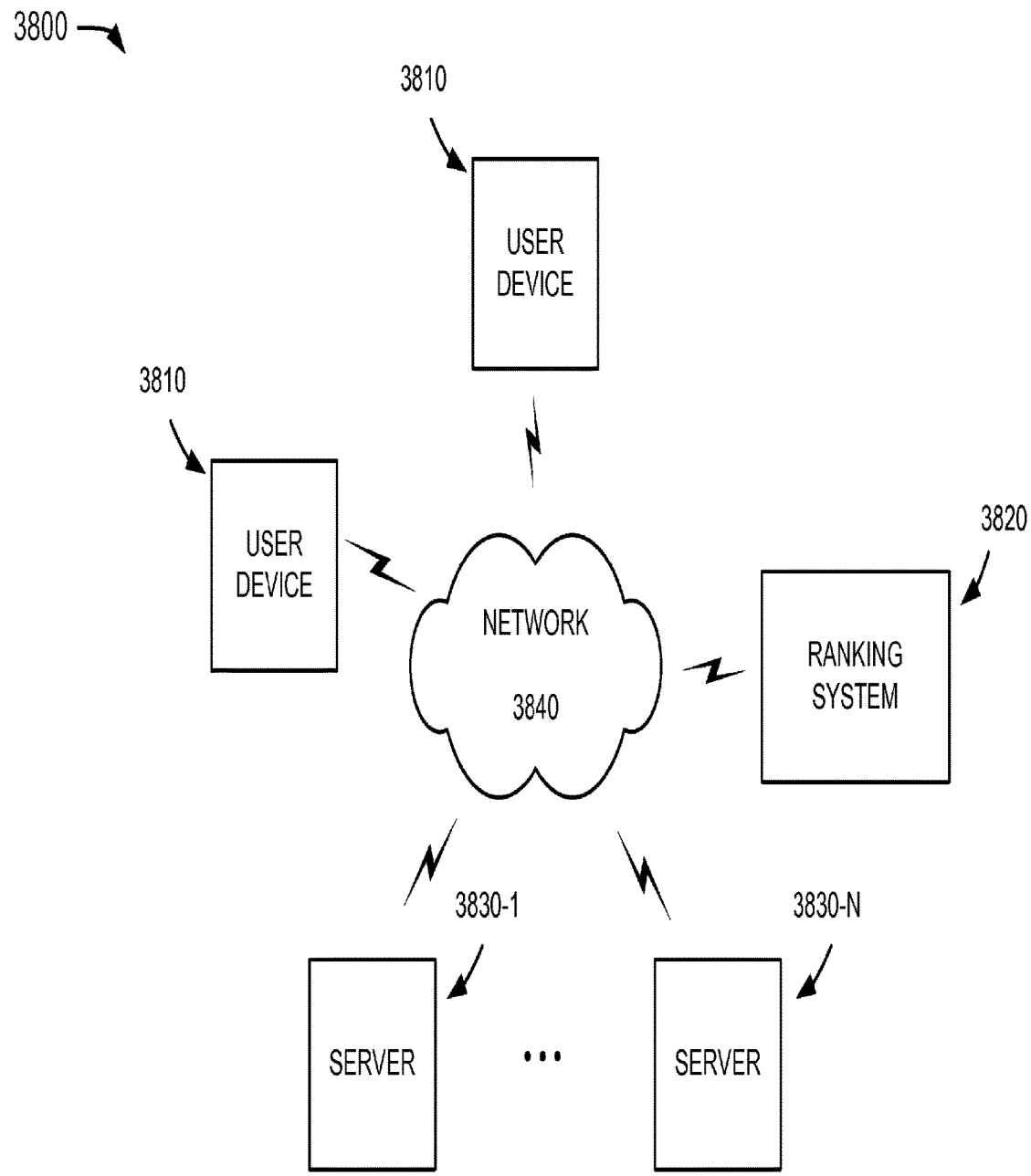
FIG. 38 is a diagram of an example environment in which systems and/or methods described herein may be implemented.

FIG. 38 is a diagram of an example environment 3800 in which systems and/or methods described herein may be implemented. Environment 3800 may include a group of user devices 3810 connected to a ranking system 3820, and multiple servers 3830-1 through 3830-N (where N>1) (referred to collectively as "servers 3830" and, at times, individually, as "server 3830") via a network 3840.

User device 3810 may include a client device, or a collection of client devices, that is capable of presenting a document on a display. Examples of user device 3810 may include a smart phone, a personal digital assistant, a laptop, a tablet computer, a camera, a watch, a personal computer, and/or another type of device with the ability to display a microsite. In some implementations, user device 3810 may include a browser via which a microsite may be presented on a display associated with user device 3810.

Ranking system 3820 may include a server device or a collection of server devices which may be co-located or remotely located. Ranking system 3820 may identify microsites and index information associated with the microsites. Ranking system 3820 may identify relevant microsites to present to a user device 3810, based on, for example, context data received from user device 3810 and triggering criteria for triggering the presentation of the microsites, and provide information regarding the relevant microsites to user device 3810. In addition, ranking system 3820 may provide one or more user interfaces, to user device 3810, to allow a user, of user device 3810, to purchase a microsite.

Server 3830 may include a server device or a collection of server devices that may be co-located or remotely located. Any two or more of servers 3830 may be implemented within a single, common server device or a single, common collection of server devices. Servers 3830 may host documents, such as microsites. In some implementations, one or more of servers 3830 may be affiliated with a same entity (e.g., party, organization, business, company, etc.) as ranking system 3820. In some implementations, none of servers 3830 may be affiliated with the same entity as ranking system 3820.

While ranking system 3820 is shown as separate from servers 3830, it may be possible for ranking system 3820 to perform one or more of the functions described as being performed by a server 3830 and/or a server 3830 to perform one or more of the functions described as being performed by ranking system 3820. For example, ranking system 3820 may host some or all of the microsites. Additionally, or alternatively, a user device 3810 may host some of the microsites and/or may perform one or more of the functions of ranking system 3820.

Network 3840 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. User device 3810, ranking system 3820, and servers 3830 may connect to network 3840 via wired and/or wireless connections. In other words, any one of user device 3810, ranking system 3820, and/or servers 3830 may connect to network 3840 via a wired connection, a wireless connection, or a combination of a wired connection and a wireless connection.

Although FIG. 38 shows example components of environment 3800, in some implementations, environment 3800 may include additional components, fewer components, different components, or differently arranged components than those depicted in FIG. 38. Additionally, or alternatively, one or more components of environment 3800 may perform one or more tasks described as being performed by one or more other components of environment 3800.

Figure 39:
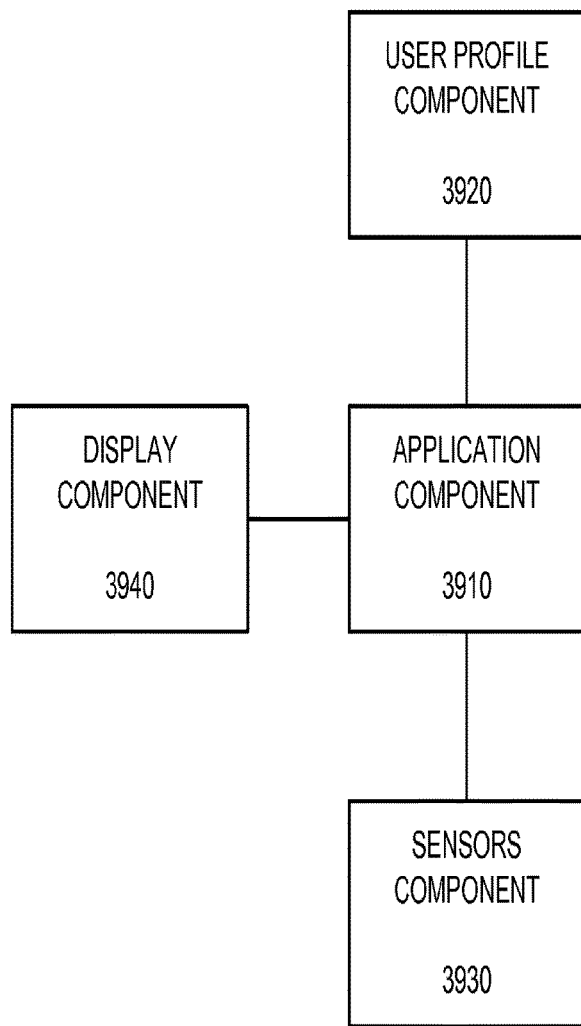
FIG. 39 is a diagram of example functional components of the user device of FIG. 38.

FIG. 39 is a diagram of example functional components of user device 3810. In some implementations, the functional components, shown in FIG. 39, may be implemented by user device 3810. In some implementations, one or more of the functional components, shown in FIG. 39, may be implemented by a device separate from user device 3810, such as another user device 3810 operating in combination with user device 3810.

As shown in FIG. 39, user device 3810 may include an application component 3910, a user profile component 3920, a sensors component 3930, and a display component 3940. Application component 3910 may control the operation of user device 3810 with regard to the presentation of microsites on user device 3810. In some implementations, application component 3910 may take the form of a browser application. In some implementations, application component 3910 may automatically run when user device 3810 powers on or boots up, or may run when instructed by a user of user device 3810. In some implementations, application component 3910 may run in the background on user device 3810. The user, of user device 3810, may stop application component 3910 from running at any time.

Application component 3910 may allow a user, of user device 3810, to purchase a microsite. For example, application component 3910 may access an online store, provided by ranking system 3820 or another system/device, that provides microsites for purchase. Application component 3910 may receive information identifying microsite content that the user desires to purchase, may provide monetary payment—e.g., in the form of credit card information—to ranking system 3820 and/or another system/device, and may store information relating to the microsite in user profile component 3920.

Application component 3910 may obtain information from user profile component 3920 and sensors component 3930 and provide the information to ranking system 3820. Application component 3910 may also receive information regarding one or more microsites from ranking system 3820. In some implementations, the information, regarding a microsite, may include a network address, such as a URL or URI, associated with the microsite from ranking system 3820. Additionally, or alternatively, the information, regarding a microsite, may include a list of sensors that is relevant to the content of the microsite. Application component 3910 may provide the information to display component 3940. In some implementations, application component 3910 may automatically obtain information from user profile component 3920 and/or sensors component 3930, and/or automatically provide the information to ranking system 3820—e.g., without input from a user of user device 3810. In some implementations, application component 3910 may periodically provide the information to ranking system 3820— e.g., according to no predefined schedule. In some implementations, application component 3910 may regularly provide the information to ranking system 3820—e.g., according to a predefined schedule. In some implementations, application component 3910 may provide the information to ranking system 3820 based on a schedule identified by the user of user device 3810—e.g., every 5 minutes between 10 AM and 11 PM when user device 3810 has been idle for at least 5 minutes but not when user device 3810 is charging. In some implementations, application component 3910 may provide the information to ranking system 3820 according to some other criteria.

User profile component 3920 may obtain, store, and/or provide user profile data. User profile data may include various information regarding user device 3810, a user of user device 3810, and/or one or more other user devices 3810 associated with the user of user device 3810. The user profile data may only be obtained, stored, and/or provided with the user's express permission, and the user profile data may be anonymized with regard to the identity of the user. In some implementations, user profile component 3920 may store some user profile data and an identifier associated with additional user profile data, which may be stored externally to user device 3810, such as at ranking system 3820 or at a server accessible by ranking system 3820. In some implementations, user profile component 3920 may simply store an identifier associated with the user profile data, which may be stored externally to user device 3810, such as at ranking system 3820 or at a server accessible by ranking system 3820. Thus, references, herein, to user profile data may refer to an identifier associated with the user profile data.

Examples of user profile data may include information identifying a microsite that has been purchased via user device 3810; information identifying a date on which a microsite was purchased; information identifying a time at which the microsite was purchased; user-modified triggering criteria for a purchased microsite; rankings for purchased microsites; geographic addresses associated with the user, such as the address of the user's home, the address of the user's place of business, the address of a location frequented by the user, etc.; information inputted into a calendar associated with the user; information regarding the user's interaction with microsites that have been presented to the user, such as ratings given to the microsites, whether the user has dismissed—e.g., swiped away—from microsites that have been presented to the user, or the like; information regarding the user's communications, such as e-mails, text messages, instant messages, voicemail messages, or the like; information regarding the user's activity on the web, such as information regarding the user's searches, the user's browsing activity, the user's posts on social networks, blogs, and/or other public web sites; information regarding activities on the web of the user's social contacts, such as people with which the user has communicated, or other people having a social relationship with the user, names and/or identifiers—e.g., identifiers that are anonymized with regard to the identities of particular individuals—of people listed in the user's address book, people friended by the user on social networks or other public web sites; and/or information regarding the user's habits, such as places that the user has visited, things that the user has done, at what time the user usually gets up in the morning, or the like. While certain examples of user profile data have been identified above, other types of user profile data are possible.

The user may review, add, remove, and/or revise the user profile data at any time. In some implementations, the user may specify what type of information is to be used for the user profile data. For example, the user may specify that the information regarding the user's activity on the web is to be used for the user profile data, and the information regarding the user's communications and the information regarding the user's friends' activities on the web are not to be used for user profile data.

Sensors component 3930 may obtain, store, and/or provide sensor data. Sensor data may include various information regarding user device 3810 and/or conditions associated with user device 3810. The sensor data may only be obtained, stored, and/or provided with the user's express permission, and the sensor data may be anonymized with regard to the identity of the user. Sensor component 3930 may interact with one or more components of user device 3810, such as an accelerometer, a global positioning system component, a communication component, or the like, to obtain the sensor data. Additionally, or alternatively, sensor component 3930 may interact with one or more external devices, such as one or more servers, to obtain the sensor data.

Examples of sensor data may include information regarding a current geographic location of user device 3810; information regarding sounds occurring at or around user device 3810; information regarding current lighting condition at user device 3810; information regarding a current date and/or time associated with user device 3810; information regarding a current speed of user device 3810; information regarding a current direction in which user device 3810 is moving; information regarding a current orientation or change in orientation of user device 3810; information regarding a current weather condition in the location in which user device 3810 is located; information regarding a current temperature in the location in which user device 3810 is located; and/or information regarding interaction of user device 3810 with other devices with which user device 3810 is in communication. While certain examples of sensor data have been identified above, other types of sensor data are possible.

The user may specify what type of information is to be used for the sensor data. For example, the user may specify that the current geographic location, the current time, the current speed, the current direction, and the current orientation or change in orientation of user device 3810 are to be used for the sensor data, and the interaction of user device 3810 with other devices is not to be used for the sensor data.

Display component 3940 may receive information, such as a network address associated with a microsite and/or a list of sensors that are relevant to the microsite, from application component 3910. Display component 3940 may use the information to transmit a request to a server 3830 to obtain the microsite. The request may include the network address, associated with the microsite, and sensor data associated with the sensors in the list. The sensor data, included with the request, may be a subset of the sensor data obtained by sensors component 3930. In some particular implementations, the request may include a GET request and the content of the microsite may include hypertext mark-up language (HTML), cascading style sheets (CSS), or Javascript.

Display component 3940 may receive the microsite and render the content of the microsite on a display associated with user device 3810. In some implementations, the content of the microsite may include code to obtain real-time sensor data from user device 3810 or a device separate from user device 3810. In some example implementations, this code may obtain the real-time sensor data once when the content of the microsite is rendered on the display. In some example implementations, this code may obtain the real-time sensor data more than once while the content of the microsite is rendered on the display. The content of the microsite may be updated based on the real-time sensor data.

In some implementations, display component 3940 may push the content to the display so as to override any content already on the display. In some implementations, display component 3940 may determine an appropriate time to render the content of the microsite, such as when user device 3810 is idle for a particular amount of time, when user device 3810 is in a lock mode, when user device 3810 is in a particular orientation, or the like. In some implementations, a user of user device 3810 may specify how and when the user will be presented with the content of a microsite. For example, the user may specify that the content of a microsite can only be presented between 8 AM and 8 PM on weekdays and between 12 PM and 11 PM on weekends; that the content of a microsite can only be presented when the user is located in her home state of Virginia; that the content of a microsite can only be presented when the user is moving at a speed of less than 20 KPH; or the like.

In some implementations, display component 3940 may present the content of the microsite on the display of user device 3810 for a particular amount of time and, thereafter, remove the content of the microsite from the display. In some example implementations, the particular amount of time may be configurable by the user of user device 3810. In some example implementations, the particular amount of time may be preset by application component 3910, by an entity associated with ranking system 3820, or by an entity associated with server 3830 hosting the content of the microsite.

In some implementations, display component 3940 may present the content of the microsite within a particular region of the display of user device 3810. The particular region may include the entire display area of the display or a subset of the entire display area of the display. In some example implementations, the size and/or location of the particular region may be configurable by the user of user device 3810. In some example implementations, the size and/or location of the particular region may be preset by application component 3910, by an entity associated with ranking system 3820, or by an entity associated with server 3830 hosting the content of the microsite.

A user may interact with the content of the microsite to dismiss the content—e.g., by swiping the content—or to obtain additional information regarding the content—e.g., by selecting the content. The user's interaction with the microsite content may be recorded as user profile data by user profile component 3920.

Although FIG. 39 shows example functional components of user device 3810, in some implementations, user device 3810 may include additional functional components, different functional components, or fewer functional components than those depicted in FIG. 39. Additionally, or alternatively, one or more functional components of user device 3810 may perform one or more tasks described as being performed by one or more other functional components of user device 3810.

FIG. 40 is a diagram of example functional components of ranking system 3820. In some implementations, the functional components, shown in FIG. 40, may be implemented by ranking system 3820. In some implementations, one or more of the functional components, shown in FIG. 40, may be implemented by a system or device separate from ranking system 3820, such as a user device 3810 operating alone or in combination with ranking system 3820. As shown in FIG. 40, ranking system 3820 may include an input component 4010, an indexing component 4020, and a ranking component 4030.

Input component 4010 may identify microsites for use by ranking system 3820. In some implementations, input component 4010 may identify microsites through crawling. For example, input component 4010 may include or interact with a crawler to locate microsites on a network, such as network 3840. The crawler may follow links to locate documents on the network. Input component 4010 may determine which documents are microsites by locating particular information on documents that are microsites. This particular information may include a piece of code that identifies the document as a microsite.

In some implementations, input component 4010 may identify microsites via manual input. For example, input component 4010 may provide a user interface via which microsite designers may provide information regarding microsites that the microsite designers have created. In some implementations, a microsite designer, via the user interface, may identify a network address, such as a URL, associated with a microsite. Additionally, or alternatively, the microsite designer, via the user interface, may upload the content of the microsite. The content of the microsite may be hosted by ranking system 3820 or a device separate from ranking system 3820, such as a server 3830.

Input component 4010 may also provide a user interface that allows microsite designers to specify other information in relation to a microsite. For example, the user interface may allow a microsite designer to specify triggering criteria that dictate when the designer's microsite is to be presented—e.g., pushed—to a user device 3810, and a name for the microsite.

Indexing component 4020 may include one or more indexes that may be stored in one or more memory devices, which may be co-located or remotely located. In some implementations, indexing component 4020 may store information regarding various microsites in an index. For a particular microsite, for example, the index may store a descriptive name of the particular microsite, a network address for the particular microsite, triggering criteria for the particular microsite, and/or a list of sensors that are relevant for the particular microsite. Ranking component 4030 may use the information in the index to identify microsites that are relevant for a particular user and/or in a particular situation.

Ranking component 4030 may receive user profile data and sensor data from user device 3810. Ranking component 4030 may use the user profile data and/or the sensor data to identify relevant microsites. In some implementations, ranking component 4030 may identify microsites that are relevant based on the sensor data and the triggering criteria, compare the sensor data to the triggering criteria for the microsites, and generate scores for the microsites based on a result of the comparisons. For example, ranking component 4030 may perform a first analysis to identify relevant microsites based on the sensor data and the triggering criteria; and perform a second analysis on the relevant microsites, based on a comparison of the sensor data and the triggering criteria, to generate a score for each of the relevant microsites.

In some example implementations, ranking component 4030 may modify the score, of a microsite, based on one or more factors. For example, ranking component 4030 may modify the score, of a microsite, based on a popularity score of the microsite. In some implementations, the popularity score of a microsite may be generated based on user behavior data associated with the microsite, such as how many users expressed disinterest in the microsite by, for example, swiping away from the microsite or providing a negative rating when the microsite was presented to a user device 3810, and/or how many users expressed interest in the microsite by, for example, providing a positive rating when the microsite was presented to a user device 3810, requesting additional information regarding the microsite, or purchasing a service associated with the microsite. In some implementations, the popularity score of a microsite may be generated using one or more factors instead of, or in addition to, the user behavior data, such as a quantity of times that the microsite has been presented to user devices 3810, an age of the microsite, a prior ranking or score of the microsite, or the like.

Additionally, or alternatively, ranking component 4030 may modify the score, of a microsite, based on a personalization score of the microsite. In some implementations, the personalization score of a microsite may be generated based on the user profile data, such as user activity data, associated with a user of a particular user device 3810, with regard to the microsite. The user activity data may include, for example, information relating to whether the user has expressed disinterest in the microsite by, for example, swiping away from the microsite or providing a negative rating when the microsite was presented to the particular user device 3810, and/or whether the user expressed interest in the microsite by, for example, providing a positive rating when the microsite was presented to the particular user device 3810, requesting additional information regarding the microsite, purchasing a service associated with the microsite, bookmarking the microsite, and/or following a recommendation provided by the microsite—e.g., a recommendation to visit a particular restaurant, see a particular movie, ride a particular bus, or the like. In some implementations, the personalization score of a microsite may be generated using one or more factors instead of, or in addition to, the user activity data, such as whether the user has recommended the microsite to one of the user's social contacts.

Additionally, or alternatively, ranking component 4030 may modify the score, of a microsite, based on a social score of the microsite. In some implementations, the social score of a microsite may be generated based on social contact activity data, associated with social contacts—e.g., friends—of the user of a particular user device 3810, with regard to the microsite. The user's social contacts may be identified based on the user's communications, the user's address book, and/or the user's account on one or more social networks. Examples of social contact activity data, associated with a microsite, include whether the user's social contacts have expressed disinterest in the microsite by, for example, swiping away from the microsite or providing a negative rating when the microsite was presented to the social contacts' user devices 3810, and/or whether the user's social contacts expressed interest in the microsite by, for example, providing a positive rating when the microsite was presented to the social contacts' user devices 3810, requesting additional information regarding the microsite, purchasing a service associated with the microsite, bookmarking the microsite, and/or following a recommendation provided by the microsite—e.g., a recommendation to visit a particular restaurant, see a particular movie, ride a particular bus, or the like. In some implementations, the social score of a microsite may be generated using one or more factors instead of, or in addition to, the social contact activity data, such as whether the social contacts have recommended the microsite to others.

In some implementations, ranking component 4030 may generate a total score for a microsite based on a combination of the score and the popularity score, the personalization score, and/or the social score. In some implementations, ranking component 4030 may generate a total score for a microsite based on a combination of the score, the popularity score, the personalization score, and the social score. In some implementations, ranking component 4030 may generate a total score for a microsite based on a weighted combination of the score, the popularity score, the personalization score, and the social score. For example, ranking component 4030 may assign a weight value to the score, the popularity score, the personalization score, and/or the social score. The weight values may differ—in other words, the amount that each of the score, the popularity score, the personalization score, and the social score contributes to the total score may vary. Ranking component 4030 may combine the weighted score, the weighted popularity score, the weighted personalization score, and/or the weighted social score to generate the total score.

Ranking component 4030 may rank the relevant microsites, based on their scores, to form a ranked list of microsites. Ranking component 4030 may select a set of microsites from the ranked list. For example, ranking component 4030 may select the top scoring X microsites (X≥1). In some implementations, ranking component 4030 may select only the top scoring microsite (X=1). In some implementations, ranking component 4030 may select the top scoring five (5) microsites (X=5).

In some implementations, the user profile data may indicate that one or more of the relevant microsites, in the ranked list, have been purchased by user device 3810. In these implementations, ranking component 4030 may adjust the ranking of the one or more relevant microsites, in the ranked list, by, for example, moving those purchased microsites to the top of the ranked list. Thus, those relevant microsites, which have been purchased by user device 3810, may be ranked more highly than those relevant microsites that have not been purchased by user device 3810.

In some implementations, when ranking component 4030 determines that the user profile data indicates that one or more of microsites, in set of microsites that have been identified as relevant to received sensor data, have been purchased by user device 3810, ranking component 4030 may generate scores for only the one or more purchased microsites. In addition, ranking component 4030 may form a list that includes only those microsites that have been purchased. In these situations, ranking component 4030 may form a ranked list by sorting the microsites, in the formed list, based on their scores and/or other factors.

In any of the above situations, ranking component 4030 may provide information, regarding the ranked list of microsites, to user device 3810. In some implementations, the information may include a network address and/or a list of sensors for each microsite in the set of microsites. In some implementations, the network addresses of the microsites may be provided in a ranked list based on the scores of the microsites. In some implementations, the network addresses of the microsites may be provided along with the scores of the microsites.

Although FIG. 40 shows example functional components of ranking system 3820, in some implementations, ranking system 3820 may include additional functional components, different functional components, or fewer functional components than those depicted in FIG. 40. Additionally, or alternatively, one or more functional components of ranking system 3820 may perform one or more tasks described as being performed by one or more other functional components of ranking system 3820.

Figure 41:
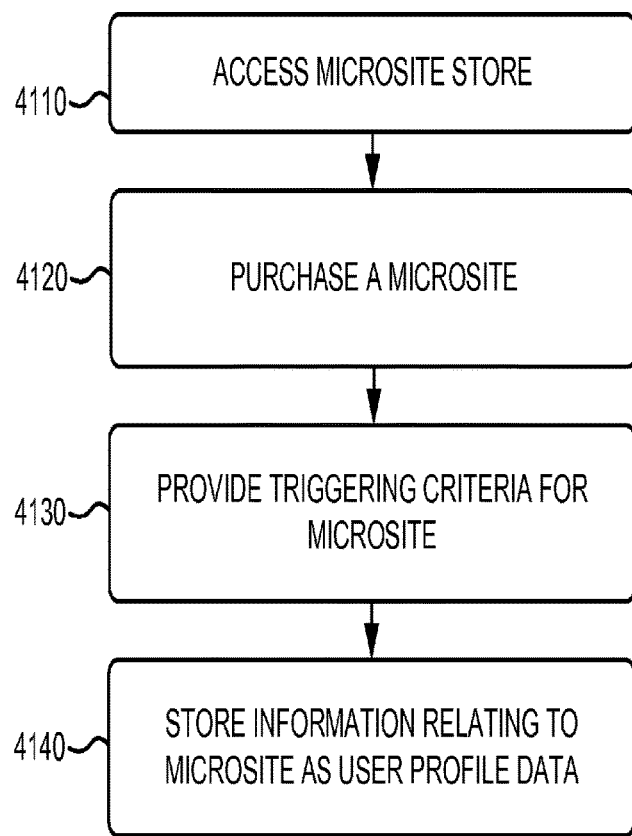
FIG. 41 is a flowchart of an example process relating to purchasing a microsite.

FIG. 41 is a flowchart of an example process 4100 relating to purchasing a microsite. In some implementations, process 4100 may be performed by user device 3810. In some implementations, one or more blocks of process 4100 may be performed by one or more devices instead of, or possibly in conjunction with, user device 3810.

Process 4100 may include accessing a microsite store (block 4110). For example, application component 3910, of user device 3810, may access a microsite store, which provides information regarding microsites that may be purchased. In some implementations, a user may cause application component 3910 to access the microsite store via, for example, a browser or in another manner.

Process 4100 may include purchasing a microsite (block 4120). For example, the user, of user device 3810, may review the microsites associated with the microsite store. The user may, for example, review descriptions of the microsites, ratings of the microsites, prices of the microsites, etc. Upon identifying a microsite of interest, the user may cause application component 3910 to provide monetary payment for the microsite. In some implementations, application component 3910 may provide the monetary payment to ranking system 3820. In some implementations, application component 3910 may provide the monetary payment to another system or device.

Process 4100 may include providing triggering criteria for the microsite (block 4130). For example, application component 3910 may cause a list of triggering criteria, for the purchased microsite, to be provided to the user. As indicated above, the triggering criteria dictate when the purchased microsite will be provided to user device 3810 for display. In some implementations, the list of triggering criteria may include triggering criteria that have been provided by a designer of the microsite. In some implementations, the user, of user device 3810, may choose to accept the list of triggering criteria or modify one or more of the triggering criteria in the list. For example, assume that the purchased microsite is associated with the following triggering criteria: that user device 3810 is located in a particular geographic area, that the time is not between 11 PM and 7 AM, and that user device 3810 is currently detecting music being played. The user may modify the triggering criteria by, for example, removing one or more of the triggering criteria, adding one or more new triggering criteria, and/or editing one or more of the triggering criteria. With respect to the example given above, assume that the user is regularly awake until midnight. Thus, the user may decide to modify the time-related triggering criterion to change the time range from 11 PM to 7 AM to 12 AM to 7 AM.

Process 4100 may include storing information relating to the purchased microsite in a user profile (block 4140). For example, upon completion of the purchase, application component 3910 may store information, in user profile component 3920, identifying the purchased microsite. In some implementations, the information identifying the purchased microsite may include an address—e.g., a URL or URI—of the purchased microsite, along with a data and/or time of purchase. Additionally, in those situations where the user has elected to modify the triggering criteria associated with the purchased microsite, application component 3910 may store, in user profile component 3920, the modified triggering criteria.

While FIG. 41 shows process 4100 as including a particular quantity and arrangement of blocks, in some implementations, process 4100 may include fewer blocks, additional blocks, or a different arrangement of blocks. Additionally, or alternatively, some of the blocks may be performed in parallel.

Figure 42:
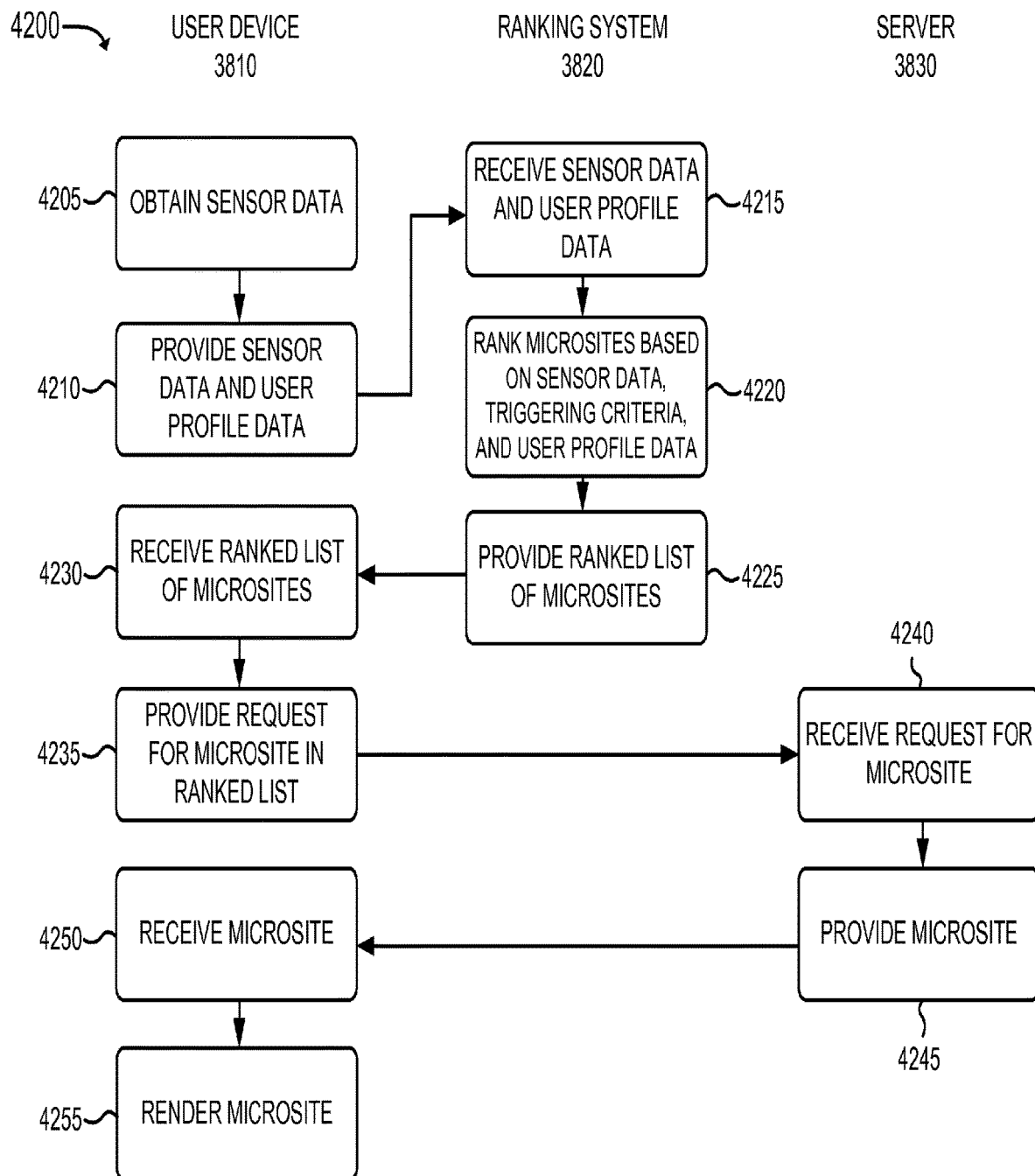
FIG. 42, FIG. 43A, and FIG. 43B are flowcharts of example processes for providing a microsite to a user device.

FIG. 42 is a flowchart of an example process 4200 for providing content of a microsite. While FIG. 42 shows process 4200 as including a particular sequence of interactions among user device 3810, ranking system 3820, and server 3830, in some implementations, some of these interactions may occur in another order or in parallel. Moreover, some of the blocks of process 4200 may be performed by a different device or group of devices, including or excluding user device 3810, ranking system 3820, and server 3830.

Process 4200 may include obtaining sensor data (block 4205). For example, application component 3910, of user device 3810, may obtain sensor data from sensors component 3930 associated with user device 3810. Examples of sensor data were provided above with respect to FIG. 39.

Process 4200 may include providing the sensor data and user profile data (block 4210). For example, application component 3910 may provide the sensor data to ranking system 3820. Application component 3910 may also provide user profile data to ranking system 3820. Examples of user profile data were provided above with respect to FIG. 39. As indicated above, the user profile data may include, in those instances where a user, of user device 3810, purchased a microsite, information relating to the purchased microsite. For example, the information may include information identifying the microsite, such as a network address, information identifying a date on which the microsite was purchased, information identifying a time at which the microsite was purchased, ranking and/or rating information for the microsite, etc. In addition, in those situations where the user modified the triggering criteria for a purchased microsite, the profile data may include information identifying the modified triggering criteria.

Application component 3910 may automatically—e.g., without requiring an instruction from a user of user device 3810—provide the sensor data and the user profile data to ranking system 3820. The user, of user device 3810, may stop, at any time, the sending of sensor data and/or user profile data to ranking system 3820.

Process 4200 may further include receiving the sensor data and the user profile data (block 4215). For example, ranking component 4030, of ranking system 3820, may receive the sensor data and the user profile data from user device 3810.

Process 4200 may include ranking microsites, identified using an index, based on the sensor data, the triggering criteria associated with the microsites, and the user profile data (block 4220). For example, ranking component 4030 may use the sensor data and/or the user profile data, to identify relevant microsites. For example, ranking component 4030 may compare the sensor data to the triggering criteria for a microsite, identified by the index or the user profile data, and generate a score for the microsite based on a result of the comparison. As described above, in some implementations, ranking component 4030 may modify the score, for a microsite, based on one or more factors to generate a total score for the microsite. Ranking component 4030 may use the score, or total score, to form a ranked list of microsites. In some implementations, ranking component 4030 may modify the ranked list of microsites in those situations where a microsite, in the ranked list, was purchased by a user of user device 3810. In these situations, ranking component 4030 may modify the ranked list by moving information identifying the purchased microsite to the top of the ranked list. Further details regarding block 4220 are provided below with respect to FIGS. 43A and 43B.

Process 4200 may include providing information regarding the ranked list of microsites (block 4225). For example, ranking component 4030 may provide information regarding the ranked list of microsites to user device 3810. As explained above, in some implementations, the information may include, for each microsite in the ranked list of microsites, a network address for the microsite and a list of sensors relevant to the microsite.

Process 4200 may include receiving the information regarding the ranked list of microsites (block 4230). For example, application component 3910, of user device 210, may receive the information regarding the ranked list of microsites from ranking component 4030.

Process 4200 may include providing a request for a microsite in the ranked list (block 4235). For example, based on receiving the information regarding the ranked list of microsites, display component 3940, of user device 3810, may obtain sensor data associated with the list of sensors that have been identified as relevant to the microsites in the ranked list. For each relevant microsite, display component 3940 may generate a request that includes the network address for the relevant microsite and the sensor data relevant to the relevant microsite. Display component 3940 may provide the request to one or more servers 3830. Whether display component 3940 provides the requests to more than one server 3830 depends on which server(s) 3830 is/are hosting the relevant microsites. In other words, all of the relevant microsites may be hosted by a single server 3830, all of the relevant microsites may be hosted by separate, different servers 3830, or something in between these two extremes.

Process 4200 may include receiving a request for a microsite (block 4240). For example, server 3830 may receive a request, for a microsite, from user device 3810 and obtain content of the relevant microsite. In some implementations, the content of a relevant microsite may be dynamic in the sense that the content of the relevant microsite may be based on the sensor data received from user device 3810.

Process 4200 may include providing the microsite (block 4245). For example, server 3830 may provide the content of the relevant microsite to user device 3810.

Process 4200 may include receiving the content of the microsite (block 4250). For example, display component 3940, of user device 3810, may receive the content of the microsite from server 3830.

Process 4200 may include rendering the content of the microsite (block 4255). For example, display component 3940 may present the content of the microsite on a display associated with user device 3810. When content is received for multiple microsites, display component 3940 may push the content, for the relevant microsites, as a sliding display of content. In some implementations, content for one of the relevant microsites may be presented on the display at a time. A user, of user device 3810, may interact with the content, using a finger or the like, to express the user's interest or disinterest in the content or to see the content for another one of the relevant microsites.

While FIG. 42 shows process 4200 as including a particular quantity and arrangement of blocks, in some implementations, process 4200 may include fewer blocks, additional blocks, or a different arrangement of blocks. Additionally, or alternatively, some of the blocks may be performed in parallel.

Figure 43A:
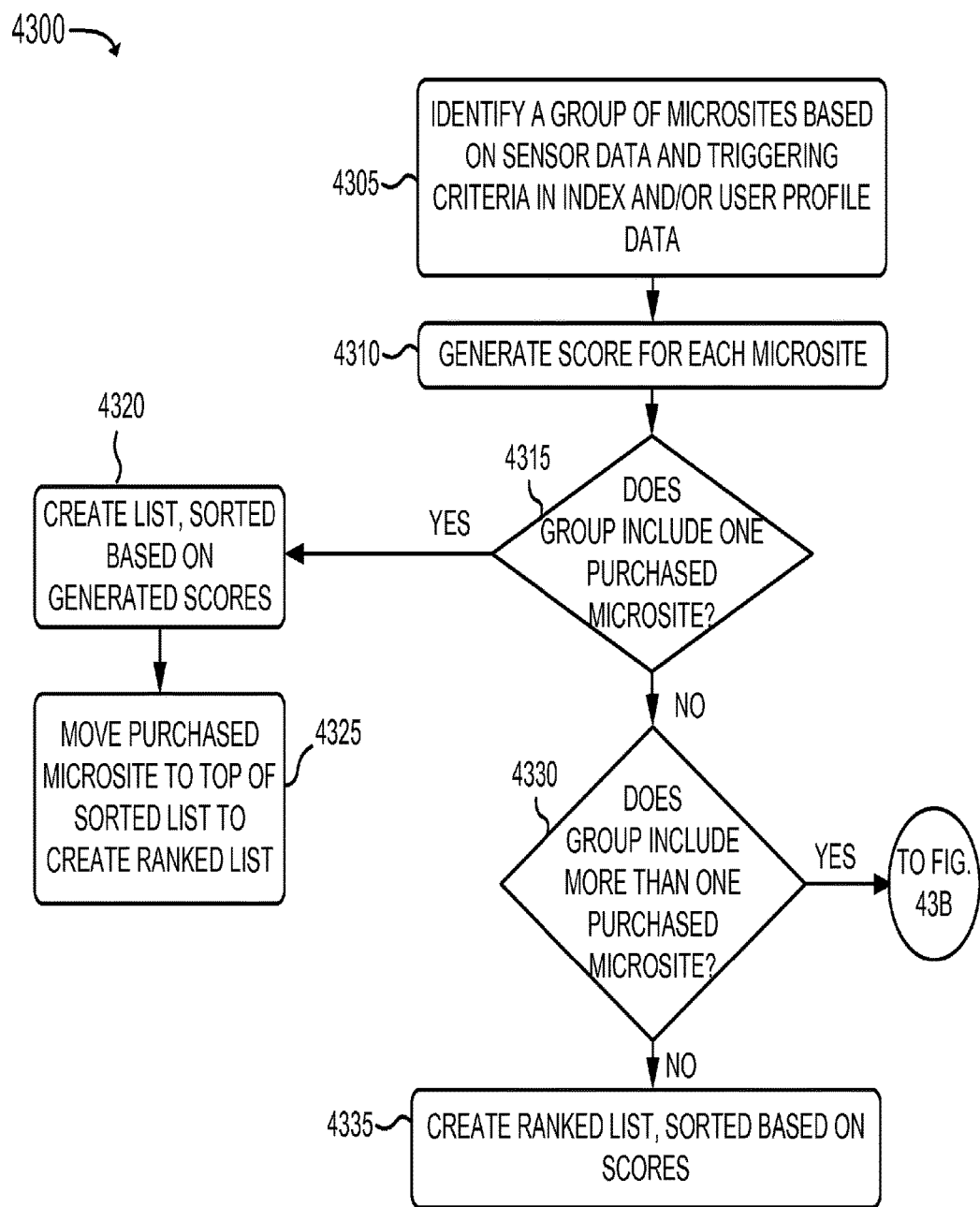
Figure 43B:
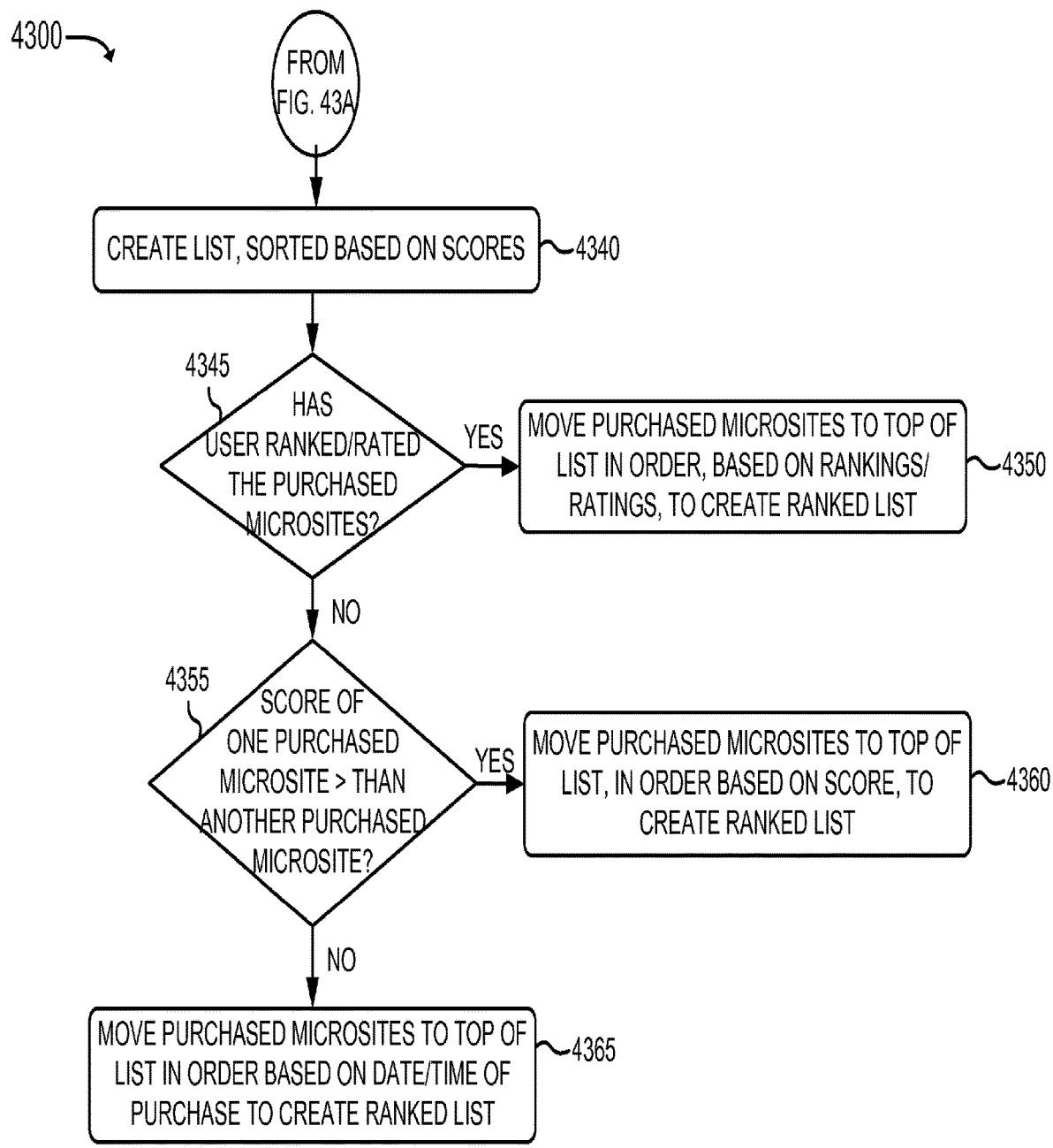

FIGS. 43A and 43B is a flowchart of an example process 4300 that may correspond to block 4220 of FIG. 42. In some implementations, process 4300 may be performed by ranking system 3820. In some implementations, one or more blocks of process 4300 may be performed by one or more devices instead of, or possibly in conjunction with, ranking system 3820.

Process 4300 may include identifying a group of relevant microsites based on the sensor data and the triggering criteria (block 4305, FIG. 43A). For example, ranking component 4030, of ranking system 3820, may identify microsites that are relevant to the sensor data by comparing the sensor data to the triggering criteria for the microsites. As indicated above, the triggering criteria, for a particular microsite, may be included in the index and/or identified in the user profile data—e.g., in those situations where the user, of user device 3810, has modified the triggering criteria. In some implementations, ranking component 4030 may identify microsites that are relevant based on information in the user profile data and by comparing the sensor data to the triggering criteria for the microsites. Other ways of identifying relevant microsites may alternatively be used.

Process 4300 may include generating a score for each microsite in the group of microsites (block 4310). For example, ranking component 4030 may generate scores for the microsites, in the group of microsites, based on one or more factors. For example, ranking component 4030 may generate a score, for a microsite, based on comparing the sensor data to the triggering criteria associated with the microsite.

In some implementations, ranking component 4030 may generate the scores for the microsites based on the quantity of triggering criteria in the triggering criteria. For example, if the triggering criteria for a first relevant microsite include 5 different triggering criteria and if the triggering criteria for a second relevant microsite include 2 different triggering criteria, ranking component 4030 may generate a higher score for the first relevant microsite than the second relevant microsite.

In some implementations, ranking component 4030 may generate scores for the microsites based on a degree to which the sensor data matches the triggering criteria. For example, assume that the sensor data indicates that the current time is 8:55 PM. Also, assume that a first set of triggering criteria, for a first relevant microsite, includes a time range of 8 PM to 1 AM, and a second set of triggering criteria, for a second relevant microsite, includes a time range of 8 PM to 9 PM. Since the current time, as indicated by the sensor data, is closer to the beginning of the time range for the first set of triggering criteria and closer to the end of the time range for the second set of triggering criteria, ranking component 4030 may give a higher score to the first relevant microsite than the second relevant microsite.

In some implementations, ranking component 4030 may generate an initial score for each microsite, in the group of microsites, based on the sensor data and/or the user profile data. Ranking component 4030 may modify the initial score, of a microsite, based on one or more factors to obtain the score for the microsite. The one or more factors may include, for example, a popularity score of the microsite, a personalization score of the microsite, a social score of the microsite, and/or another factor. The popularity score, the personalization score, and the social score were discussed above with respect to FIG. 40. Other ways of obtaining a score for a microsite may alternatively be used.

Process 4300 may include determining whether the group of microsites includes a single microsite that has been purchased (block 4315). For example, ranking component 4030 may parse the user profile data, provided by user device 3810, to identify microsites that have been purchased. Ranking component 4030 may compare the identified microsites to the microsites in the group of relevant microsites to determine whether the group of microsites includes a single purchased microsite.

When the group of microsites includes single purchased microsite (block 4315—YES), process 4300 may include creating a list of microsites that are sorted based on the generated scores (block 4320). For example, ranking component 4030 may create a list that includes information identifying the microsites. Ranking component 4030 may sort the list in descending order, such that information identifying the microsite with the highest generated score appears at the top of the list and information identifying the microsite with the lowest generated score appears at the bottom of the list.

Process 4300 may include moving the single purchased microsite to the top of the sorted list to create a ranked list of microsites (block 4325). For example, ranking component 4030 may create a ranked list of microsites by moving the information for the single purchased microsite to the top of the sorted list. In this way, ranking component 4030 ensures that the single purchased microsite is rendered, by user device 3810, before non-purchased microsites in the ranked list.

When the group of microsites does not include a single purchased microsite (block 4315—NO), process 4300 may include determining whether the group of microsites includes more than one purchased microsite (block 4330). For example, ranking component 4030 may parse the user profile data, provided by user device 3810, to identify microsites that have been purchased. Ranking component 4030 may compare the identified microsites to the microsites in the group of relevant microsites to determine whether the group of microsites includes multiple purchased microsites.

When the group of microsites does not include more than one purchased microsite (block 4330— NO), process 4300 may include creating a ranked list of microsites by sorting the microsites, in the group of microsites, based on the generated scores (block 4335). For example, ranking component 4030 may create a list that includes information identifying the microsites. Ranking component 4030 may generate a ranked list of microsites by sorting the list in descending order, such that information identifying the microsite with the highest generated score appears at the top of the list and information identifying the microsite with the lowest generated score appears at the bottom of the list. In this way, ranking component 4030 ensures that the microsite, with the highest generated score, is rendered, by user device 3810, before any other microsite in the ranked list.

When the group of microsites includes more than one purchased microsite (block 4330— YES), process 4300 may include creating a list of microsites that are sorted based on the generated scores (block 4340, FIG. 43B). For example, ranking component 4030 may create a list that includes information identifying the microsites. Ranking component 4030 may sort the list in descending order, such that information identifying the microsite with the highest generated score appears at the top of the list and information identifying the microsite with the lowest generated score appears at the bottom of the list.

Process 4300 may include determining whether the purchased microsites have been ranked or rated by the user (block 4345). For example, ranking component 4030 may parse the user profile data, provided by user device 3810, to determine whether the user has ranked and/or rated the microsites that have been purchased. For example, the user profile data may include information giving a ranking value to the purchased microsites, where the ranking values are to be used if more than one of the purchased microsites are identified based on a given set of sensor data. As one example, assume that the user has purchased, via user device 3810, three microsites, named MICROSITE A, MICROSITE B, and MICROSITE C. In addition, assume that the user has specified, in the user profile data, that if more than one of these purchased microsites are identified based on sensor data, then the purchased microsites are to be ranked in the following order: MICROSITE C, MICROSITE B, and MICROSITE A. Thus, the user profile data, provided by user device 3810, may include this ranking information.

Similarly, the user profile data may include rating information that indicates rating values for the purchased microsites. The rating values may provide an indication of how much the user likes or dislikes the purchased microsites. As one example, assume that the user has purchased, via user device 3810, three microsites, named MICROSITE A, MICROSITE B, and MICROSITE C. In addition, assume that the user has given MICROSITE A a rating of 4, MICROSITE B a rating of 1, and MICROSITE C a rating of 3. The user profile data, provided by user device 3810, may include this rating information.

When the purchased microsites have been ranked or rated by the user (block 4345—YES), process 4300 may include moving the purchased microsites to the top of the sorted list, in an order based on the rankings/ratings, to create a ranked list of microsites (block 4350). For example, ranking component 4030 may create a ranked list of microsites by moving the information for the purchased microsites to the top of the sorted list. Ranking component 4030 may sort the purchased microsites, at the top of the sorted list, based on the rankings/ratings in the user profile data. For example, if the user profile data includes ranking information, ranking component 4030 may rank the purchased microsites in the order specified by the ranking information. Thus, in the example given above, if the sorted list of microsites includes MICROSITE A and MICROSITE B, ranking component 4030 may move information identifying MICROSITE B to the top of the list, followed by information identifying MICROSITE A.

If the user profile data includes rating information, ranking component 4030 may rank the purchased microsites in the order specified by the rating information. Thus, in the example given above, if the sorted list of microsites includes MICROSITE A, MICROSITE B, and MICROSITE C, ranking component 4030 may move information identifying MICROSITE A to the top of the list, followed by information identifying MICROSITE C, and followed by information identifying MICROSITE B.

If the user profile data includes ranking information and rating information, ranking component 4030 may rank the purchased microsites in an order based on the ranking information and the rating information. In some implementations, ranking component 4030 may consider the ranking information and may ignore the rating information in determining how to rank the purchased microsites in the sorted list. In some implementations, ranking component 4030 may consider the rating information and may ignore the ranking information in determining how to rank the purchased microsites in the sorted list. In some implementations, ranking component 4030 may assign weights to the rating information, where those weights may affect the ranking information for the purchased microsites. Other manners of using the ranking information and the rating information to determine an order of the purchased microsites, in the sorted list, may alternatively be used.

In this way, ranking component 4030 may ensure that the purchased microsites are rendered, by user device 3810, before non-purchased microsites in the ranked list.

When the microsites have not been ranked or rated by the user (block 4345— NO), process 4300 may include determining whether the generated score of one purchased microsite is larger than the generated score for another purchased microsite (block 4355). For example, ranking component 4030 may compare the generated scores of the purchased microsites to determine whether the score of one purchased microsite is larger than the score of another purchased microsite.

When the generated score of one purchased microsite is larger than the generated score for another purchased microsite (block 4355—YES), process 4300 may include moving the purchased microsites to the top of the sorted list, in an order based on the generated scores, to create a ranked list of microsites (block 4360). For example, ranking component 4030 may create a ranked list of microsites by moving the information for the purchased microsites to the top of the sorted list. Ranking component 4030 may sort the purchased microsites, at the top of the sorted list, based on the generated scores. For example, assuming ranking component 4030 generates a score of 0.9 for MICROSITE A and a score of 0.95 for MICRO SITE B, ranking component 4030 may move information identifying MICROSITE B to the top of the list, followed by information identifying MICROSITE A.

In this way, ranking component 4030 may ensure that the purchased microsites are rendered, by user device 3810, before non-purchased microsites in the ranked list.

When the generated score of one purchased microsite is not larger than the generated score for another purchased microsite (block 4355—NO), process 4300 may include moving the purchased microsites to the top of the sorted list, in an order based on the dates/times that the microsites were purchased, to create a ranked list of microsites (block 4365). For example, ranking component 4030 may create a ranked list of microsites by moving the information for the purchased microsites to the top of the sorted list. Ranking component 4030 may sort the purchased microsites, at the top of the sorted list, based on the dates/times that the microsites were purchased. In some implementations, ranking component 4030 may sort the purchased microsites in a descending date/time order. For example, assume that MICROSITE A was purchased on Jul. 12, 2011 and that MICROSITE B was purchased on Nov. 29, 2010. In this situation, ranking component 4030 may move information identifying MICROSITE A to the top of the list, followed by information identifying MICROSITE B. Other ways for sorting the purchased microsites based on the dates/times of purchase may alternatively be used.

In this way, ranking component 4030 may ensure that the purchased microsites are rendered, by user device 3810, before non-purchased microsites in the ranked list.

While FIG. 43 shows process 4300 as including a particular quantity and arrangement of blocks, in some implementations, process 4300 may include fewer blocks, additional blocks, or a different arrangement of blocks. Additionally, or alternatively, some of the blocks may be performed in parallel.

Figure 44A:
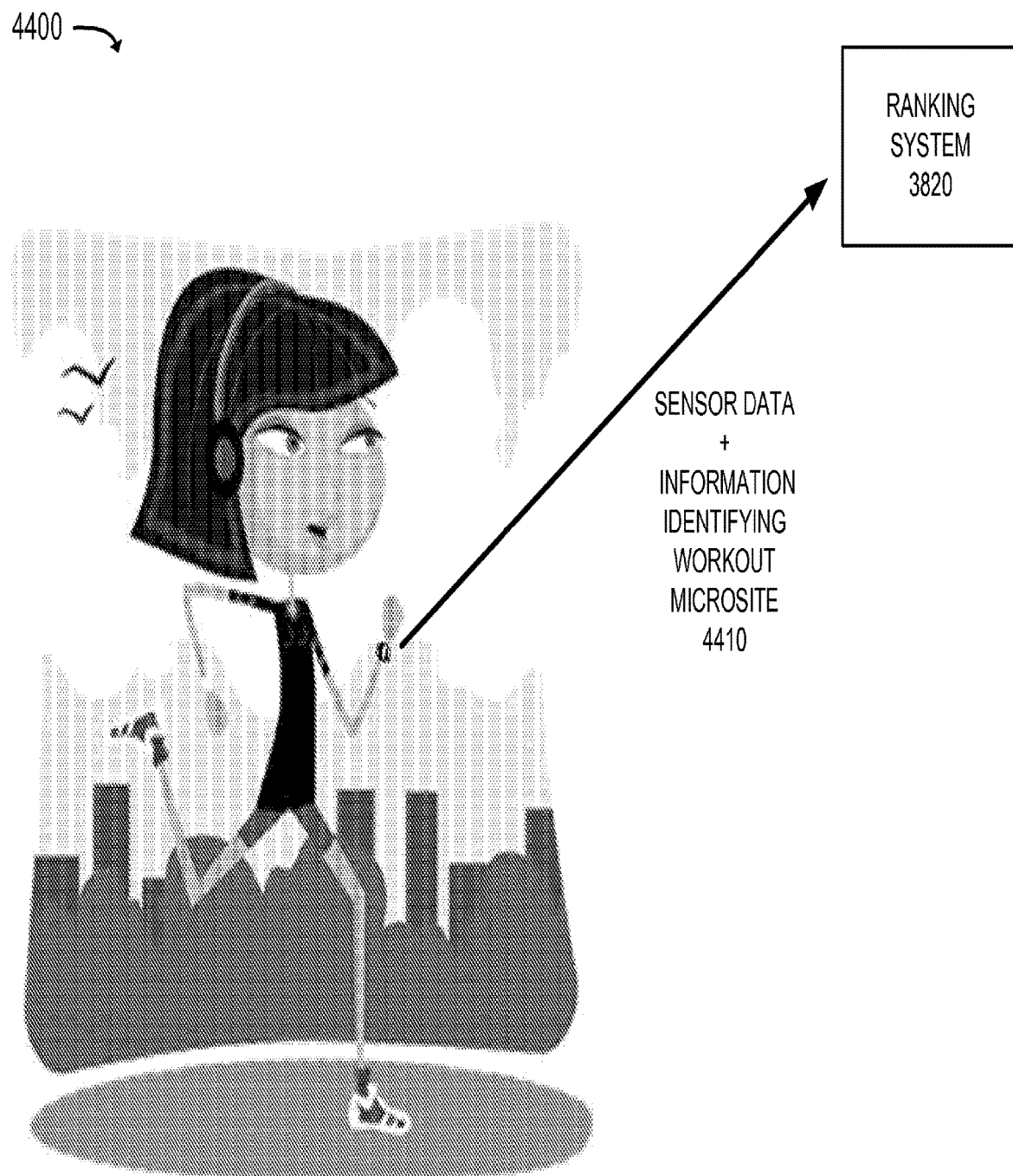
FIG. 44A, FIG. 44B, FIG. 44C, and FIG. 44D are diagrams of an example of the process described in FIGS. 42-43B.

FIGS. 44A-44D are an example 4400 of the process described above with respect to FIGS. 42-43B. With reference to FIG. 44A, assume a user, named Mary, has purchased a workout microsite that provides a user, who has gone out for a run, with information regarding the distance that the user has run, the speed at which the user is running, and the number of calories that the user has burned. As a result of the purchase, a user profile, associated with Mary or a user device (shown as a watch in FIG. 44A) that is associated with Mary, may store information identifying the workout microsite.

Further, assume, as shown in FIG. 44A, that Mary's watch periodically sends, as depicted by reference number 4410, sensor data and user profile data to ranking system 3820. In addition, assume that the user profile data includes, among other things, information identifying the workout microsite.

Figure 44B:
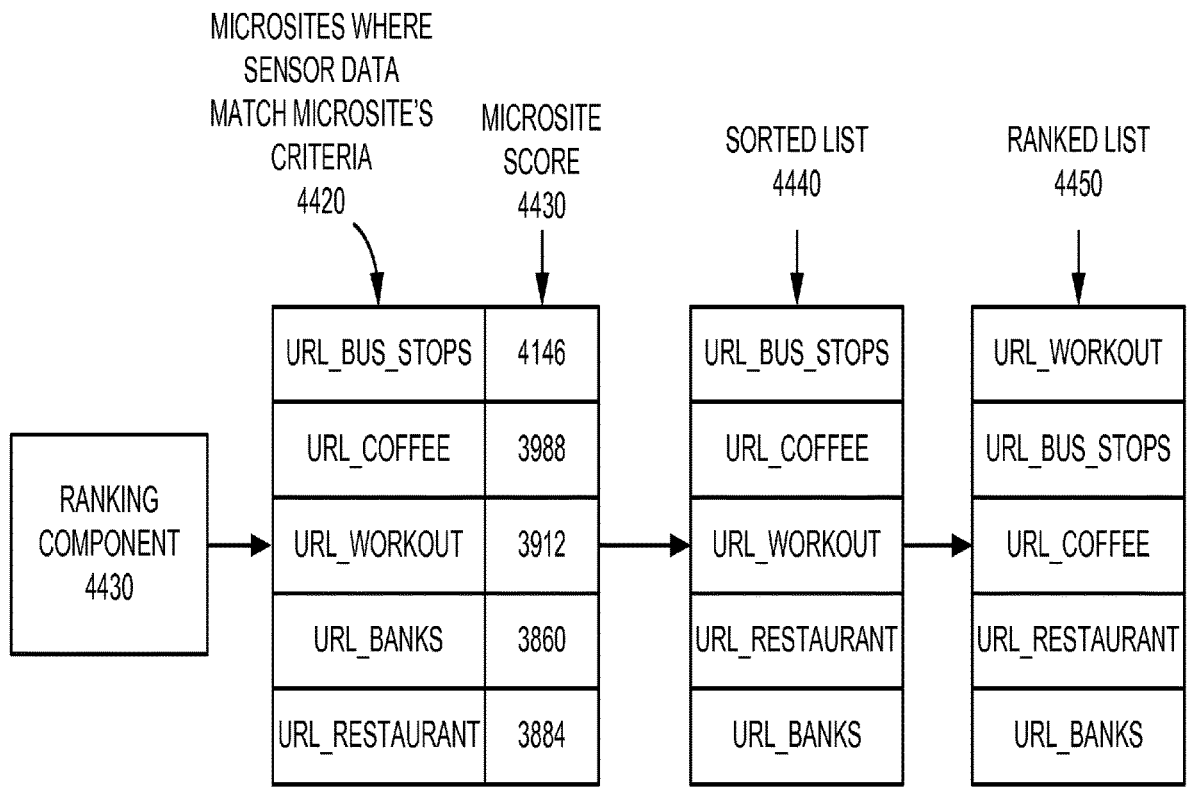

With reference to FIG. 44B, ranking component 4030, of ranking system 3820, may receive sensor data and user profile data 4410. Ranking component 4030 may identify a group 4420 of microsites that are relevant to the sensor data and/or the user profile data and generate a score 4430 for each microsite in group 4420. Ranking component 4030 may sort the microsites, in group 4420, based on scores 4430 to form a sorted list 4440 of microsites. As shown in FIG. 44B, sorted list 4440 includes a bus stops microsite as the top ranking microsite, followed by a coffee microsite, the workout microsite, a restaurant microsite, and a banks microsite. Since the workout microsite was purchased by Mary, ranking component 4030 may modify sorted list 4440, by moving the workout microsite to the top of the list, to create a ranked list 4450. A shown, ranked list 4450 includes the workout microsite as the top ranking microsite, followed by the bus stops microsite, the coffee microsite, the restaurant microsite, and the banks microsite.

Figure 44C:
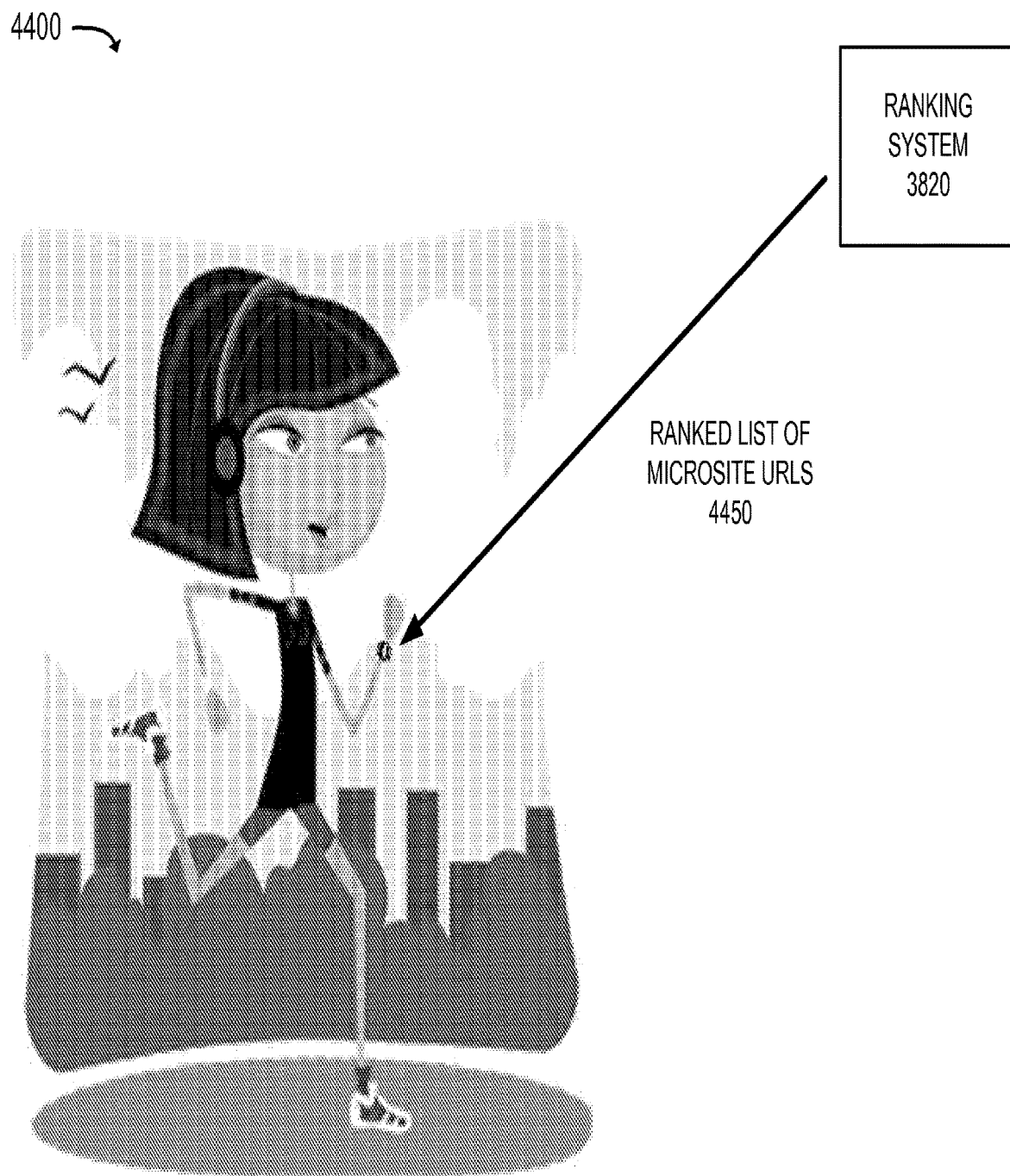

With reference to FIG. 44C, ranking system 3820 may provide ranked list 4450 to Mary's watch. In addition to ranked list 4450, ranking system 3820 may provide other information, as discussed above, such as a list of sensors for each microsite identified in ranked list 4450.

Figure 44D:
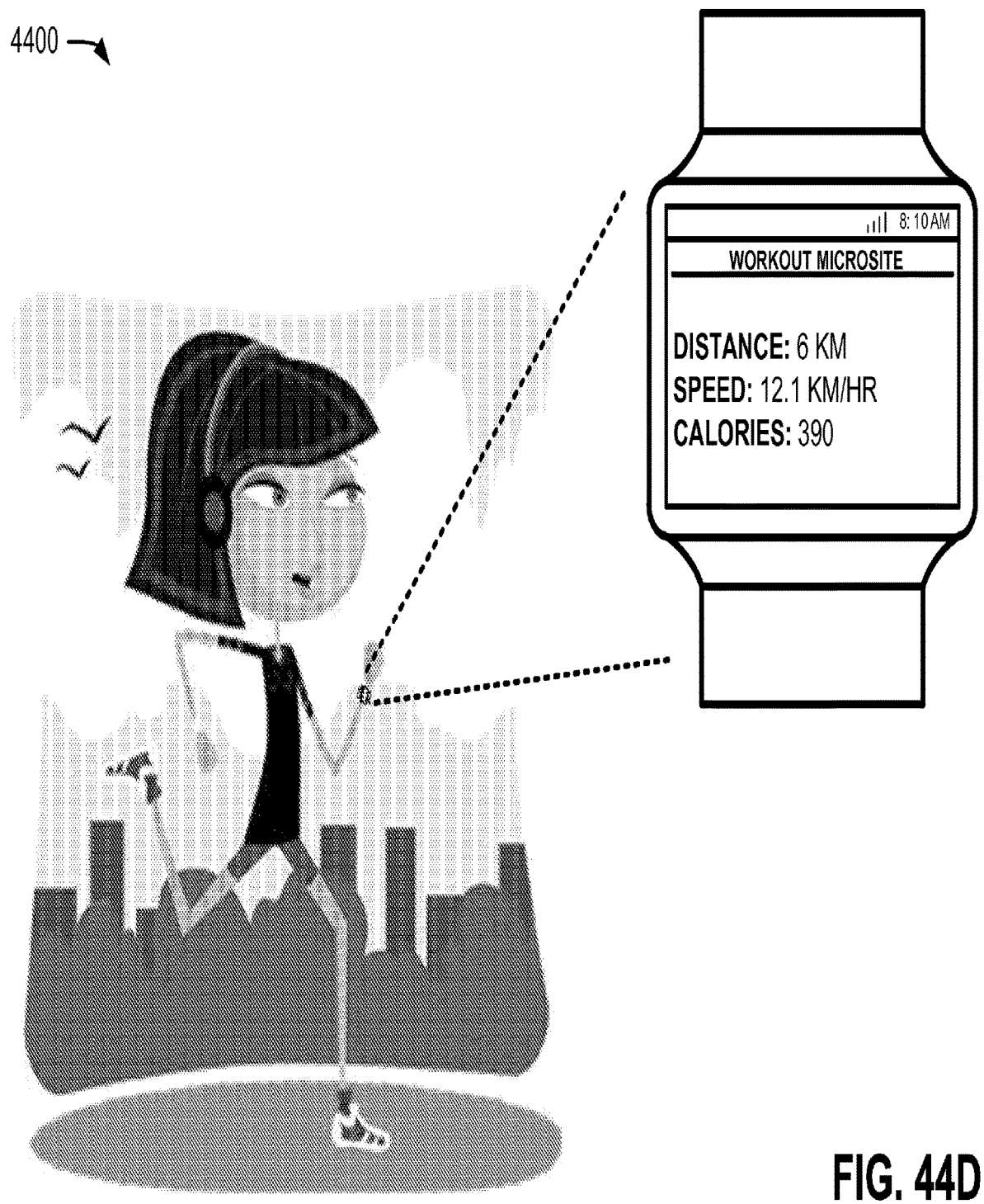

With reference to FIG. 44D, Mary's watch may receive ranked list 4450 and send a request for one or more of the microsites in ranked list 4450. Since the workout microsite is the highest ranking microsite in ranked list 4450, Mary's watch may cause the workout microsite to be rendered for display prior to the other microsites in ranked list 4450. Thus, since Mary paid for the workout microsite, the workout microsite may be given priority over other microsites, including higher scoring microsites.

A system and method, described herein, may cause a purchased microsite to be presented (e.g., pushed) to a user device before other microsites, including microsites that may be scored higher than the purchased microsite. The purchased microsite may provide information that may be useful to the user.

Example 5

Figure 45:
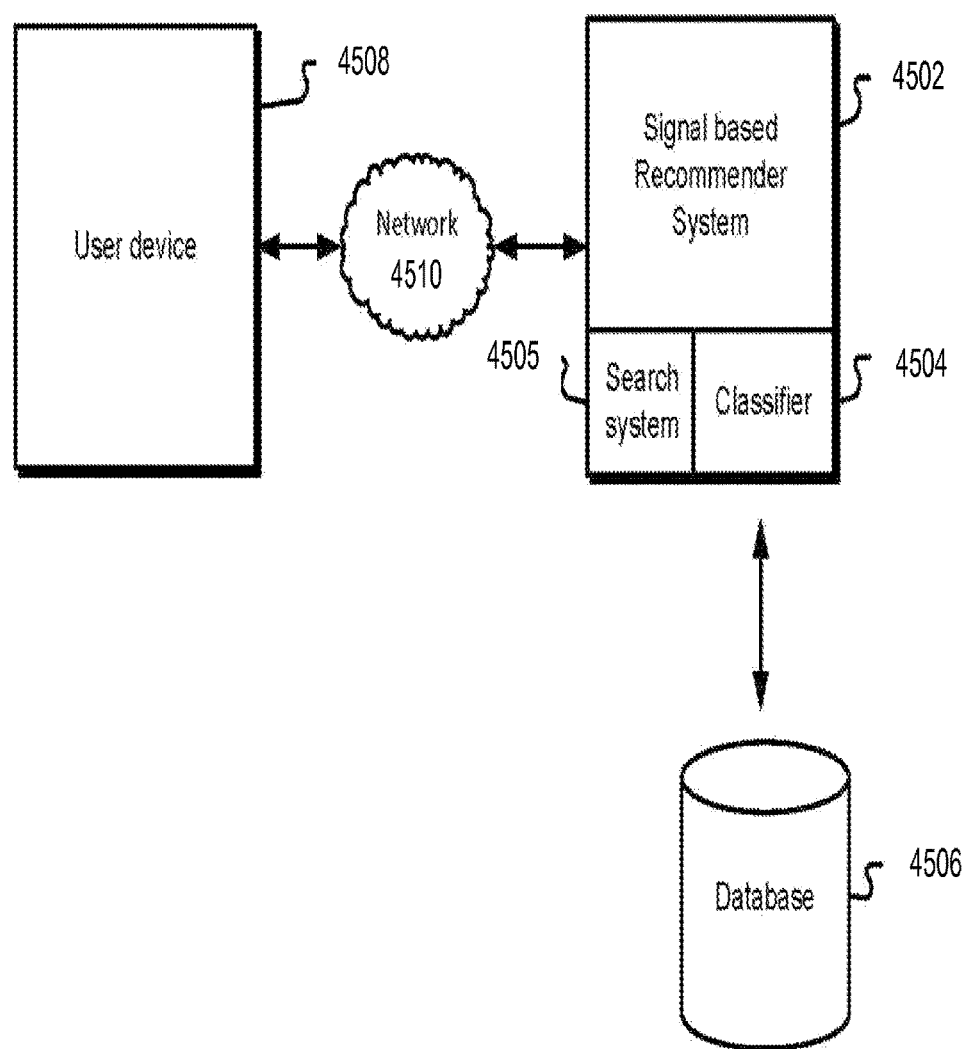
FIG. 45 is a schematic diagram of an example signal based recommender system.

FIG. 45 is a schematic diagram of an example system 4500 including a signal based recommender system 4502. In some implementations, the signal based recommender system 4502 includes data processing apparatus e.g., handheld devices, rack-mounted servers, or other computing devices. The data processing apparatus within the signal based recommender system 4502 can be in the same physical location (e.g., data center) or can be in different physical locations. The data processing apparatus and user devices communicatively coupled to the signal based recommender system 4502 can have different capabilities and computer architectures. In some implementations, the user device 4508 is a personal computer, a laptop computer, a watch, a tablet computer, or a mobile device.

The signal based recommender system 4502 can use crowd-sourced content segments to identify user intentions. The signal based recommender system 4502 can obtain crowd-sourced (e.g., sent by many users) content and other information (e.g., location) from public sites. Public sites are sites that can be accessed at least in part without requiring a login. For example, public sites contain publicly available content. One or more user devices (e.g., a user device 4508) can communicate with the signal based recommender system 4502 using a network 4510. The signal based recommender system 4502 can provide one or more search results that can predict what a user might intend to search given a location and previously obtained content segments around the user's location.

In some implementations, a classifier 4504 resides within the signal based recommender system 4502. In some other implementations, the classifier 4504 resides on a data processing apparatus separate from the signal based recommender system 4502. The classifier 4504 can classify content segments into categories. The use of categories can aid a search system in increasing relevancy of its search results. In some implementations, a search system 4505 resides within the signal based recommender system 4502. In some other implementations, the search system 4505 resides on a data processing apparatus separate from the signal based recommender system 4502. The search system 4505 can perform searches on relevant content segments to obtain a search result.

The signal based recommender system 4502 can also communicate with a database 4506. The database 4506 is an electronic file system, a distributed file system, or other network-accessible persistent storage that can store information on computer-readable storage media. In some implementations, the database 4506 is a database of intentions. The database of intentions includes data representing a general intention of users who perform mobile searches or access social media content, which can be data obtained from social networks. For example, if a user enters "gourmet restaurants" as a mobile search query, the system determines that the user intends to find information about gourmet restaurants.

Figure 46:
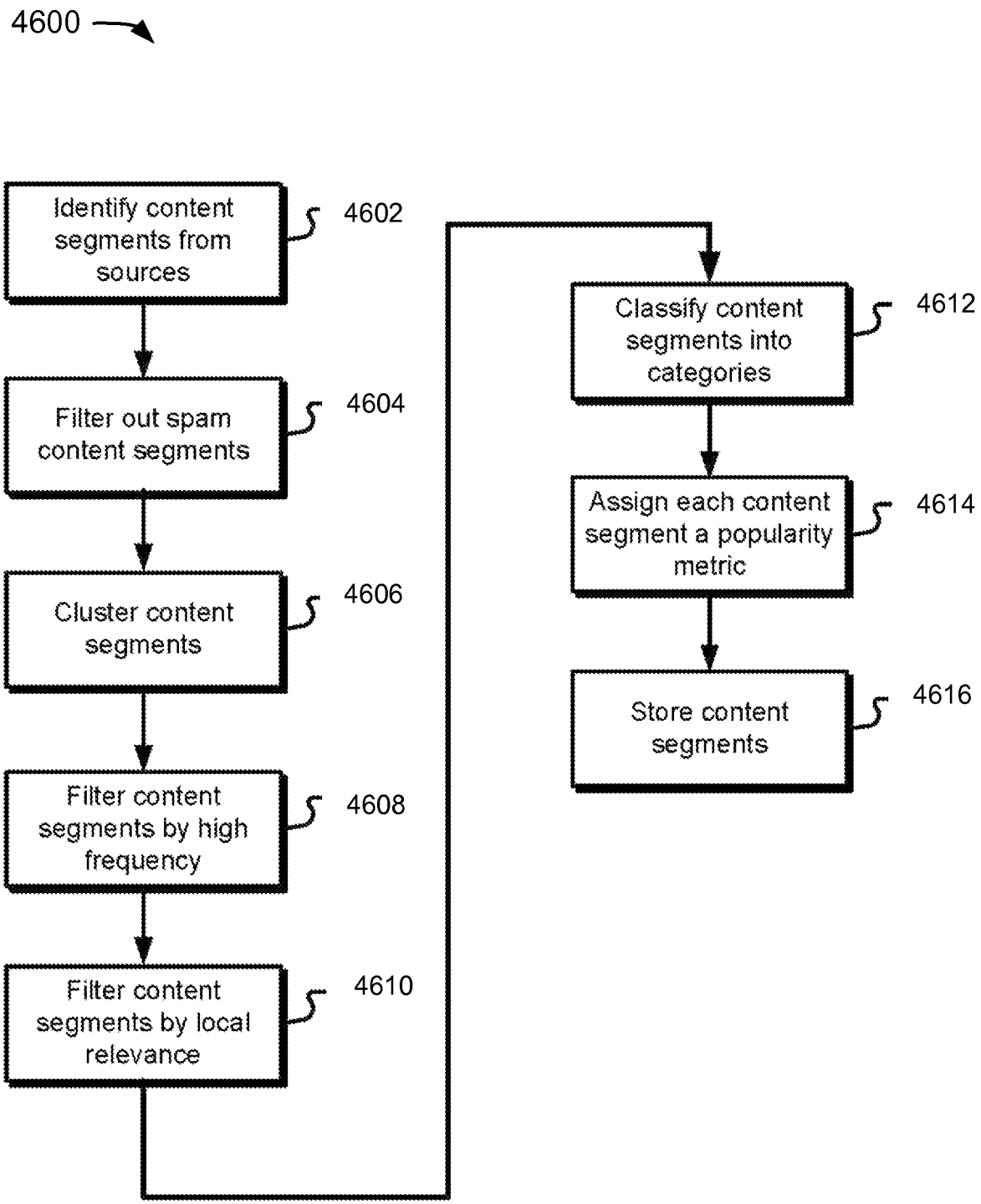
FIG. 46 is a flowchart of an example method of identifying user intentions.

FIG. 46 is a flowchart of an example method 4600 of the signal based recommender system to identify user intentions. For convenience, the method 4600 will be described with respect to a system having one or more computing devices that performs the method 4600.

The system obtains content segments from various sources 4602. The system can retrieve numerous content segments from multiple sources. In some implementations, content segments are "crowd-sourced" such that the content segments correspond to information that is entered by many users. For example, potential sources of crowd-sourced content segments include social network feeds and posts to social sites or blogs. Sources of content segments can also include mobile search queries entered by a group of users.

After receiving content segments, the system can aggregate the content segments and process them. The initial processing can include one or more of spam removal, clustering, high frequency, and local relevance. In some implementations, if a content segment is not filtered out as a result of the processing, the content segment is entered into a database of intentions.

The system can filter the content segments according to a classification algorithm trained to filter spam information 4604. Spam information can be unwanted or unsolicited information that is marketing a product or service (e.g., pornography). Spam information can also include high frequency terms that lead to high trafficked sites, e.g., a search engine destination page or a social network page. The system can filter out spam information by detecting spam-like keywords. For example, search queries associated with pornography can be filtered out. The classification algorithm can be implemented, for example, using a classifier (e.g., classifier 4504 within the signal based recommender system 4502 or a separate classifier from the signal based recommender system 4502).

The system clusters the content segments 4606. In some implementations, the system clusters the content segments to aggregate content segments with small typographical differences. For example, if text of one content segment is "gourmet restaurant" while text of another content segment has 'restaurant' misspelled, e.g., "gourmet restarants," the aggregation of the two content segments can result in one content segment of "gourmet restaurant."

The system can also cluster content segments to remove duplicates. For example, if text of two unique content segments both contain "gourmet restaurant," the aggregation of the two content segments can result in one content segment of "gourmet restaurant." This filtering allows the system to remove repeated entries of content segments. When the system aggregates content segments, the system keeps track of each content segment's aggregation frequency and considers the aggregation frequency as a factor in determining a popularity metric as will be described below. In some implementations, the server uses hierarchical agglomerative clustering (HAC) to cluster the content segments.

The clustered content segments can be filtered according to a frequency threshold 4608. The system implements the frequency threshold to remove rarely occurring content segments. If a content segment does not appear enough to meet the frequency threshold, the system determines that the content segment is not relevant enough to present to users. In some implementations, the frequency threshold is a specified value indicating a frequency of occurrence of the content segment (e.g., the content segment must appear at least 50 times). In some other implementations, the frequency threshold is dynamically adjusted by the system based on one or more criteria (e.g., the number of received total content segments, or the number of received content segments over a specified time).

The content segments are filtered by a local relevance score 4610. A local relevance score can be based on one or more signals of a content segment. In some implementations, these signals include location, time, aggregation frequency of the content segment, current events, or other information. For example, the system may give a higher local relevance score to a content segment about a highly-searched event near a location at a certain time. Also, mobile searches can be given a higher local relevance score because mobile searches can include metadata about a location and a timestamp at which the search occurred. In some implementations, if the local relevance score is low, the system discards the content segment.

After some content segments are filtered out, the system classifies the remaining content segments into categories 4612. The categories can be locally relevant. For example, categories include places, movies, shopping items, health, or weather. The system uses a classifier to group content segments into categories.

The system assigns each content segment a popularity metric 4614. The popularity metric indicates a level of a content segment's appearance frequency. In some implementations, the popularity metric is based on the number of search queries that include the content segment. In some implementations, the popularity metric is based on one or more parameters that indicate a number of "reposts" on social media channels (e.g., social feeds, social sites). A repost can be a content segment that has previously been posted on a social media website. For example, if a content segment is a mobile search query about a popular event and the mobile search query has metadata including a timestamp, the content segment may be given a higher score if the current time at the location is close to the timestamp embedded in the mobile query search. In another example, if a content segment is about a movie, the content segment may be given a higher score if the movie is a new movie that has just been released. If a content segment is about a sale at a department store and the content segment includes an end date of the sale, the content segment may be given a higher score if the sale is ending shortly and reassigned a lower score after the sale ends. In some alternative implementations, instead of assigning a popularity metric, the system assigns a social graph distance that measures how relevant the content segment is to a user.

In some implementations, if the content segment is a mobile search query, the system also filters out the mobile search query's "long tail," meaning the system removes terms from the query if the query is over a specified length. For example, if text of the query is "gourmet restaurants in san jose having a bar," the system can remove the "long tail" and convert the content segment into "gourmet restaurants."

After assigning each content segment a popularity metric, the system stores the content segments 4616. For example, the system can input each content segment along with one or more associated parameters into the database of intentions. The one or more associated parameters can be generated by the system, e.g., the popularity metric can be generated as described above. Signals associated with the content segment can also be stored as associated parameters. For example, if the content segment is a mobile search query, signals associated with the content segment can include items of mobile search query metadata. The mobile search query metadata can be obtained from search query logs. Alternatively, the system can obtain mobile search query metadata, along with other signals, from data that is sent from one or more mobile devices. For other kinds of content segments, signals associated with the content segment can include items of metadata otherwise associated with the content segment.

A row in a table of the database of intentions about a mobile search query includes a unique identification number, a date, an hour, a latitude and longitude geolocation, text of the content segment, a category, a query count indicating a number of times the content segment has been queried, and a popularity metric. In some implementations, if two content segments are determined to be duplicates, the content segment having the higher popularity metric is stored. An example row within a database of intentions is shown below:

include the acceleration of the mobile device, or whether the mobile device is geographically near a friend of the user.

Figure 47:
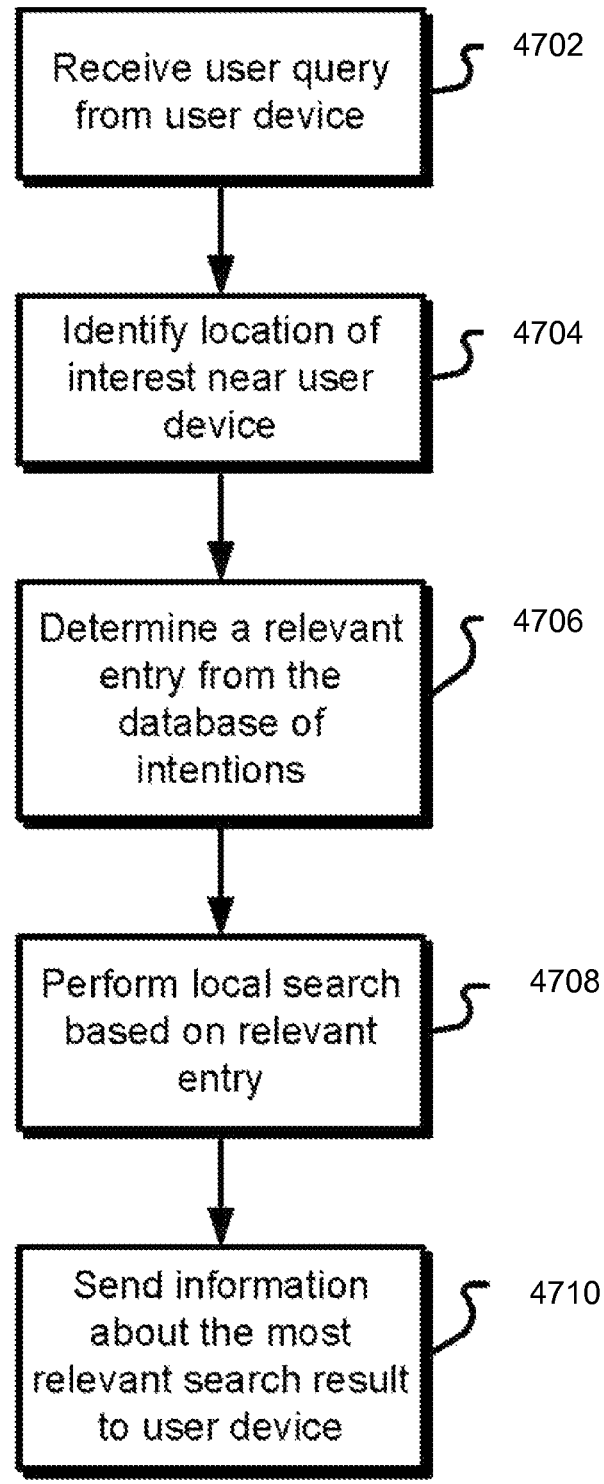
FIG. 47 is a flowchart of an example method of providing a search result to a user.

FIG. 47 is a flowchart of an example method 4700 of providing a search result to a user. For convenience, the method 4700 will be described with respect to a system having one or more computing devices that performs the method 4700.

The system receives a query 4702. The query can be received from a user device, for example, a computer, a laptop, a tablet, a watch, or a mobile phone. The user device can submit the query, for example, to obtain a relevant entry from the database of intentions. In some implementations, the user provides an input to the user device, which in turn causes the user device to send the query to the server. In some alternative implementations, the user does not provide any input to the user device, but the user device periodically sends requests to the system. For example, the user device can request a response from the server according to a fixed schedule or a location of the user device. The user device can also request a response from the server based on content segment activity around the user device's location (e.g., many content segments are added to the database of intentions near a location at a specific time). The submission of the query can also be triggered by different events, such as a wake-up from a user device's sleep mode. The query can contain information specific to the user device. For example, the query can contain location, time, user data, or prior search query data of the user device.

The system identifies a location of interest 4704 from a database of intentions (e.g., a database of intentions described above with respect to FIG. 46) that is near the user device's location. In some implementations, the location of interest is a city. In some implementations, the location of interest includes all locations within a specified radius around the user device's location. The radius can be fixed or dynamically adjusted by the system.

The system determines a relevant entry 4706 by identifying entries from the database of intentions that match the location of interest and selecting one entry that is near the identified location of interest based on one or more factors discussed below. If the location of interest is a city, the system can determine a relevant entry that relates to the city, similarly for a neighborhood within a city. In some implementations, the system considers a popularity metric for each content segment. If the content segment is a mobile search query, the system considers the number of times the

| ID | Date | Hour | Latitude | Longitude | Content Segment | Category | Query Count | Popularity metric |
|---|---|---|---|---|---|---|---|---|
| Id = 3 | 2011 Jul. 19 | 20 | 34.0522 | −118.2437 | Gourmet restaurant | Place | 1000000 | 1.0 |

An example row for a content segment about a social media post is shown below:

| ID | Date | Hour | Latitude | Longitude | Content Segment | Category | Repost Count | Popularity metric |
|---|---|---|---|---|---|---|---|---|
| Id = 4 | 2011 Jul. 18 | 11 | 26.0522 | −95.2437 | ballpark | Place | 500 | 1.0 |

In some implementations, a row in the table of intentions is expanded to include a variety of signals based on sensors of a mobile device of a user. For example, other signals can mobile search query has been queried. If the content segment is a social media post, the system can consider the number of times the social media post is reposted. The system can also consider one or more parameters that indicate a user's preferences. For example, if a user has specified that the user wants a search result related to restaurants, the system can determine a relevant entry from restaurants in the database of intentions.

The system also considers the location, date, and/or time associated with the user device when processing the query. For example, if a user device sends a query at 12 AM on a Friday and the user device is located outside a bar, the system can consider the time, date, location, user preferences, and popularity metric. If many users are searching for "taxi cabs" at the time, date, and location (e.g., using mobile search queries), a content segment about taxi cabs may have a high popularity metric. If the content segment has the highest popularity metric compared to other content segments, the system can select the content segment about "taxi cabs" as the most relevant entry.

In some implementations, the system filters out content segments that include generic information less likely to be searched by a user. For example, if the content segment is about a city or country, the system can serve the next relevant result because the user presumably is not seeking information regarding the city or country in which he or she is located.

After selecting the relevant entry, the system performs a local search (e.g., a search that has a restriction based on location) that includes the entry's content segment 4708. In some implementations, the system queries a service for further details about the content segment. For example, if the content segment is in the place category, the system queries a places Application Program Interface (API) for more information regarding the place. Information from the places API can include the content segment's address, location, reviews, telephone number, operating hours, or other local information. The server may also search using other local API's.

The system can also perform a local search on the relevant entry by using a search mechanism related to the category from the content segment's row in the database of intentions. For example, if the user were to have submitted a query when the user is near a latitude and longitude of (34.0522, −118.2437) at hour 20 on a day similar to 07/19 (see table above), the system can determine "gourmet restaurant" as the relevant entry and run a "places" search for "gourmet restaurant" centered near the user device's coordinates using a search system within the signal based recommender system, or by submitting a search to a search system.

After performing the local search, the system obtains one or more responsive search results. The system selects a search result from the search results. In some implementations, the system selects a specific search result by choosing the top-ranked search result.

In some alternative implementations, the system sends the relevant entry to a search engine. The search engine can show the relevant entry as a search suggestion, e.g., the suggestion can be shown near or in a search field. The system provides information about the selected search result to the user device 4710. In some implementations, the system obtains the information from local API's. For example, if the system searches for "gourmet restaurant," the system can obtain multiple responsive local search results from an API including information about local businesses. If the selected search result is of a gourmet restaurant called "Country Gourmet Restaurants," the system can obtain the name, address, phone number, and average reviews of Country Gourmet Restaurant (e.g., from the API) and send the information to the user device.

Figure 48:
FIG. 48 is a diagram of an example device that includes an interface showing information about a relevant search result.

FIG. 48 is a diagram of an example user device 4800 that shows information about a provided search result. After sending a query, the user device receives information about a relevant search result, e.g., as described above with respect to FIG. 47. In some implementations, the relevant result is a restaurant. The user device can display the name of the restaurant 4802, the address and phone number 4804, and the average reviews for the restaurant 4806. The user device 4800 can also display a map 4808 of where the restaurant is located. In some implementations, the relevant result is displayed on a lock screen of the user device 4800 or as a screensaver for the user device 4800. In some other implementations, contact information for the relevant result is displayed as a suggestion in a phone interface of the user device 4800. In some alternative implementations, when starting a mapping application of the user device 4800, the mapping application displays driving directions corresponding to the relevant result.

Generic Computing Device and Mobile Computing Device

Figure 49:
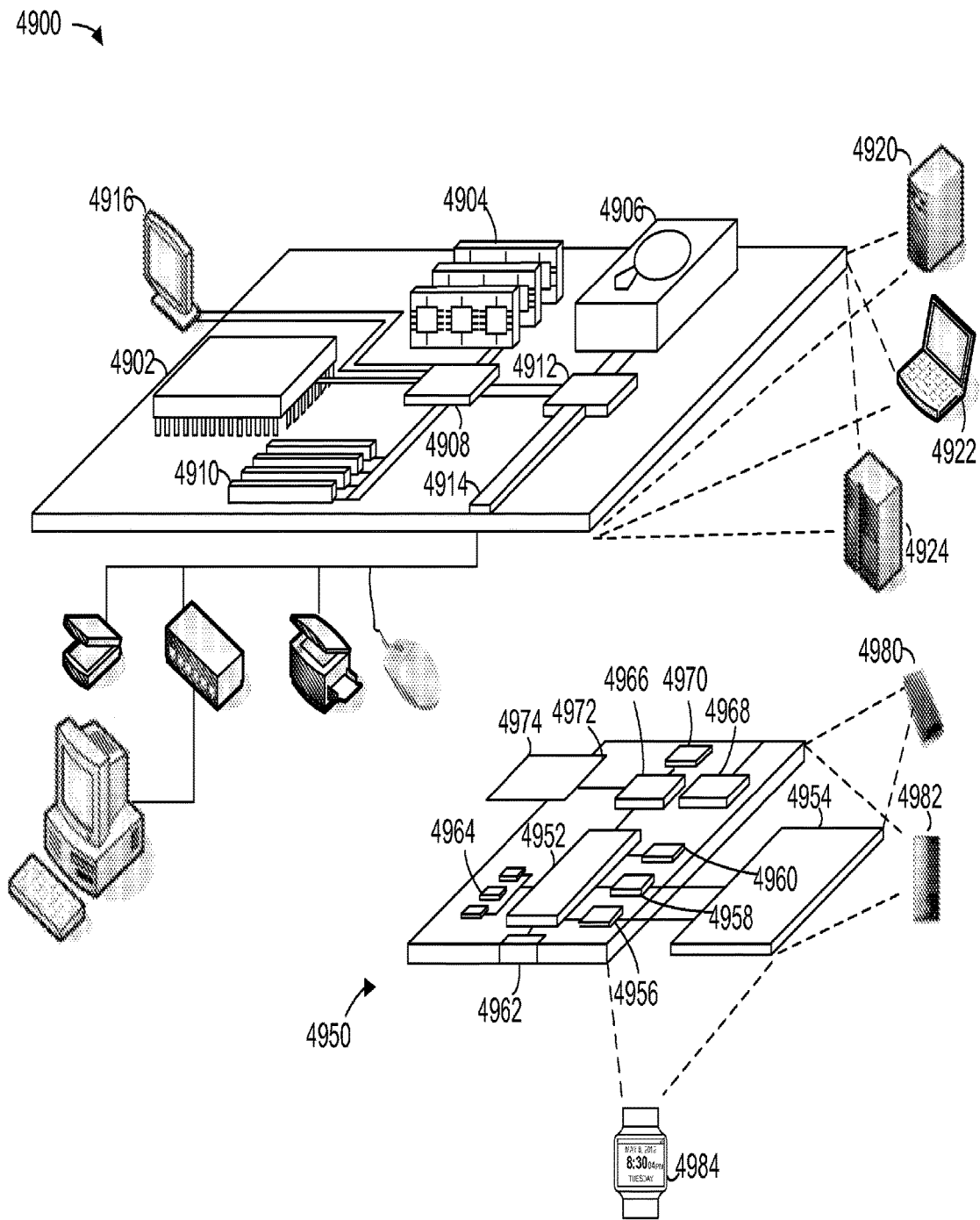
FIG. 49 is a diagram of an example of a generic computer device and a generic mobile computer device.

FIG. 49 is a diagram of an example of a generic computing device 4900 and a generic mobile computing device 4950, which may be used with the techniques described here. Generic computing device 4900 or generic mobile computing device 4950 may correspond to, for example, a user device 3810, ranking system 3820, and/or server 3830. Each of user device 3810, ranking system 3820, and/or server 3830 may include one or more computing devices 4900, one or more mobile computing devices 4950, and/or one or more components of computing device 4900 or mobile computing device 4950.

Computing device 4900 is intended to represent various forms of digital computers, such as laptops, desktops, workstations, personal digital assistants, servers, blade servers, mainframes, and other appropriate computers. Mobile computing device 4950 is intended to represent various forms of mobile devices, such as personal digital assistants, cellular telephones, smart phones, and other similar computing devices. The components shown in FIG. 49, their connections and relationships, and their functions, are meant to be examples only, and are not meant to limit implementations described herein.

Computing device 4900 may include a processor 4902, memory 4904, a storage device 4906, a high-speed interface 4908 connecting to memory 4904 and high-speed expansion ports 4910, and a low speed interface 4912 connecting to low speed bus 4914 and storage device 4906. Each of the components 4902, 4904, 4906, 4908, 4910, and 4912, are interconnected using various busses, and may be mounted on a common motherboard or in other manners as appropriate. Processor 4902 can process instructions for execution within the computing device 4900, including instructions stored in the memory 4904 or on the storage device 4906 to display graphical information for a graphical user interface (GUI) on an external input/output device, such as display 4916 coupled to high speed interface 4908. In other implementations, multiple processors and/or multiple buses may be used, as appropriate, along with multiple memories and types of memory. Also, multiple computing devices 4900 may be connected, with each device providing portions of the necessary operations, as a server bank, a group of blade servers, or a multi-processor system, etc.

Memory 4904 stores information within the computing device 4900. In some implementations, memory 4904 includes a volatile memory unit or units. In some implementations, memory 4904 includes a non-volatile memory unit or units. The memory 4904 may also be another form of computer-readable medium, such as a magnetic or optical disk. A computer-readable medium may refer to a non-transitory memory device. A memory device may refer to storage space within a single storage device or spread across multiple storage devices.

The storage device 4906 is capable of providing mass storage for the computing device 4900. In some implementations, storage device 4906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 4904, storage device 4906, or memory on processor 4902.

High speed controller 4908 manages bandwidth-intensive operations for the computing device 4900, while low speed controller 4912 manages lower bandwidth-intensive operations. Such allocation of functions is exemplary only. In some implementations, high-speed controller 4908 is coupled to memory 4904, display 4916 (e.g., through a graphics processor or accelerator), and to high-speed expansion ports 4910, which may accept various expansion cards (not shown). In these implementations, low-speed controller 4912 is coupled to storage device 4906 and low-speed expansion port 4914. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 4900 may be implemented in a number of different forms, as shown in the figure. For example, it may be implemented as a standard server 4920, or multiple times in a group of such servers. It may also be implemented as part of a rack server system 4924. In addition, it may be implemented in a personal computer such as a laptop computer 4922. Alternatively, components from computing device 4900 may be combined with other components in a mobile device (not shown), such as mobile computing device 4950. Each of such devices may contain one or more of computing devices 4900, 4950, and an entire system may be made up of multiple computing devices 4900, 4950 communicating with each other.

Mobile computing device 4950 may include a processor 4952, memory 4964, an input/output ("I/O") device, such as a display 4954, a communication interface 4966, and a transceiver 4968, among other components. Mobile computing device 4950 may also be provided with a storage device, such as a micro-drive or other device, to provide additional storage. Each of the components 4950, 4952, 4964, 4954, 4966, and 4968 are interconnected using various buses, and several of the components may be mounted on a common motherboard or in other manners as appropriate.

Processor 4952 can execute instructions within mobile computing device 4950, including instructions stored in memory 4964. Processor 4952 may be implemented as a chipset of chips that include separate and multiple analog and digital processors. Processor 4952 may provide, for example, for coordination of the other components of mobile computing device 4950, such as control of user interfaces, applications run by mobile computing device 4950, and wireless communication by mobile computing device 4950.

Processor 4952 may communicate with a user through control interface 4958 and display interface 4956 coupled to a display 4954. Display 4954 may be, for example, a TFT LCD (Thin-Film-Transistor Liquid Crystal Display) or an OLED (Organic Light Emitting Diode) display, or other appropriate display technology. Display interface 4956 may comprise appropriate circuitry for driving display 4954 to present graphical and other information to a user. Control interface 4958 may receive commands from a user and convert them for submission to the processor 4952. In addition, an external interface 4962 may be provide in communication with processor 4952, so as to enable near area communication of mobile computing device 4950 with other devices. External interface 4962 may provide, for example, for wired communication in some implementations, or for wireless communication in other implementations, and multiple interfaces may also be used.

Memory 4964 stores information within mobile computing device 4950. Memory 4964 can be implemented as one or more of a computer-readable medium or media, a volatile memory unit or units, or a non-volatile memory unit or units. Expansion memory 4974 may also be provided and connected to mobile computing device 4950 through expansion interface 4972, which may include, for example, a Single In Line Memory Module (SIMM) card interface. Such expansion memory 4974 may provide extra storage space for device 4950, or may also store applications or other information for mobile computing device 4950. Specifically, expansion memory 4974 may include instructions to carry out or supplement the processes described above, and may include secure information also. Thus, for example, expansion memory 4974 may be provide as a security module for mobile computing device 4950, and may be programmed with instructions that permit secure use of device 4950. In addition, secure applications may be provided via the SIMM cards, along with additional information, such as placing identifying information on the SIMM card in a non-hackable manner.

Expansion memory 4974 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 4964, expansion memory 4974, or memory on processor 4952, that may be received, for example, over transceiver 4968 or external interface 4962.

Mobile computing device 4950 may communicate wirelessly through communication interface 4966, which may include digital signal processing circuitry where necessary. Communication interface 4966 may provide for communications under various modes or protocols, such as GSM voice calls, SMS, EMS, or MMS messaging, CDMA, TDMA, PDC, WCDMA, CDMA4900, or GPRS, among others. Such communication may occur, for example, through radio-frequency transceiver 4968. In addition, short-range communication may occur, such as using a Bluetooth, Wi-Fi, or other such transceiver (not shown). In addition, Global Positioning System (GPS) receiver module 4970 may provide additional navigation- and location-related wireless data to mobile computing device 4950, which may be used as appropriate by applications running on mobile computing device 4950.

Mobile computing device 4950 may also communicate audibly using audio codec 4960, which may receive spoken information from a user and convert it to usable digital information. Audio codec 4960 may likewise generate audible sound for a user, such as through a speaker, e.g., in a handset of mobile computing device 4950. Such sound may include sound from voice telephone calls, may include recorded sound (e.g., voice messages, music files, etc.) and may also include sound generated by applications operating on mobile computing device 4950.

Mobile computing device 4950 may be implemented in a number of different forms, as shown in the figure. For example, it may be implemented as a cellular telephone 4980. It may also be implemented as part of a smart phone 4982, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

CONCLUSION

The foregoing description provides illustration and description, but is not intended to be exhaustive or to limit the implementations to the precise form disclosed. Modifications and variations are possible in light of the above disclosure or may be acquired from practice of the implementations.

For example, various user devices, ranking systems, and servers have been described in the examples above. In some implementations, a user device, ranking system, and/or server, of one example, may be the same user device, ranking system, and/or server of another example.

Also, example user interfaces have been described. In other implementations, the user interfaces may include additional items of information, fewer items of information, different items of information, or differently arranged items of information.

While it has been described that certain data is collected, this data may be collected while maintaining users' privacy. In other words, the data may be anonymized with regard to the identities of the users associated with the data.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method implemented by one or more processors, the method comprising:
 causing rendering of a graphical interface that enables defining, of one or more triggering criteria for a particular microsite, based on any one of multiple triggering criteria categories, the triggering criteria categories including a geographic location category, a time category, and a sound category;
receiving, in response to the graphical interface being rendered, a plurality of user interface inputs from a user that define triggering criteria for the particular microsite, the triggering criteria comprising at least:
a sound criterion that defines a particular sound being detected;
assigning, in one or more databases, the triggering criteria to the particular microsite responsive to receiving the plurality of user interface inputs that define the triggering criteria;
subsequent to assigning the triggering criteria to the particular microsite:
determining occurrence of the triggering criteria for the particular microsite, determining the occurrence of the triggering criteria including:
determining, based on audio data received from a given electronic device of the user, that the particular sound is detected; and
in response to determining the occurrence of the triggering criteria:
causing microsite content, for the particular microsite, to be rendered at a client device of the user.

2. The method of claim 1, wherein the microsite content comprises an audio clip that includes the audio data from the given electronic device of the user.

3. The method of claim 2, wherein the microsite content identifies one or more properties of the audio data, the one or more properties of the audio data determined, by the microsite, based on processing the audio data.

4. The method of claim 1, wherein the microsite content identifies one or more properties of the audio data, the one or more properties of the audio data determined, by the microsite, based on processing the audio data.

5. The method of claim 1, wherein the triggering criteria further comprises a date criterion that defines a particular day or particular day of the week.

6. The method of claim 1, wherein the sound criterion further comprises a threshold sound criterion.

7. The method of claim 1, further comprising, in response to determining the occurrence of the triggering criteria,
obtaining the microsite content from the particular microsite.

8. The method of claim 7, wherein obtaining the microsite content comprises:
transmitting, via a communications interface and to a stored network address for the particular microsite, a request for the microsite content; and
in response to transmitting the request:
receiving, via one or more of the communications interfaces, the microsite content.

9. A system comprising:
at least one processor; and
memory storing instructions that, when executed, cause one or more processors to:
cause rendering of a graphical interface that enables defining, of one or more triggering criteria for a particular microsite, based on any one of multiple triggering criteria categories, the triggering criteria categories including a geographic location category, a time category, and a sound category;
receive, in response to the graphical interface being rendered, a plurality of user interface inputs from a user that define triggering criteria for the particular microsite, the triggering criteria comprising at least:
a sound criterion that defines a particular sound being detected;
assign, in one or more databases, the triggering criteria to the particular microsite responsive to receiving the plurality of user interface inputs that define the triggering criteria;
subsequent to assigning the triggering criteria to the particular microsite:
determine occurrence of the triggering criteria for the particular microsite, wherein in determining the occurrence of the triggering criteria one or more of the processors are to:
determine, based on audio data received from a given electronic device of the user, that the particular sound is detected; and
in response to determining the occurrence of the triggering criteria:
cause microsite content, for the particular microsite, to be rendered at a client device of the user.

10. The system of claim 9, wherein the microsite content comprises an audio clip that includes the audio data from the given electronic device of the user.

11. The system of claim 10, wherein the microsite content identifies one or more properties of the audio data, the one or more properties of the audio data determined, by the microsite, based on processing the audio data.

12. The system of claim 9, wherein the microsite content identifies one or more properties of the audio data, the one or more properties of the audio data determined, by the microsite, based on processing the audio data.

13. The system of claim 9, wherein the triggering criteria further comprises a date criterion that defines a particular day or particular day of the week.

14. The system of claim 9, wherein the sound criterion further comprises a threshold sound criterion.

15. The system of claim 9, wherein the instructions, when executed, further cause one or more of the processors to, in response to determining the occurrence of the triggering criteria:
obtain the microsite content from the particular microsite.

16. The system of claim 15, wherein in obtaining the microsite content one or more of the processors are to:
transmitting, via a communications interface and to a stored network address for the particular microsite, a request for the microsite content; and
in response to transmitting the request:
receiving, via one or more of the communications interfaces, the microsite content.

* * * * *